(12) United States Patent
Low et al.

(10) Patent No.: US 8,674,551 B2
(45) Date of Patent: Mar. 18, 2014

(54) METHOD AND APPARATUS FOR CONTACTLESS POWER TRANSFER

(75) Inventors: Zhen Ning Low, La Jolla, CA (US);
Jenshan Lin, Gainesville, FL (US);
Raul Andres Chinga, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 505 days.

(21) Appl. No.: 12/994,478

(22) PCT Filed: Jun. 8, 2009

(86) PCT No.: PCT/US2009/046648
§ 371 (c)(1),
(2), (4) Date: Nov. 24, 2010

(87) PCT Pub. No.: WO2009/149464
PCT Pub. Date: Dec. 10, 2009

(65) Prior Publication Data
US 2011/0080056 A1    Apr. 7, 2011

Related U.S. Application Data

(60) Provisional application No. 61/059,663, filed on Jun. 6, 2008.

(51) Int. Cl.
*H01F 27/42* (2006.01)
*H01F 37/00* (2006.01)
*H01F 38/00* (2006.01)

(52) U.S. Cl.
USPC .................................................. 307/104

(58) Field of Classification Search
USPC ........................................... 307/104; 320/120
See application file for complete search history.

(56) References Cited

U.S. PATENT DOCUMENTS

| | | | |
|---|---|---|---|
| 5,818,702 A * | 10/1998 | Faulk | 363/16 |
| 6,088,249 A * | 7/2000 | Adamson | 363/97 |
| 6,724,255 B2 | 4/2004 | Kee et al. | |
| 2005/0140456 A1 * | 6/2005 | Krishnasamy Maniam et al. | 330/311 |
| 2006/0076338 A1 * | 4/2006 | Kagan | 219/201 |
| 2007/0064457 A1 * | 3/2007 | Perreault et al. | 363/78 |
| 2007/0171680 A1 | 7/2007 | Perreault et al. | |

OTHER PUBLICATIONS

Written Opinion of the international search authority dated Jun. 12, 2010.*
International Search Report and Written Opinion dated Feb. 17, 2010.
International Preliminary Report on Patentability dated Dec. 6, 2010.

* cited by examiner

*Primary Examiner* — Stephen W Jackson
*Assistant Examiner* — Rasem Mourad
(74) *Attorney, Agent, or Firm* — Thomas | Horstemeyer, LLP.

(57) ABSTRACT

Embodiments of the subject invention pertain to a method and apparatus for contactless power transfer. A specific embodiment relates to an impedance transformation network, a new class of load network for application to a contactless power system. Embodiments of the impedance transformation network enable a contactless power system to operate without encountering the common problems of: 1) over-voltage and/or under-voltage conditions; 2) over-power and/or under-power conditions; 3) power oscillations; and 4) high heat dissipation.

20 Claims, 84 Drawing Sheets

| 1 | —— Transistor Temperature (natural convection cooling) |
| 2 | —— Inductor Temperature (natural convection cooling) |
| 3 | —— Transistor Temperature (forced cooling) |
| 4 | —— Inductor Temperature (forced cooling) |

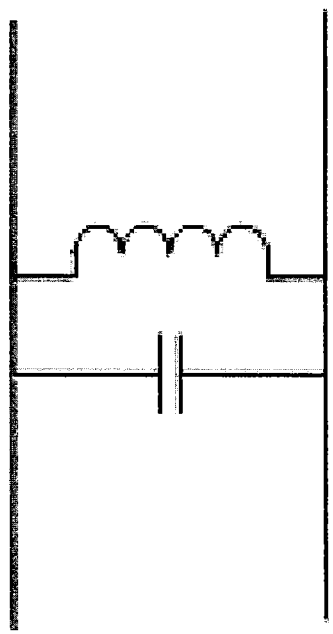
FIG. 76
B. Notch Filter
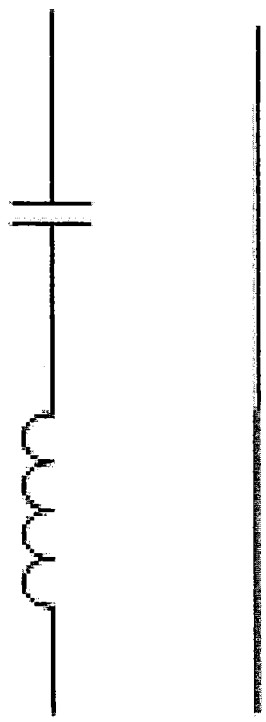

METHOD AND APPARATUS FOR CONTACTLESS POWER TRANSFER

CROSS REFERENCE TO RELATED APPLICATION

This application claims priority to "METHOD AND APPARATUS FOR CONTACTLESS POWER TRANSFER," having serial number PCT/US2009/046648, filed on Jun. 8, 2009, which claims priority to and the benefit of U.S. Provisional Application No. 61/059,663, filing date Jun. 6, 2008.

BACKGROUND OF INVENTION

In recent years, inductive charging technology has become a leading candidate to eliminate power cables. Inductive power systems and other contactless power systems typically use one or more transmitters to send power to one or more receivers. Electronic devices with contactless power receivers can be powered or charged by being positioned in close proximity to a contactless power transmitter. Such systems have been designed and implemented.

Contemporary contactless power systems are make use of switch-mode inverters, such as the Class, D, DE, E, $E^{-1}$, F, $F^{-1}$, EF, EF2, EF3, Phi. The switch-mode inverter converts DC voltage that is provided by a DC voltage source to into a high frequency signal that enables efficient coupling of one or more primary coils to one or more secondary coils. The secondary coils are ultimately connected to one more loads. In the case of a contactless power transfer system the load of an inverter is typically a portable electronic device or some other load device with a variable power requirement. In many instances the load has an input impedance that is variable. The load can use energy or it can be designed to store energy. The load can comprise a voltage regulator and/or a power management system for regulating and relaying the power to an energy consuming or energy storing element. The impedance of the load helps determine the loading condition.

A typical switch-mode inverter comprises an active device, a supply network, and a load network with output terminals for connecting to a load.

The active device is typically a transistor and operates as a switch. The switch alternates between a conductive and non-conductive state. A control signal from a gate drive or clock can be used to operate the switch. The switch is connected to a supply network and a load network. The switching of the active devices helps form an AC signal at the output of the load network.

The supply network relays power from a source the DC voltage source to a terminal of the active device. The DC voltage source can have an output voltage that is variable. The supply network can be a simple inductor and typically comprises passive components. In some cases it may comprise an active device or variable elements for active reconfiguration of the supply network. A reconfiguration of the supply network can be performed depending on the load conditions in order to optimize efficiency or regulate the power which is delivered from the source.

The load network relays power to the load device from a terminal of the active device and supply network. The load network typically comprises passive components. In some cases it may contain an active device or variable for active reconfiguration of the load network. A reconfiguration of the load network may be performed depending on the load conditions in order to optimize efficiency and/or regulate the power delivered to the load.

The load network includes one or more primary coils for inductively coupling to one or more secondary coils. Because of size mismatches and restrictions on the use of bulky core materials, the coupling between the primary and secondary coils can be weak thereby reducing efficiency, power delivery, or both.

In order to compensate for weak coupling between primary and secondary coils, typical inductive charge systems typically operate at frequencies greater than 50 kHz. At these higher operating frequencies soft-switching inverters, such as the Class E, $E^{-1}$, are preferred because they are more efficient than hard-switching inverters. High efficiency is preferable for environmental and regulatory reasons as well as practical reasons such as minimizing heat dissipation.

Soft-switching describes a mode of operation where an active device, such as a transistor, will switch when either the voltage or current across the transistor is zero. Soft-switching eliminates losses that normally occur with hard switching due to switch capacitance and the overlap of voltage and current in the switch. For example, in the case of zero voltage switching, the voltage across a transistor to swings to zero before the device turns on and current flows. Likewise, at turn-off, the voltage differential across the active device swings to zero before it is driven to a non-conductive state.

A practical system is preferably capable of matching the power supplied to the power demanded by a load device. This is important because many load devices have variable power requirements. If the power delivered does not match power required, the excess energy can be dissipated as heat. A load device can have an input impedance that is variable because of a power requirement that is variable (see FIG. 5 for a graph of resistance versus changing time for a typical cell phone battery). The input impedance of the load device can change by an order of magnitude. The input impedance of a voltage regulator connected to a portable electronic device can change by two orders of magnitude. The variable impedance of a load device makes the implementation of contactless power system difficult.

The following two characteristics of soft-switched inverters found in typical contactless power system make the adaptation to a load device with a variable impedance challenging: 1. Most switch-mode inverters have high efficiency over a narrow range of impedances. As an example, a class E inverter typically operates under, high-efficiency soft-switched conditions over a factor of two in load impedance (see FIG. 3) (Raab, 1978). (see FIG. 2 for a graph of efficiency versus normalized resistance for typical switch-mode inverters); 2. The output power vs. load impedance relationship of a switch-mode inverter is different than the output power vs. load impedance relationship of a DC supply (See FIG. 4 for a graph of power delivery vs. load resistance for a DC supply and an inverter). Because of this, a load device's pre-existing power management control system can fail to appropriately regulate the power delivered to the load device which can lead to component failure.

Due to the above described characteristics a contactless power system is likely to encounter one or more of the following problems: 1) over-voltage and/or under-voltage conditions throughout the circuit; 2) excess or inadequate power delivery to individual loads 3) power oscillations; 4) heat problems; and 5) low efficiency.

Notably, a class D inverter architecture does not share the unfavorable characteristics and resulting problems of the other soft-switched inverters. Class D inverters are optimized for driving an impedance looking into the load network that has zero-phase angle (ZPA), and works for positive phase angles. Zero phase angle operation can be maintained by eliminating the reactance in a circuit of by using a combination of control functionalities, including, but not limited to, frequency, and tank circuit control (see FIGS. 7 and 8). A contactless power system with other soft-switched inverter architectures would be expected to make use of similar control functionality because of their sensitivity to the input impedance of the load(s). (Laouamer, R., et al., "A multi-resonant converter for non-contact charging with electromagnetic coupling," in *Proc. 23rd International Conference on Electronics, Control and Instrumentation*, November 1997, Vol. 2, pp. 792-797; Abe, H., et al., "A non-contact charger using a resonant converter with parallel capacitor of the secondary coil," in *Proc. Applied Power Electronics Conference and Exposition*, 15-19 Feb. 1998, Vol. 1, pp. 136-141; Joung, G. B. et al., "An energy transmission system for an artificial heart using leakage inductance compensation of transcutaneous transformer," *IEEE Transactions on Power Electronics*, Vol. 13, pp. 1013-1022 November 1998; Lu, Y., et al., "Gapped air-cored power converter for intelligent clothing power transfer," in *Proc. 7$^{th}$ International Conference on Power Electronics and Drive Systems*, 27-30 Nov. 2007, pp. 1578-1584; Jang, Y., et al., "A contactless electrical energy transmission system for portable-telephone battery chargers," *IEEE Transactions on Industrial Electronics*, Vol. 3, pp. 520-527, June 2003; Wang, C., et al., "Power transfer capability and bifurcation phenomena of loosely coupled inductive power transfer system," *IEEE Transactions on Industrial Electronics*, Vol. 51, pp. 148-157, February 2004; Wang, C., et al., "Investigating an LCL load resonant inverter for inductive power transfer applications," *IEEE Transactions on Power Electronics*, Vol. 19, pp. 995-1002, July 2004; Wang, C., et al., "Design consideration for a contactless electric vehicle battery charger," *IEEE Transactions on Industrial Electronics*, Vol. 52, pp. 1308-1314, October 2005) Control functionality adds to the cost and complexity of a system and detracts from the commercial viability.

To enable better control functionality and to ensure proper operation of the system, communication systems between the power supply and the load have been proposed (see FIGS. 6 and 9). Such communication systems also add undesirable cost to the system.

The previously described control functionality has been implemented in both contactless power transmitters and contactless power receivers. Control functionality in the receiver has been considered of particular importance when multiple loads require power from the same transmitter. To support multiple loads, it has been proposed that receiver units incorporate mechanisms such as, but not limited to, variable inductance and duty cycling. These mechanisms allow multiple loads to receive power from the same source by giving load devices a mechanism to protect themselves from over-voltage and/or current conditions (FIG. 6). These mechanisms are of high importance because loads without such mechanisms will continue to receive power even when they no longer require power. The power will be dissipated as heat in the load device. Contemporary batteries will not charge at temperatures over 50° C. These systems also add undesirable cost to the system.

SUMMARY OF THE INVENTION

Embodiments of the subject invention pertain to a method and apparatus for contactless power transfer. A specific embodiment relates to an impedance transformation network, a new class of load network for application to a contactless power system. Embodiments of the impedance transformation network enables a contactless power system to operate without encountering the common problems of: 1) over-voltage and/or under-voltage conditions; 2) over-power and/or under-power conditions; 3) power oscillations; and 4) high heat dissipation.

Embodiments of the impedance transformation network enables the contactless power system to avoid one or more of the four common problems described above, without any feedback, communication, and/or control functionality. The pre-existing power and battery charge management circuitry for a load, which may include a voltage regulator, can regulate the power output of a contactless power system under normal modes of operation. In accordance with embodiments of the invention, contactless power systems can be combined with very simple controls to improve the performance of the system. In this preferred mode of operation, a contactless power system can predictably and reliably deliver power to a load across a wide range of load impedances.

Embodiments of the invention provide one or more of, and a preferred embodiment of the invention provides each of, the following four functions:

1) Reactance shifting and phase angle control: a reactance is added to the resistance looking from the switch-mode supply through the load network. The reactance is shifted such that the phase angle looking from the switch-mode inverter into the load network is within a range that provides substantially soft-switching operation of the active device either when connected to or disconnected from one or more loads. Embodiments of the invention use the phase angle to control the power delivered by the inverter. Such embodiments can take advantage of the correlation between phase angle and load resistance. Changes in load resistance are transformed into a shift in the phase angle looking into the impedance transformation network. The output power response is more pronounced with respect to phase than with respect to load resistance (see FIG. 12). This enables the invention to match power delivery and more closely mimic the response of a traditional DC supply (see FIG. 13). In this method of operation, the contactless power system can deliver the necessary amount of power to the load. The soft-switching operation of the active device is preferably maintained for all load impedances.

If the inverter is designed for soft switching when the impedance looking into the load network from the active device is inductive, then the impedance transformation network is configured such that the impedance of the phase angle looking from the active device into the load network is positively correlated with the effective resistance of the load(s). If the effective resistance of the load increases, then the impedance transformation network is configured such that the phase angle looking from the active device through the load network increases. If the effective resistance of the load decreases, then the impedance transformation network is configured such that the phase angle looking from the active device through the load network decreases. In a specific embodiment the reference phase angle is 40 degrees or greater, and in another 45 degrees or greater. In further embodiments, increases in load resistance can increase the phase angle up to 85 degrees.

If the inverter is designed for soft switching when the impedance looking into the load network from the active device is capacitive, than the impedance transformation network can be configured such that impedance of the phase angle looking from the active device into the load network is negatively correlated with the effective resistance requirement of the load. If the effective resistance of the load increases, then the impedance transformation network is configured such that the phase angle looking from the active device through the load network decreases. If the effective resistance of the load decreases, then the impedance transformation network is configured such that the phase angle looking from the active device through the load network increases.

The effective resistance is a combination of the resistances of the loads looking from the terminals of the secondary coils toward the load. The loads can be seen as in series or parallel. The loads can be seen as the series or parallel combination of the inverse of the individual load resistances. In the generalized form, the effective load resistance of any close proximity contactless power system via magnetic induction that incorporates m primary coils and n secondary coils can be described by:

$$Z_{in} = \{1_{1M}[\mathbb{Z}^{IV} - (\mathbb{Z}^{II})^T(\mathbb{Z}^I)^{-1}\mathbb{Z}^{II}]^{-1}1_{M1}\}$$

$$\mathbb{Z} = \begin{bmatrix} \mathbb{Z}^{III} & (\mathbb{Z}^{II})^T \\ \mathbb{Z}^{II} & \mathbb{Z}^I \end{bmatrix}$$

$$\mathbb{Z}_{ab} = \begin{cases} j\omega L_a + R_a & \text{for } a = b \\ j\omega M_{ab} & \text{otherwise} \end{cases}$$

$$\mathbb{Z}^{IV} = \mathbb{Z}^{III} + Z_{in}1_{MM}$$

Zin: Input impedance looking into the primary coil
$1_{1M}$: Vector of 1's of length M
$1_{MM}$: M×M matrix of 1's
Z: Impedance matrix
$Z_{ab}$: Element ab of the impedance matrix
$Z^I$: Sub-matrix of Z
$Z^{II}$: Sub-matrix of Z
$Z^{III}$: Sub-matrix of Z
$M_{ab}$: Mutual inductance between the $a^{th}$ and $b^{th}$ coil
j: imaginary number
a: coil index
b: coil index
ω: radian frequency
$R_a$: Parasitic resistance of the $a^{th}$ coil
$L_a$: Self inductance of the $a^{th}$ coil Typically, the power requirement of the device is negatively correlated with load resistance. As the resistance of the load increases the power required by the load decreases.

2) Resistance isolation: the resistance looking from the switch-mode supply through the load network can be minimally affected by changes in load resistance (see FIG. 10);

Embodiments of the invention can isolate the switch-mode supply from changes in load resistance in order to improve the predictability and stability of the output power. The isolation from changes can be accomplished by the implementation one or more filter networks such that the range of resistances presented by load appear much narrower at the output terminals of a switch-mode inverter. The switch-mode supply should see a resistance such that it is in a high efficiency mode of operation (see FIG. 2).

3) Frequency filtering: a filter removes extra harmonics, effectively "cleaning" the power signal before it enters the primary or secondary coil. In one embodiment this frequency filter incorporates an inductor and a capacitor with a "low Q" value. In another embodiment this frequency filter incorporates an inductor and a capacitor, the filter being considered to have a high Q value.

4) Coupling: at least one primary coil in the load network is inductively coupled to one or more secondary coils of the same load network. The primary coils can be configured in a spiral configuration and maybe designed with a variable pitch in order to create an even magnetic field distribution. The primary coils can be arranged in an array pattern with each coil in the array wound with an irregular shape so that the array has a substantially even magnetic field distribution. The secondary coils can be coupled to the primary coil in any position or orientation. The secondary coil can be adapted to attach to a load. In a preferred embodiment the secondary coil is adapted to attach to a portable electronic device. In specific embodiments, both the primary coil and the secondary coil are the same size to maximize coupling. In this example, and other specific embodiments, the receiver coil is significantly smaller than the primary coil, in order to allow the user to place the device in any orientation. It is desirable for the secondary coil to be much smaller than the primary coil, but the efficiency and power transfer capabilities start to degrade significantly if the receiver is too small, due to poor coupling. In this example the secondary is wound along a single path with minimal spacing between turns in order to minimize the occupied volume and ease integration.

The voltage and current characteristics of the primary coil and the secondary coil can be described using the following equations [7][12]:

$$V_1 = M_{11}\frac{dI_1}{dt} + M_{12}\frac{dI_2}{dt} \quad (1)$$

$$V_2 = M_{21}\frac{dI_1}{dt} + M_{22}\frac{dI_2}{dt} \quad (2)$$

$$M_{12} = k\sqrt{M_{11}M_{22}} \quad (3)$$

Where
$V_1$ is the voltage at the transmitting coil
$I_1$ is the current at the transmitting coil
$V_2$ is the voltage at the receiving coil
$I_2$ is the current at the receiving coil
$M_{11}$ is the self inductance of the transmitting coil
$M_{22}$ is the self inductance of the receiving coil
$M_{12}=M_{21}$ is the mutual inductance of the two coils
k is the coupling coefficient between the two coils By Ohm's law:

$$Z_{tx} = R_{tx} + jX_{tx} \quad (4)$$
$$= \frac{V_1}{I_1}$$

$$Z_{rx} = R_{rx} + jX_{rx} \quad (5)$$
$$= \frac{V_2}{I_2}$$

Solving equations (1-3)

$$Z_{tx} = \frac{\omega^2 M_{12}^2 R_{rx}}{R_{rx}^2 + (\omega M_{22} + X_{rx})^2} + j\left(\omega M_{11} - \frac{\omega^2 M_{12}^2(\omega M_{22} + X_{rx})}{R_{rx}^2 + (\omega M_{22} + X_{rx})^2}\right) \quad (6)$$

The above equations neglect any $2^{nd}$ order effects such as skin depth and proximity effects. A more in-depth analysis accounting for the above effects can be utilized. In an embodiment, litz wires can be used to mitigate such effects to the extent that they do not create significant discrepancies.

By using the combination of resistance isolation and phase angle control, a reliable, stable transmitter can power a variable load. First, the inverter preferably will not fail or overheat when the secondary coil is removed from the primary coil. Although a load detection scheme can be used to turn off the transmitter and reduce unloaded power losses, it can still be desirable for the unloaded power consumption to be sufficiently low. Since the coil voltage is unique to each load resistance as shown in FIG. 49, load detection and status can be easily acquired. To avoid false detection, the load detection and status can be verified by analyzing the supply current via a current sense resistor. Limiting unloaded power loss can be achieved by ensuring the unloaded transmitting load network has effective impedance similar to a high load resistance case (high impedance with large phase angle). From the schematic of the class E circuit in FIG. 44, it can be deduced that most of the power lost is due to the primary coil and inductor parasitic resistances as they are in the path of power transfer. Therefore, one way to reduce the unloaded power loss is to use an inductor with lower parasitic resistance.

BRIEF DESCRIPTION OF DRAWINGS

The foregoing and other objects, features, and advantages of the present invention, as well as the invention itself, will be more fully understood from the following description of various embodiments, when read together with the accompanying drawings.

FIG. 26A shows a "hard switching" topology power loss waveform 260 for a bridge MOSFET (320 W/div) showing high instantaneous peak power loss during each switching cycle, and FIG. 26B shows a "soft switching" topology power supply waveform 261 with the same rating as that in FIG. 26A.

FIG. 76 shows various circuit elements arranged to achieve the function of frequency filtering. Two notch filters are shown that can remove unwanted harmonics from the signal. A combination of other filter types can be used to achieve frequency filtering.

DETAILED DISCLOSURE

Figure 1:
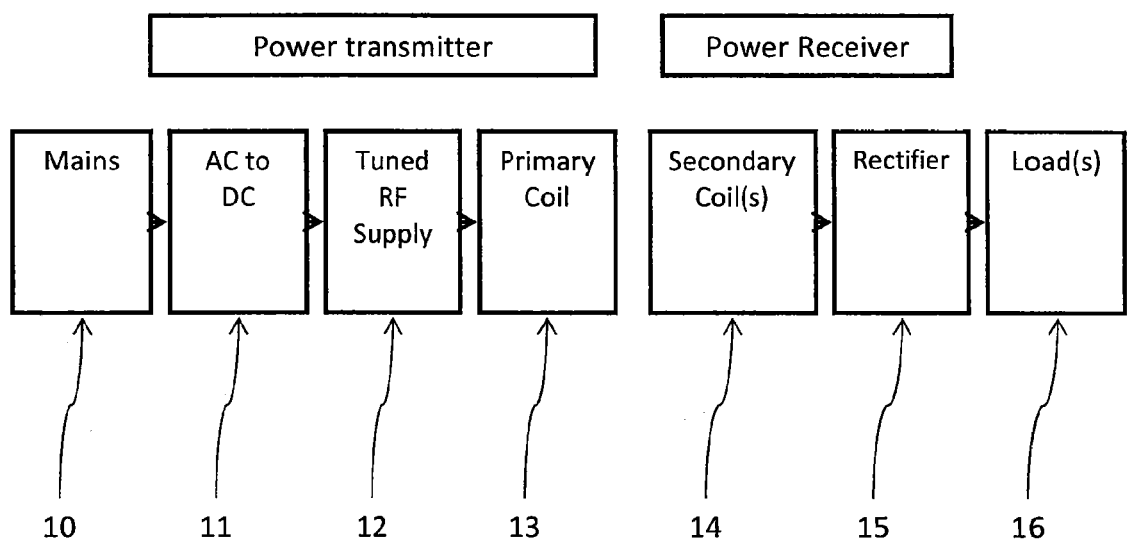
FIG. 1 shows a typical contactless power system that uses an inverter to drive a primary coil that may couple to one or more secondary coils and loads.

Contactless power systems typically use high frequency power electronics to deliver power to one or more loads. FIG. 1 shows the fundamental components of many contactless power systems. A contactless power supply generally draws its power from the electrical grid through a standard wall outlet 10. The power from the wall is typically AC so it is generally converted to DC voltage by an AC to DC converter 11. In order to shrink the size of components it is desirable to work at a high frequency, so the DC voltage is switched by an inverter 12. The high frequency signal, such as a high frequency voltage signal or high frequency current signal, is fed into one or more primary coils 13. The high frequency signal may pass through one or more filters before it feeds in to the primary 13. The primary coil 13 couples with one or more secondary coils 14. The secondary coil 14 will receive the high frequency power signal and will feed that into a rectifier 15, which will then output power to the load 16. One or more filter networks may be present between the secondary coil 14, rectifier 15, and load 16. Voltage regulation and battery charge management circuitry may be considered part of load 16.

Figure 2:
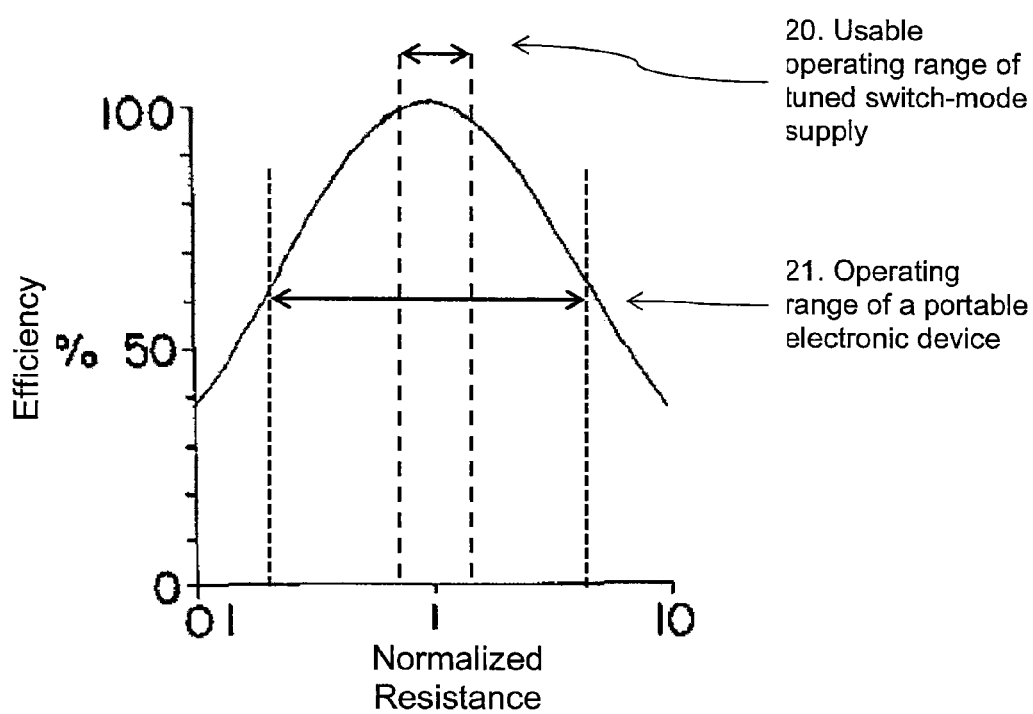
FIG. 2 shows the operating efficiency versus load resistance seen by an inverter (Class E) that is driving load resistances from 0.1 to 10, a span that reaches two orders of magnitude, where the high efficiency operating range for the inverter is identified, and the operating range of a typical portable electronic device is identified.
Figure 3:
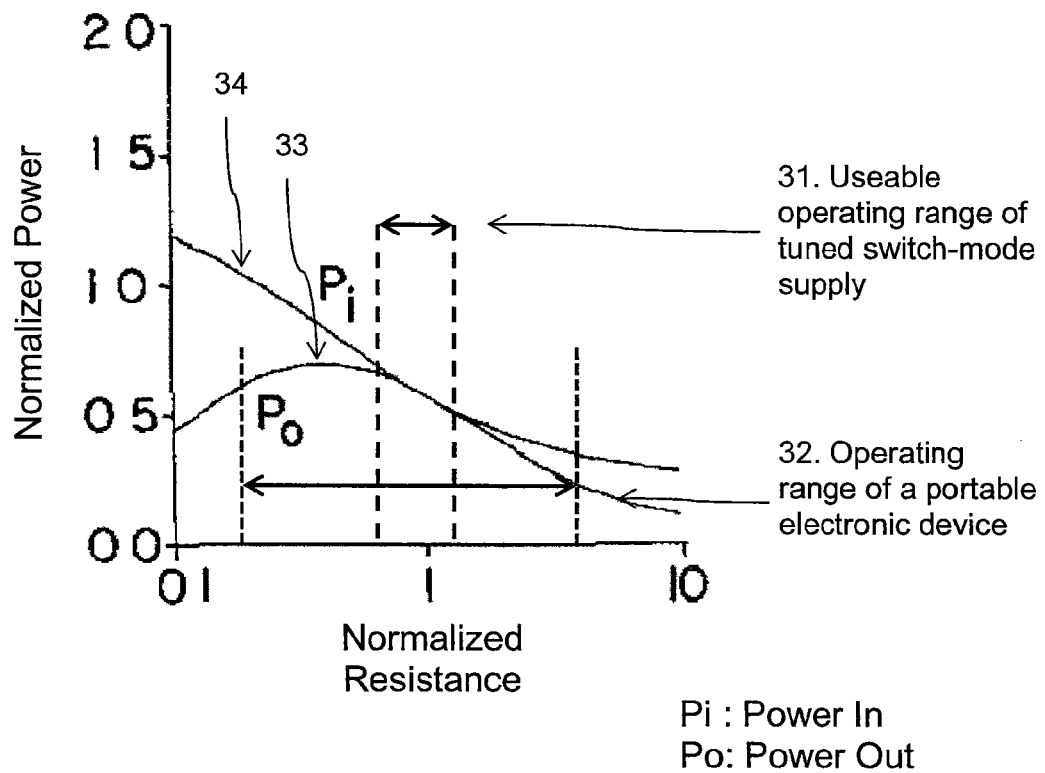
FIG. 3 shows the power in (Pi) and power out (Po) versus load resistance seen by an inverter (Class E) that is driving load resistances from 0.1 to 10, a span that reaches two orders of magnitude, where the high efficiency operating range for the inverter is identified, and the operating range of a typical portable electronic device is identified.

The incorporation of a switch-mode inverter can make it difficult to deliver the correct amount of power to the load or loads. This is partially attributable to the limited range of load resistances that enable high-efficiency operation. FIG. 2 shows the high efficiency operating range 20 of an inverter as it compares to the operating range 21 of a typical battery operated device. The operating range of resistances of the battery operated device is substantially wider than the high efficiency operating range or the inverter. FIG. 3 shows the relation of input power 34 and output power 33 of an inverter across a range of resistances. The lost power can be calculated by subtracting output power 33 from input power 34. The power loss is significant in the operating range 32 outside the high efficiency operating region 31.

Figure 4:
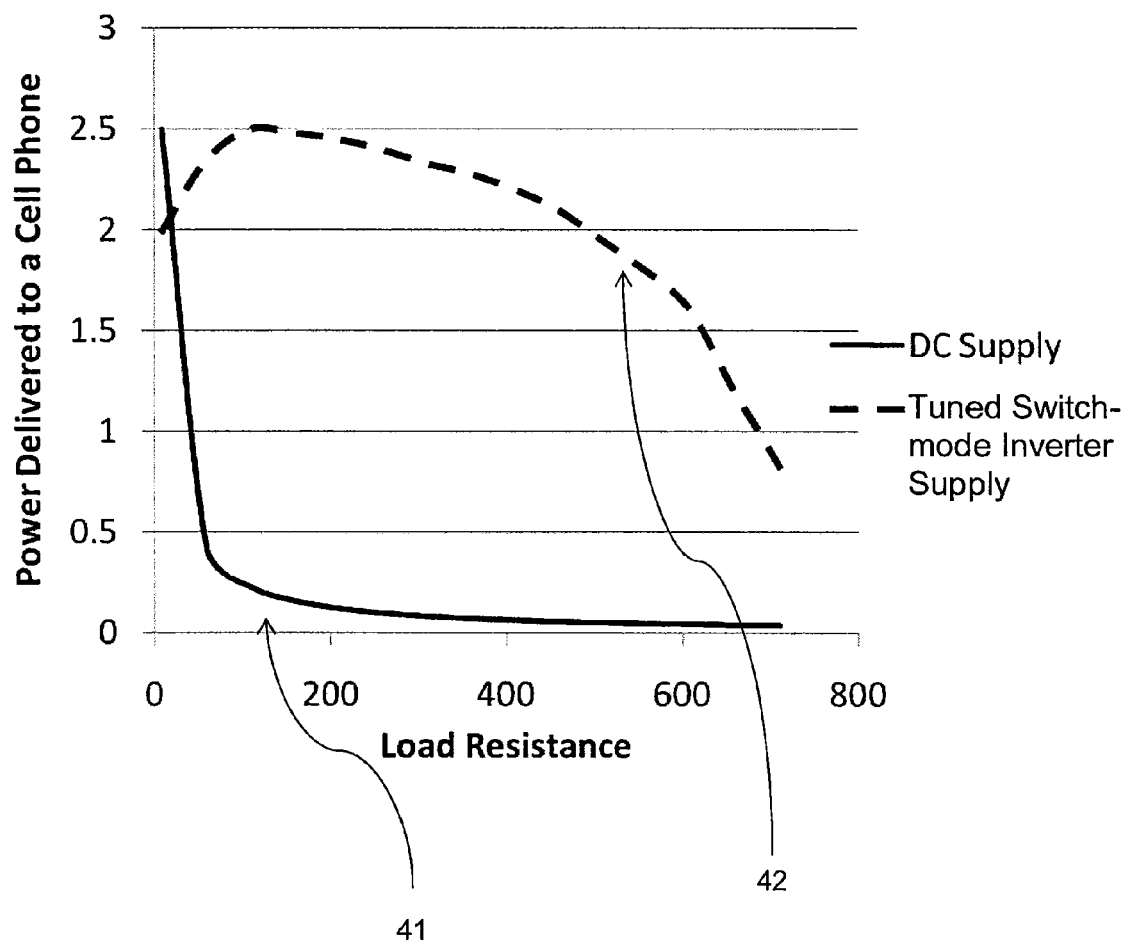
FIG. 4 shows the power delivered to a variable load resistance from two different sources: a tuned switch-mode inverter supply and a fixed voltage DC supply, illustrating that power delivered to the load across a range of impedances is very different depending on the source, and that the range of output power can be much smaller with switch-mode inverters.

Switch-mode inverters are difficult to implement in contactless power systems with variable loads because the output power response relative to load resistance is very different than a DC supply's output power response relative to load resistance. FIG. 3 shows output power 33 increasing with load resistance until it reaches a center value and decreases again. This is different than a typical constant-voltage DC supply whose power delivery follows the relationship $P=V^2/R$. The difference is illustrated in FIG. 4 where we can see that the power delivery from a DC supply 41 will decrease rapidly with an increase in load resistance. By contrast, the output power from an inverter 42 will increase with load resistance and will later drop as load resistance continues to increase. The drop in power delivery 42 is markedly slower than the drop in power delivery 41. Although FIG. 4 shows the curve for one example of a tuned switch-mode inverter supply, other tuned inverters can have different curves.

Figure 5:
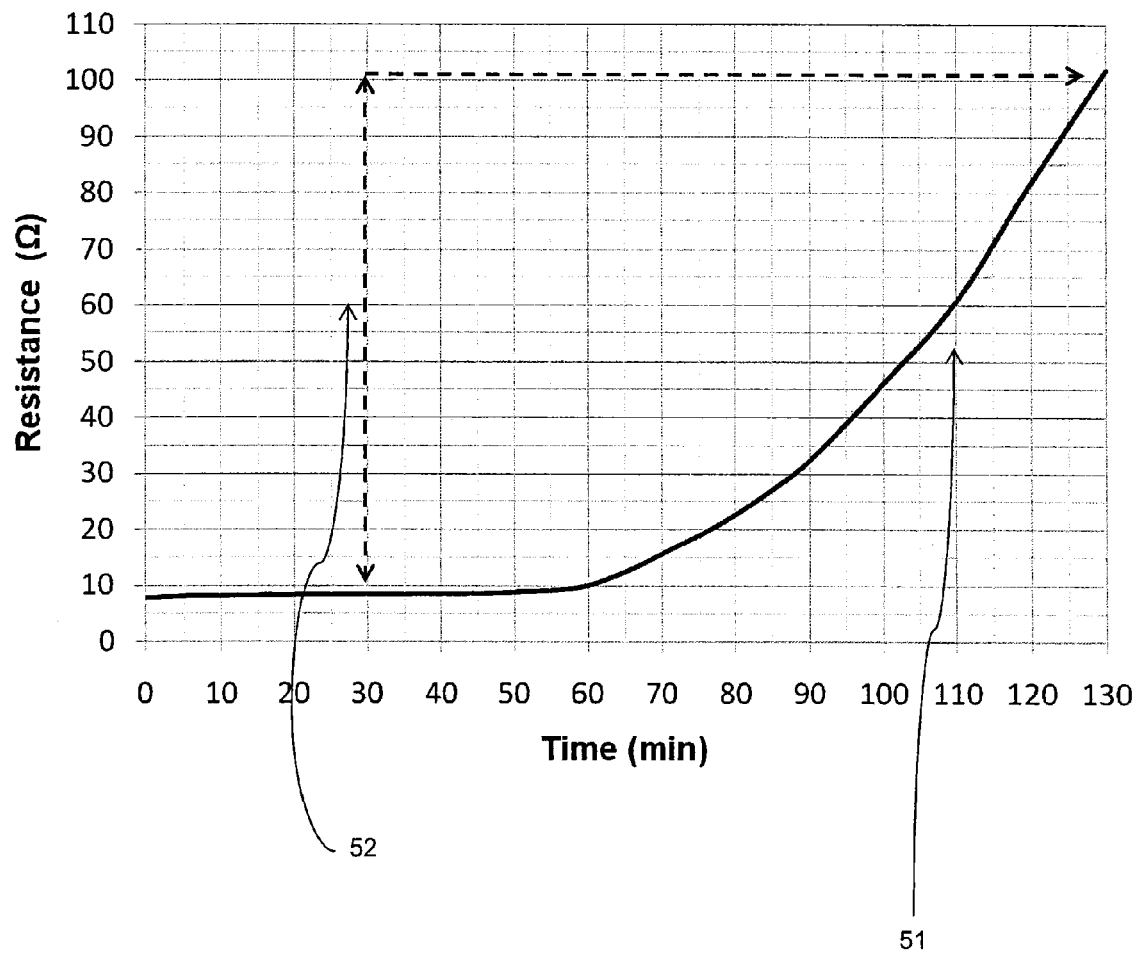
FIG. 5 shows the load resistance of a Motorola Razr during the charge cycle, illustrating that during the charge cycle, the resistance can change by greater than one order of magnitude.

Portable electronic devices display a wide range of input resistances. FIG. 5 shows the effective resistance 51 looking into a Motorola Razr during the charge cycle. FIG. 5 shows the wide dynamic range of the load 52, and in this case it is greater than one order of magnitude.

Figure 6:
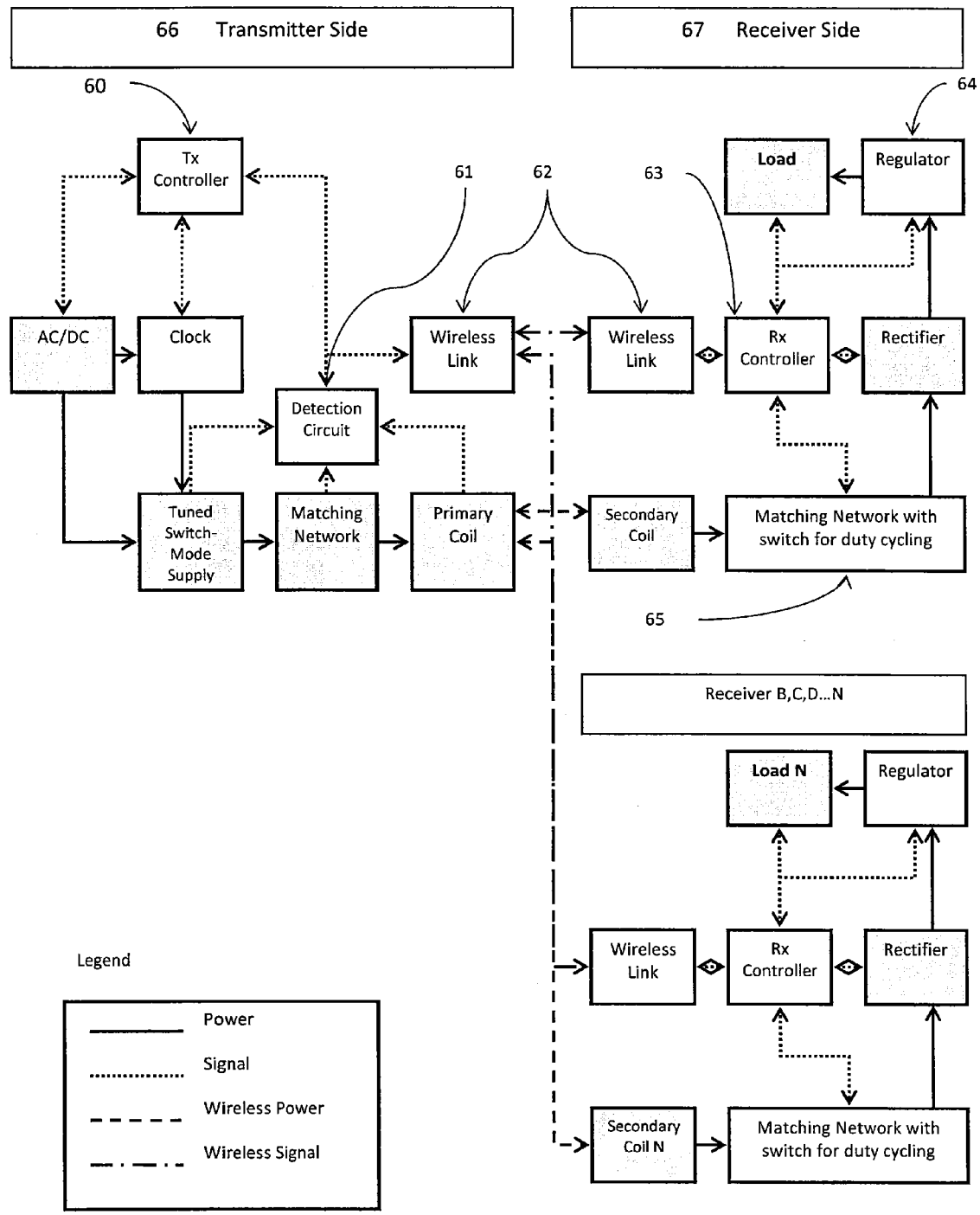
FIG. 6 shows a block diagram of a typical prior art contactless power system, including commonly proposed and implemented communication and control functionality.

The aforementioned challenges of efficiency and power delivery can be overcome by implementing a variety of communications and controls. FIG. 6 shows a contactless charging system that is an elaboration of the basic components and systems show in FIG. 1. The grayed blocks are components that are found in a basic contactless power system. The white boxes are components that enhance the performance of a typical contactless power system. It show a transmitter control 60 which can alter the phase, duty cycle, frequency, tank circuit impedance, or rail voltage depending on loading conditions. There is a detection circuit 61 that draws information from various parts of the circuit and feeds that information back into the controller 60. It show contactless communication links 62 on both the transmitter side 66 and receiver side 67. The communication link can work in conjunction with the detection mechanisms 61 to help the controller 60 make the most appropriate adjustments to the system. The receiver side 67 also has a controller 63 which can adjust the resonant frequency, duty cycle 65, or perform other functionality to regulate power being delivered to the load. A front end regulator 64 is added to provide an additional level of protection to the load.

Figure 7:
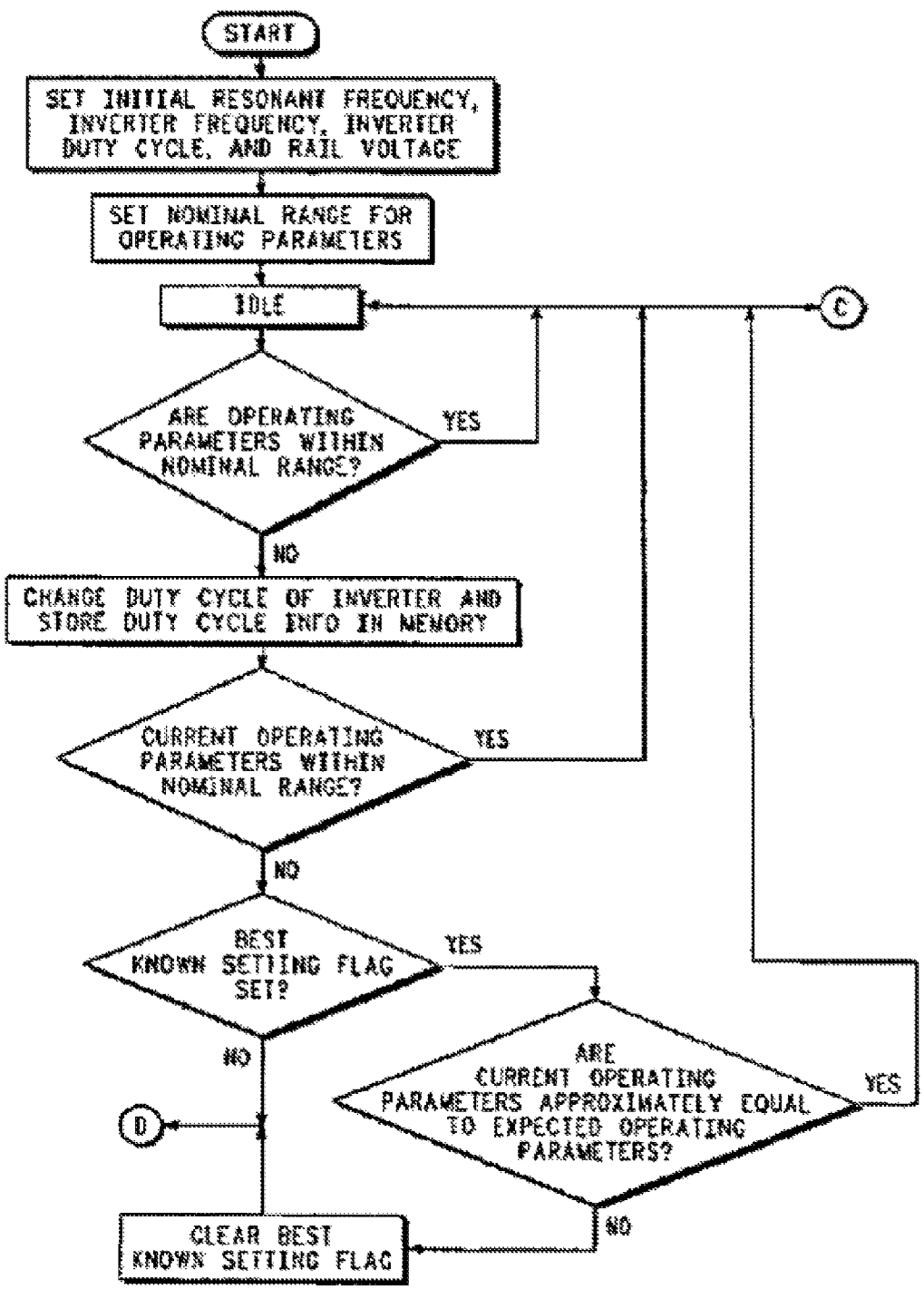
FIG. 7 shows a logic diagram, which is continued in FIG. 8, of a typical prior art contactless power system, including commonly proposed and implemented control functionality.
Figure 8:
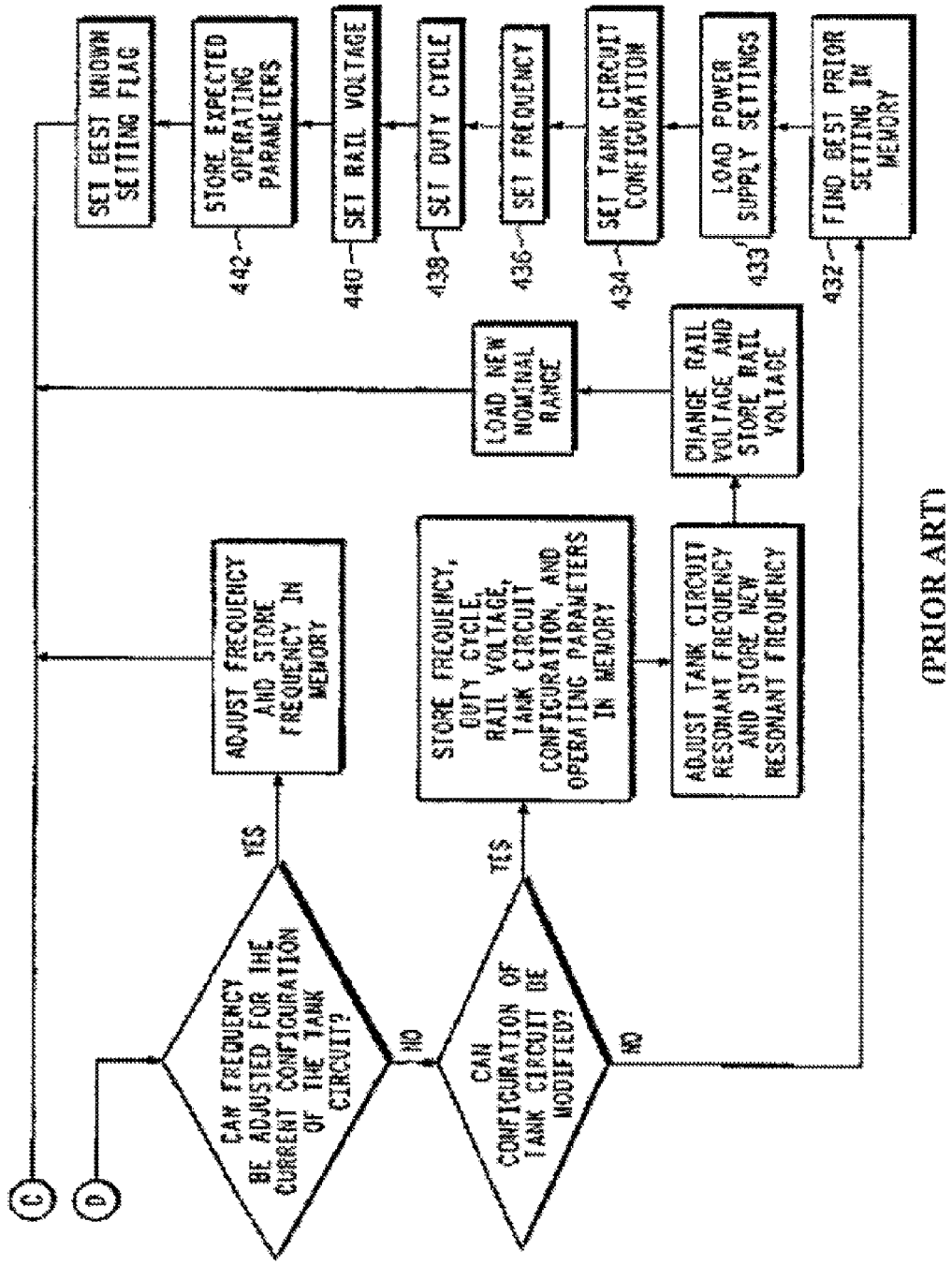
FIG. 8 shows a continuation of the logic diagram of FIG. 7.
Figure 9:
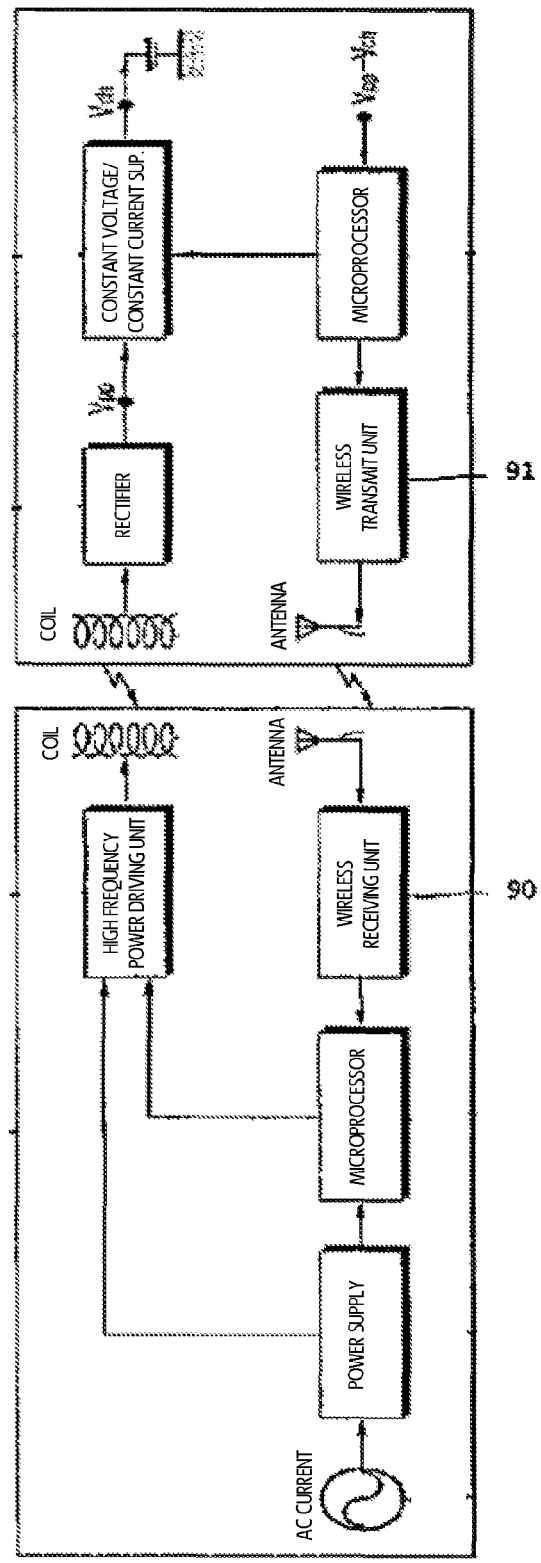
FIG. 9 shows a block diagram of a typical prior art wireless power system with communication capability.

With a system such as the one in FIG. 6 in place, designers can implement control logic such as that shown in FIG. 7 and FIG. 8 taken from a prior art system. We can see from FIG. 8 433, 434, 436, 438, 440, 442 some of the logic functionality that designers have built into contemporary contactless power systems. We can see from 432 that this system includes memory in order to achieve the desired functionality. FIG. 9 shows another prior art system that uses a communication mechanism 91 on the receiver and a communication mechanism 90 on the transmitter. The communication, logic, and use of memory add additional cost to the system and require a large number of sensing points to be considered.

Figure 10:
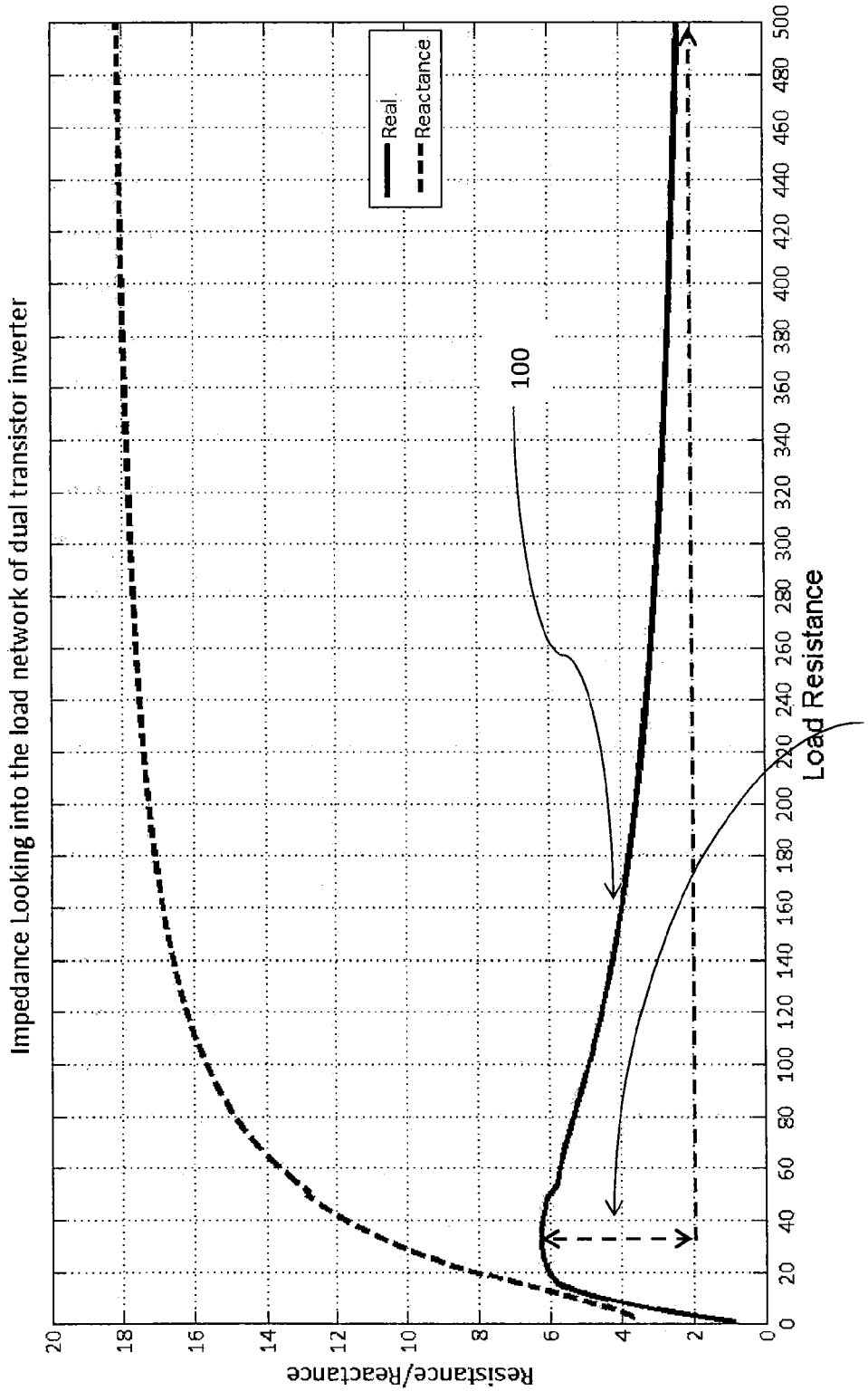
FIG. 10 shows the correlation between load resistance and the resistance looking from the inverter in accordance with an embodiment of the subject method, where the load resistance is transformed such that the resistance seen by the switch-mode supply is relatively constant, and in particular, the resistance from the supply is seen as between 2 and 6 ohms while the resistance of the load is varied from 5-500 ohms.

In order to stay within the high-efficiency operating region 20 and to match the power delivery of DC supply 41 several steps can be taken. FIG. 10 shows the resistance seen by the switch-mode supply 100 as it compares to actual load resistance. From 100, we can see that the resistance appears to vary from 2 to 6 ohms over a range from 5 to 500 ohms. This enables the switch-mode supply to stay in the high efficiency region 20 shown in FIG. 2, regardless of load resistance.

Compressing the resistance will not solve the problem of improper power delivery. FIG. 2 shows that if we keep the resistance in a narrowband, power output changes minimally. In fact, the compression would exacerbate the power delivery discrepancy shown in FIG. 4 where we see that power output response to load resistance from a switch-mode supply 42 does not match the power output response to load resistance from a constant voltage, DC supply. If too much power is delivered, the device may be destroyed, if too little is delivered it may not function.

Figure 11:
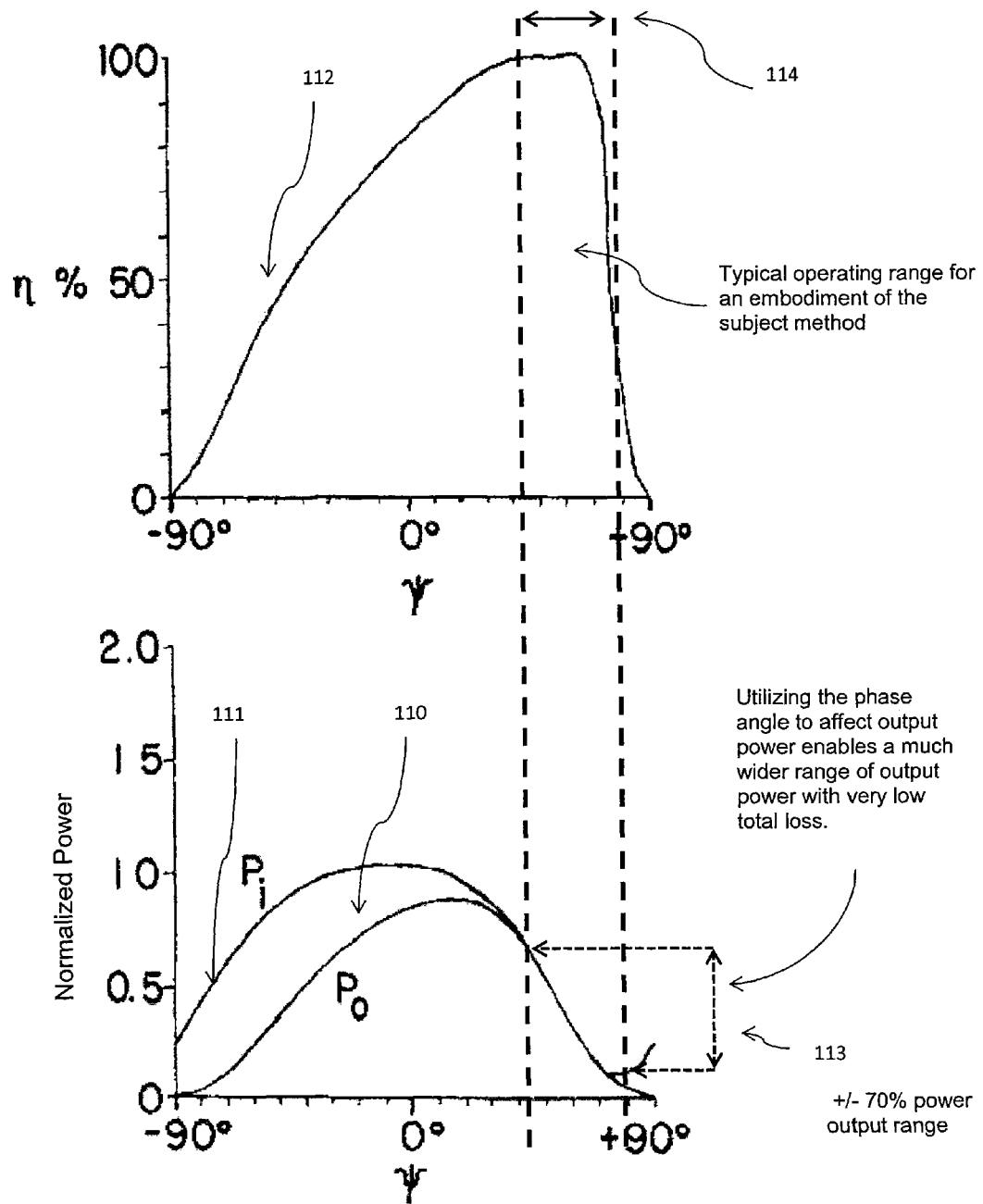
FIG. 11 shows the operating efficiency and power output of a class E inverter that is driving a fixed resistance with a phase angle ranging from −90 to 90 degrees, where the operating region for an embodiment of the invention is indicated.

In order to address the challenge, the phase angle of the load can be affected in order to affect the power output of the switch-mode supply, in accordance with embodiments of the invention. FIG. 11 shows, for class E inverters, that an increase or decrease in phase correlates with an increase or decrease in output power. Input power 111 and output power 110 matched closely for a phase angle in the range of about +45 to +80 degrees. Even though efficiency 112 drops considerably as the phase angle approaches +90 degrees, the absolute power lost remains low. The use of phase angle control enables a +/−70% usable range of output power 113 with very low absolute power loss.

Figure 12A:
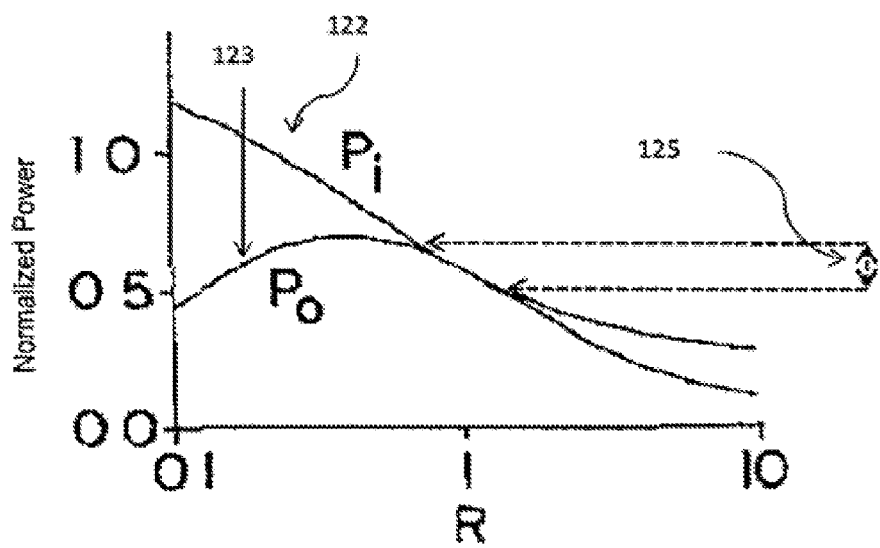
FIGS. 12A and 12B show the power output of a class E inverter in response to variable load resistance and variable phase, respectively, showing a calculation of output range and compares them against each other.
Figure 12B:
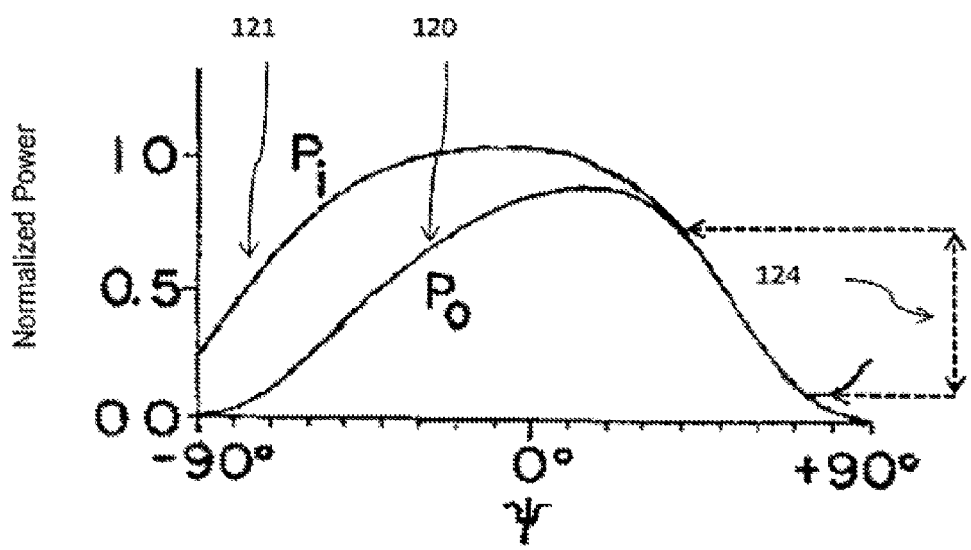

Embodiments of the invention use phase angle control to power a battery operated device. Conventional voltage regulators increase the resistance so that the power output of a DC supply is reduced 41. FIGS. 12A-12B show, for class E inverters, the difference between using traditional resistance controlled output power vs. using phase controlled output power in accordance with embodiments of the invention. Referring to FIG. 12A, in a resistance controlled scheme, input power 122 matches power out 123 for a very small dynamic range 125 of output power. This shows that varying the resistance is an ineffective way of controlling output power. The usable range of power levels for a resistance controlled scheme is only about +/−9% 125 of the center value. Outside of this range the high absolute losses are high and can create harmful heat and wear and tear on components. Referring to FIG. 12B, in a phase controlled scheme, input power 121 matches power out 120 for a much wider dynamic range of output power 124. This shows that varying the phase dramatically increases the output power range. The usable range of power levels is +/−70% 124 of the center value. Even though resistance may drop over this range, the absolute power losses are relatively low in this band 124. Efficiency can be low, but total dissipated power is very low. The low absolute power loss avoids the problem of overheating and device damage.

Figure 13:
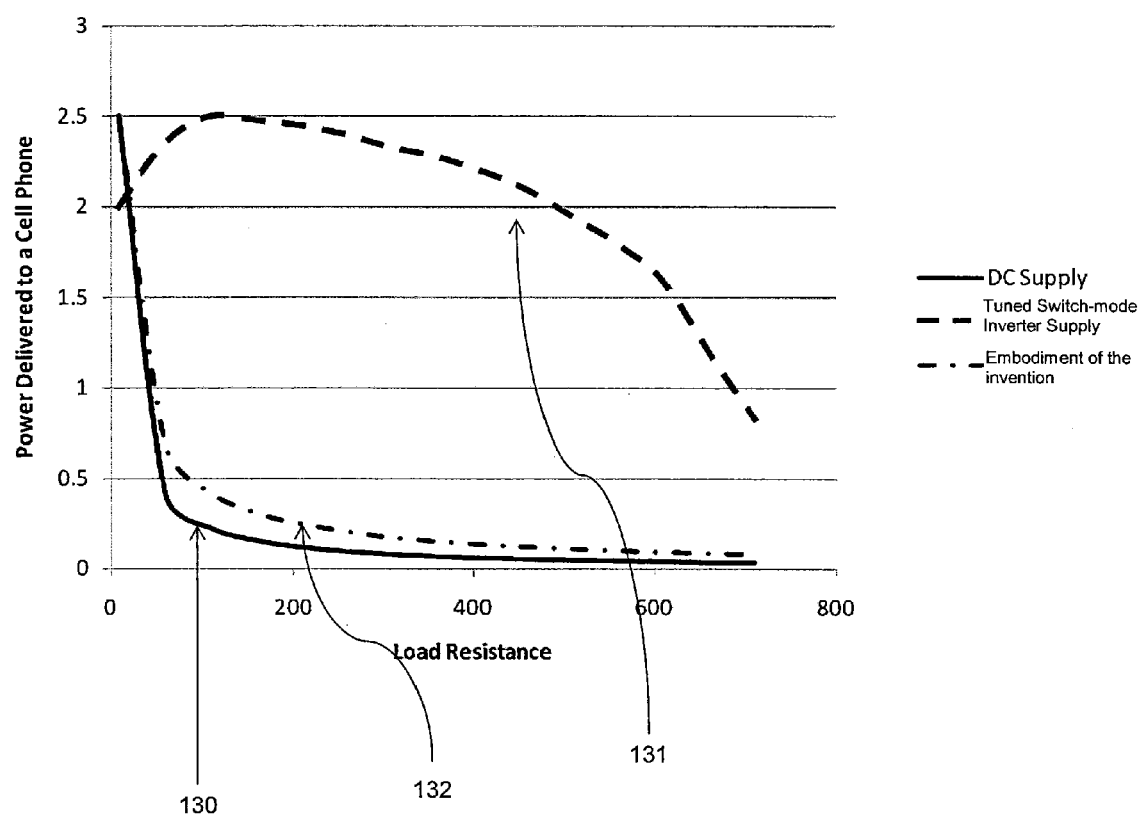
FIG. 13 shows the power delivered to a variable load resistance from three different sources: an inverter, a fixed voltage DC supply, and a switch-mode inverter operating in accordance with an embodiment of the invention.

By combining the resistance compression and the phase control, the contactless system can achieve a power output response to load resistance that is very similar to that of a conventional DC supply. FIG. 13 shows the power output response of a DC supply 130, an inverter 131, and an inverter in accordance with an embodiment of the subject method of operation 132. The output power in response to load resistance of the inverter in accordance with the embodiment of the subject method of operation 132 is much closer to the output power a device should expect from a constant voltage DC supply 130.

An additional challenge to designing and implementing a contactless power system is that multiple loads may draw power from a single source. This is problematic when different devices have different power requirements. For instance, a fully discharged cell phone may require 10-15 times the power of a fully charged cell phone. Embodiments of the subject method of operation can provide a mechanism to protect individual devices from damage if the power output exceeds the device requirement. Loads that no longer require power can be decoupled from the primary coil. De-coupling can include degradation in coupling efficiency so that the load is effectively isolated from the transmitter. This can be accomplished by using pre-existing voltage regulator behavior. As a voltage regulator increases the effective input resistance, coupling efficiency drops and vice-versa.

Figure 14:
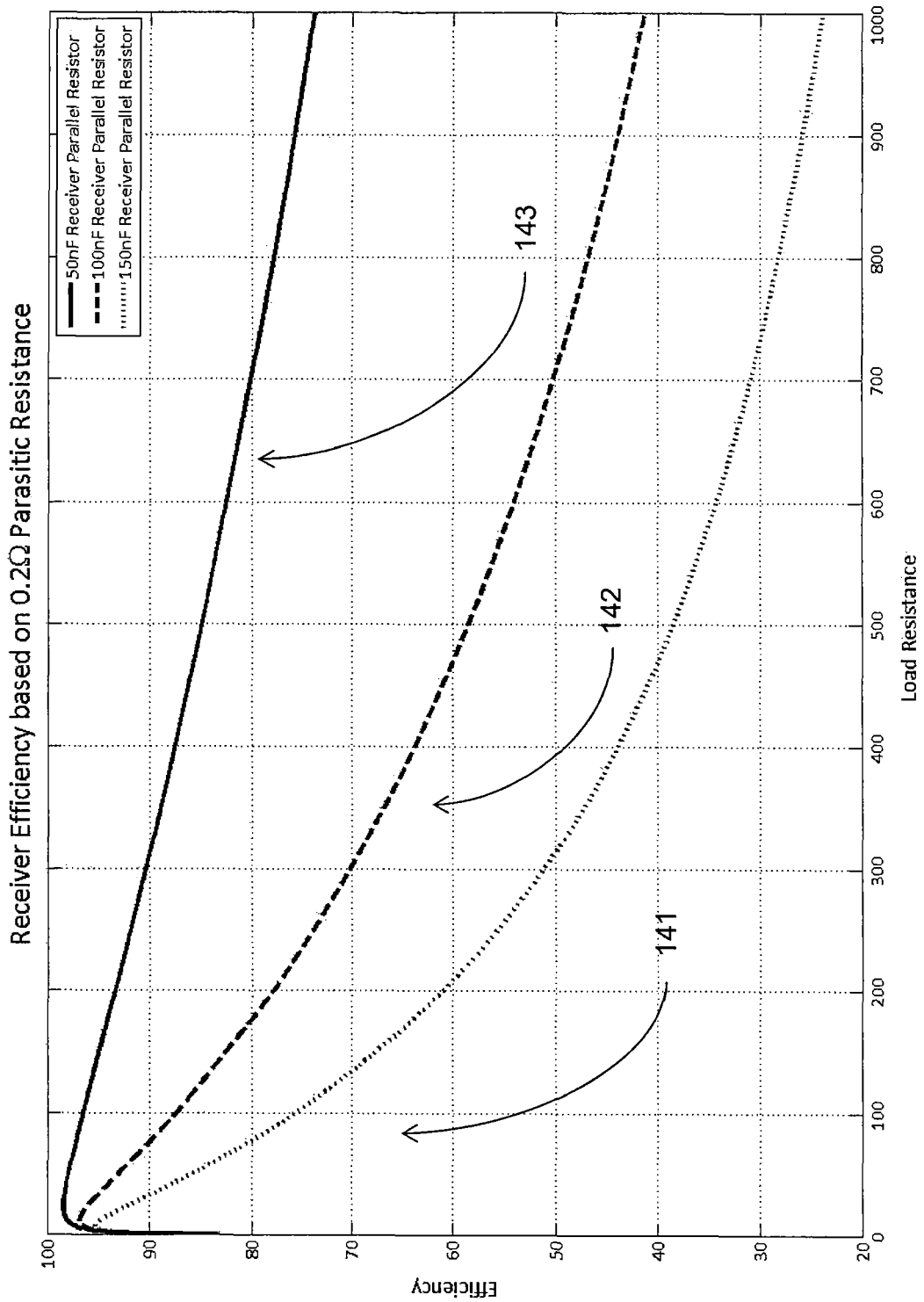
FIG. 14 shows the decoupling, or degradation of coupling efficiency between the load and the transmitter for various filter networks.

FIG. 14 shows the decoupling effect for various receiver circuits. A parallel capacitor can be selected to tune the decoupling point, which is the point when efficiency of receiver is at 50%. For this case, the decoupling point for 100 nF capacitor is at 700Ω, whereas the decoupling point for 150 nF capacitor is at 320Ω. We can see that for various configurations 141, 142, 143 the rate of decoupling occurs at varying rates. 143 shows a curve that is a good fit for a single device charger that can regulate power output from the transmitter. 141 shows a curve that is good fit for a multi-device charger where individual loads may need to be isolated from the source. Although not shown in FIG. 14, when the capacitor valve is changed the power received is also changed.

In order to accomplish this method of operation without any communication and control functionality, other than the pre-existing control found in today's voltage regulators, embodiments of the subject system can use a series of carefully tuned transformation networks that transform, compress, and shift the impedance of the load. Through these filter networks the resistance can be compressed, the phase angle manipulated, and the loads allowed to decouple from the primary.

Example 1

A high power, high-efficiency contactless power transfer system using the impedance transformation network and has been designed and fabricated using the subject impedance transformation network. The contactless transfer system requires minimal control to achieve the desired power delivery profile across a wide range of load resistances, while maintaining high efficiency to which helps to prevent overheating of components. This embodiment of the subject system includes more than one active device with independent gate drive to control power delivery. The system is able to achieve power delivery of 295 W to a load of 50Ω with a DC voltage of 121.5V and current of 2.43 A. The input current was current-limited at 3.25 A. The system efficiency at maximum power output is 75.7%. The system operates at a minimum of 77% efficiency across load resistances ranging from 60 to Ω 140Ω which corresponds to a high output power state. The system can be scaled to achieve higher output power if the current limit is removed. Higher efficiency and better power delivery can be achieved by using components with lower parasitic resistance.

The DC source voltage is the 600 W CSI12005S power supply by Circuit Specialists, Inc rated at 120V at 5 A. The active devices are transistors, specifically the transistors are part IRFP21N60L from International Rectifier.

Figure 57:
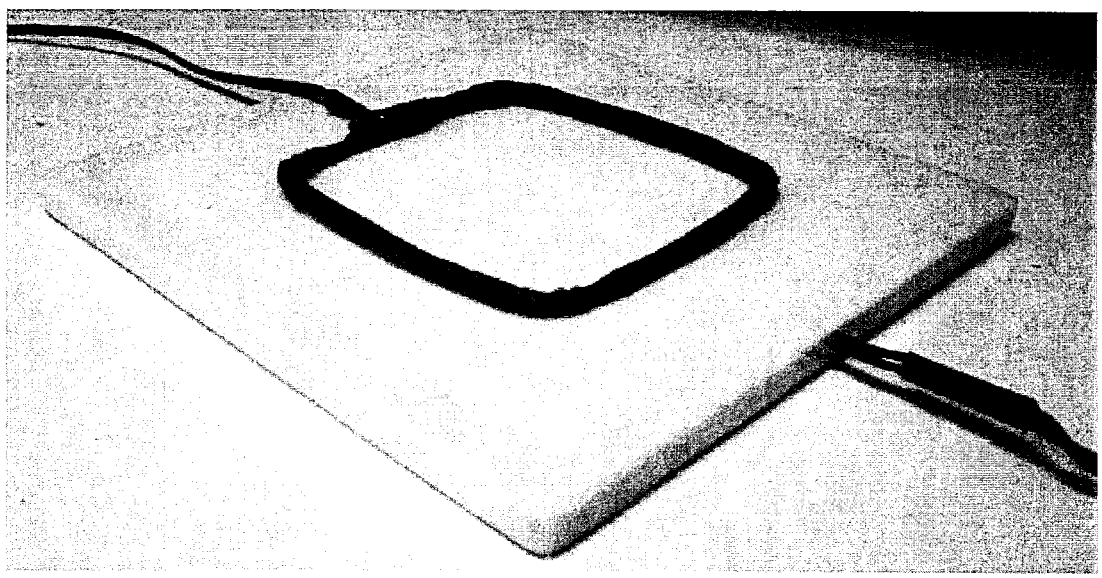
FIG. 57 shows a primary coil—10 turns (embedded into the table top) and secondary coil—5 turns (taped up).

A pair of coils was fabricated using 16 AWG magnet wire for the set-up. The primary coil is 21 cm by 21 cm with 10 turns with variable spacing between turns while the secondary coil is 13 cm by 13 cm with 5 turns wound along the same path. FIG. 57 shows the primary coil embedded in plastic with the secondary coil placed on top. The primary and secondary coils are separated by a gap of 10 mm. The primary coil is designed with the appropriate spacing between the turns to achieve only 5% power variation of the received power at all different locations. In this example, the coupling is approximately constant regardless of the receiver position provided that the entire secondary coil is within the outer perimeter of the primary coil. The self inductance of the primary coil is 31.95 μH with a parasitic resistance of 0.32Ω and secondary coil is 12.52 μH with a parasitic resistance of 0.2Ω. Mutual inductance between the coils is 7.454 uH with a coupling coefficient of 0.373. The measurements were taken using the HP4192A LF Impedance Analyzer.

Figure 56:
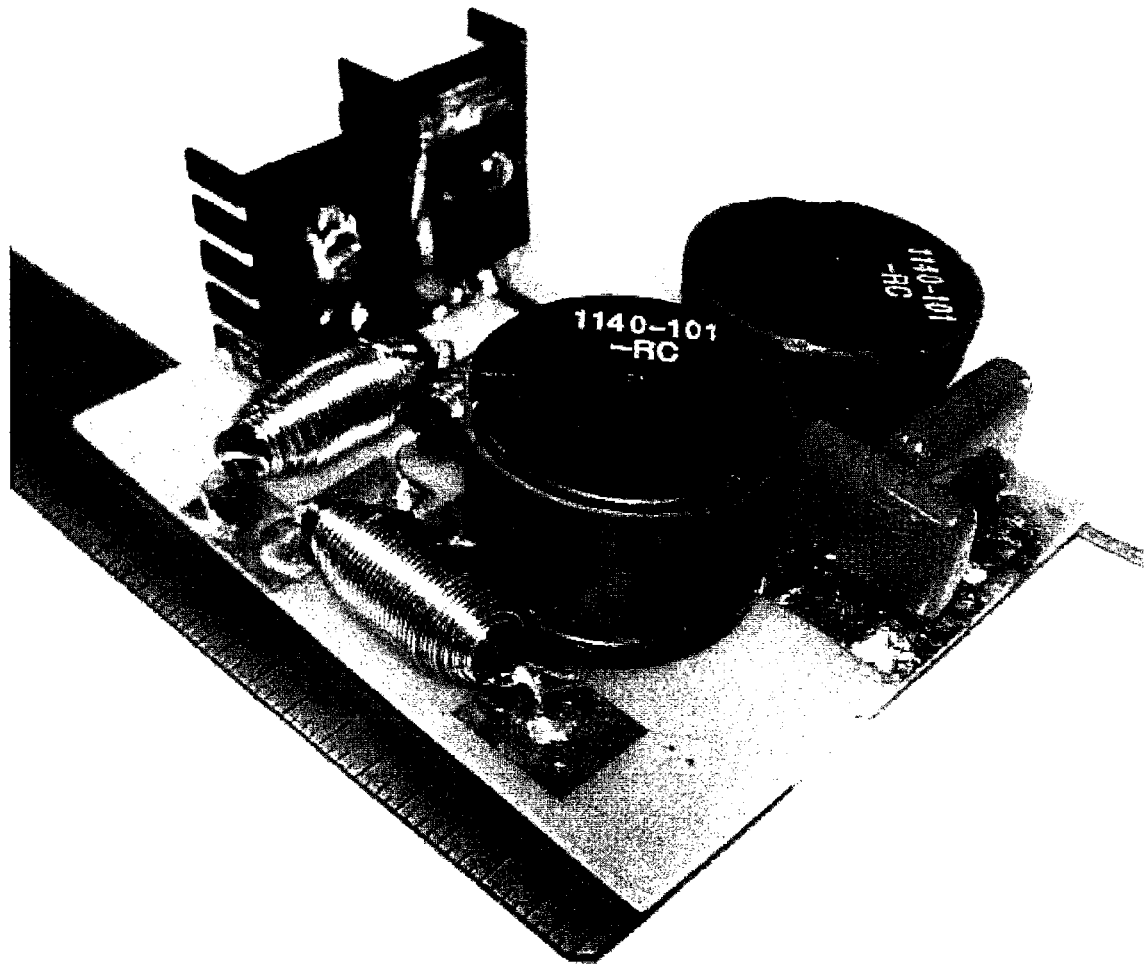
FIG. 56 shows a dual channel class E driver.

In order to reduce losses through parasitic resistance, low loss Polypropylene capacitors are used. In order to strike a balance between size and efficiency, 1140-101K-RC by Bourns Jw Miller is selected to be $L_{out}$. Since most of the losses of the transmitter are from the parasitic resistance of $L_{out}$, a larger and more efficient inductor can be replaced, if space permits. The fabricated dual channel driver with a dimension of 10 cm×8.5 cm is shown in FIG. 56. There are a lot of empty spaces; therefore its size can be further reduced. $L_{out}$ takes up a significant amount of space due to the requirement for low parasitic resistance so as to maintain sufficiently high efficiency and power delivery.

Figure 58:
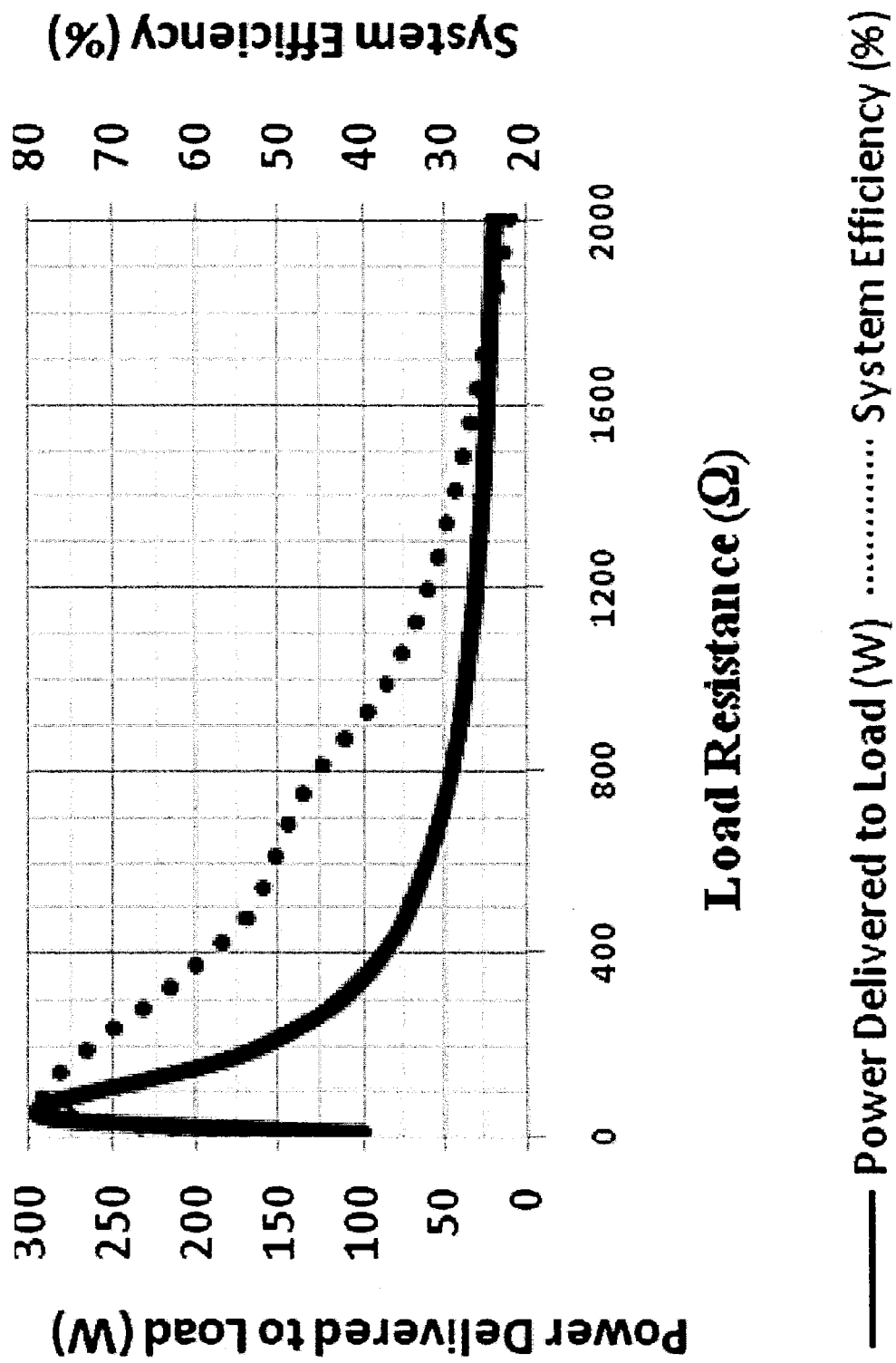
FIG. 58 shows a power delivery and efficiency of 120V system with a peak power of 295 W.

Peak drain voltage is only 460V, which is approximately 25% lower than the rated voltage of the transistor used. FIG. 58 shows the efficiency and power delivery of the 120V system with respect to load resistance. The power delivery of the system can be scaled by varying the supply voltage as long as the DC power supply driving system is able to provide sufficient power and the drain voltage across the transistor stays within its breakdown voltage.

Figure 62A:
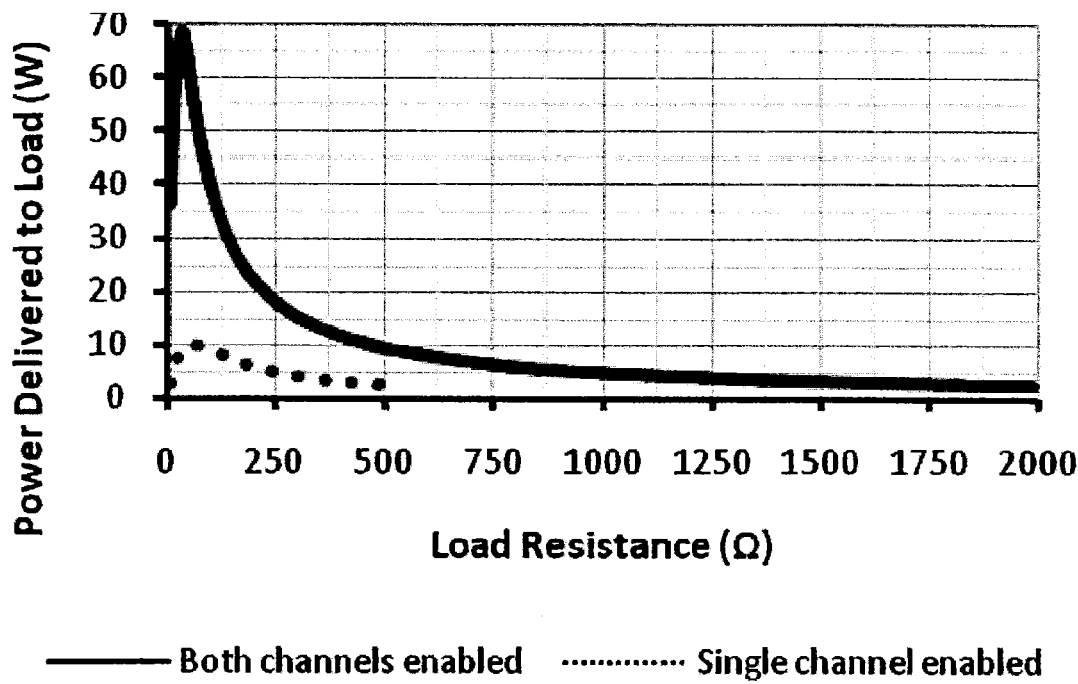
FIGS. 62A-62B show power delivered to load with respect to load resistance. Peak power occurs at approximately 50Ω load resistance for dual channel at 69 W for dual channel and 75Ω for single channel at 10 W for single channel.
Figure 62B:
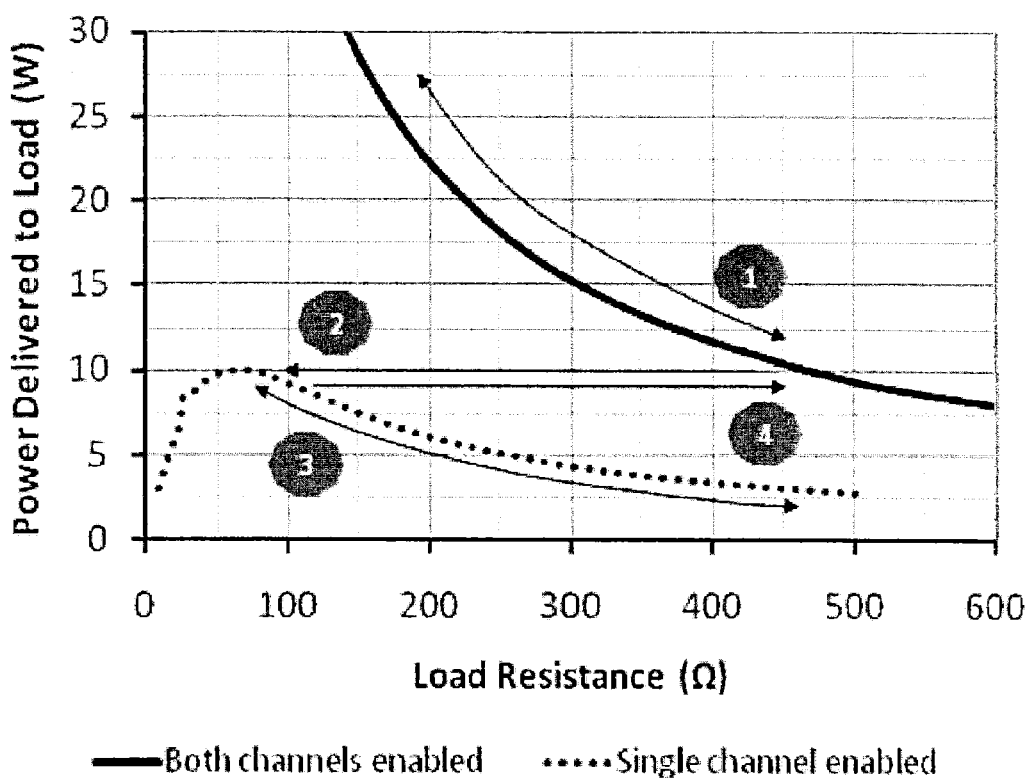
Figure 63:
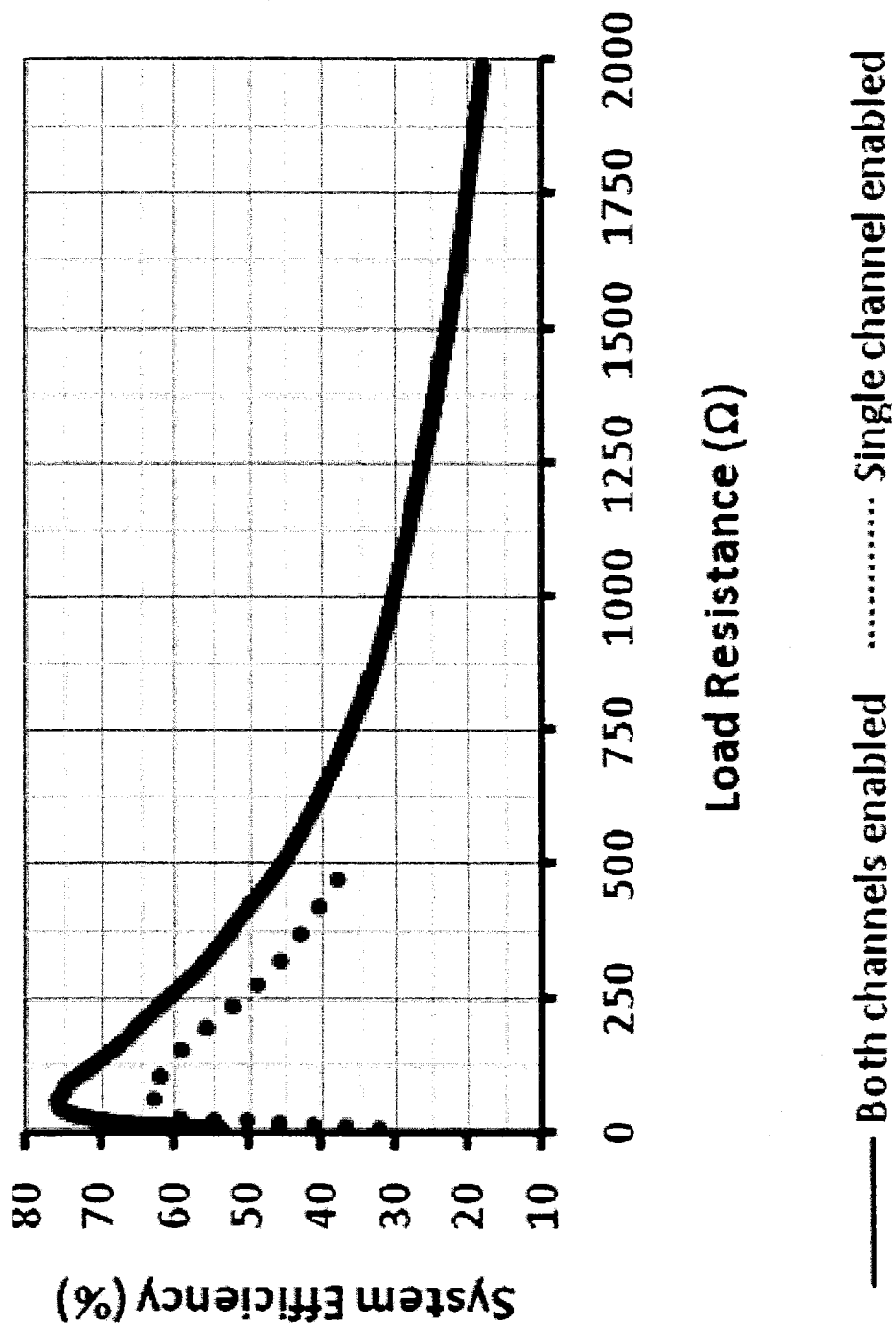
FIG. 63 shows system efficiency with respect to load resistance with both peak efficiency of 64.5% for single channel and 76% of dual channel at approximately 70Ω load resistance.
Figure 64:
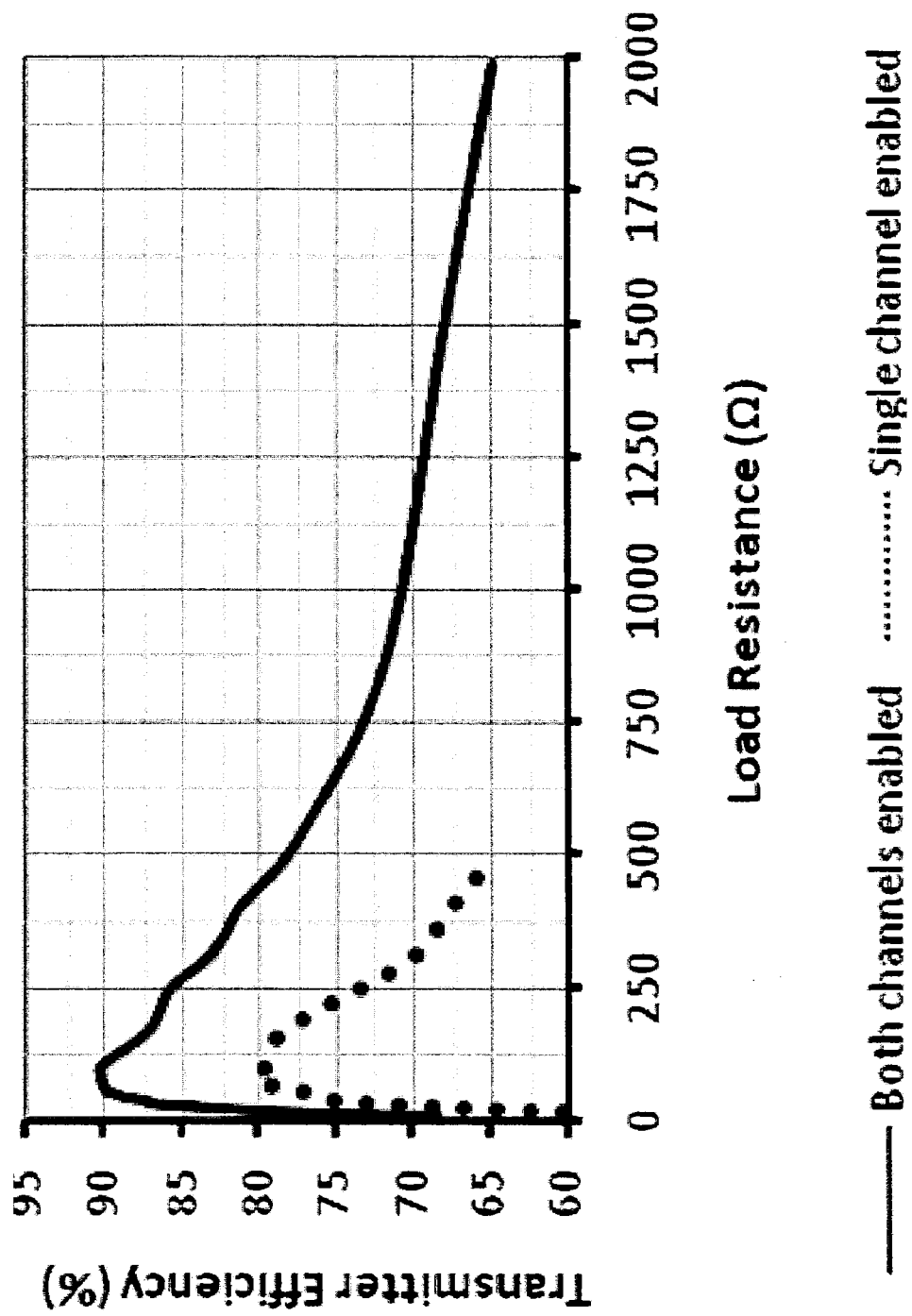
FIG. 64 shows transmitter efficiency with respect to load resistance. Peak transmitter efficiency occurs across the band of 60Ω to 100Ω load resistance at 90% for dual channel and 79% for single channel.
Figure 66:
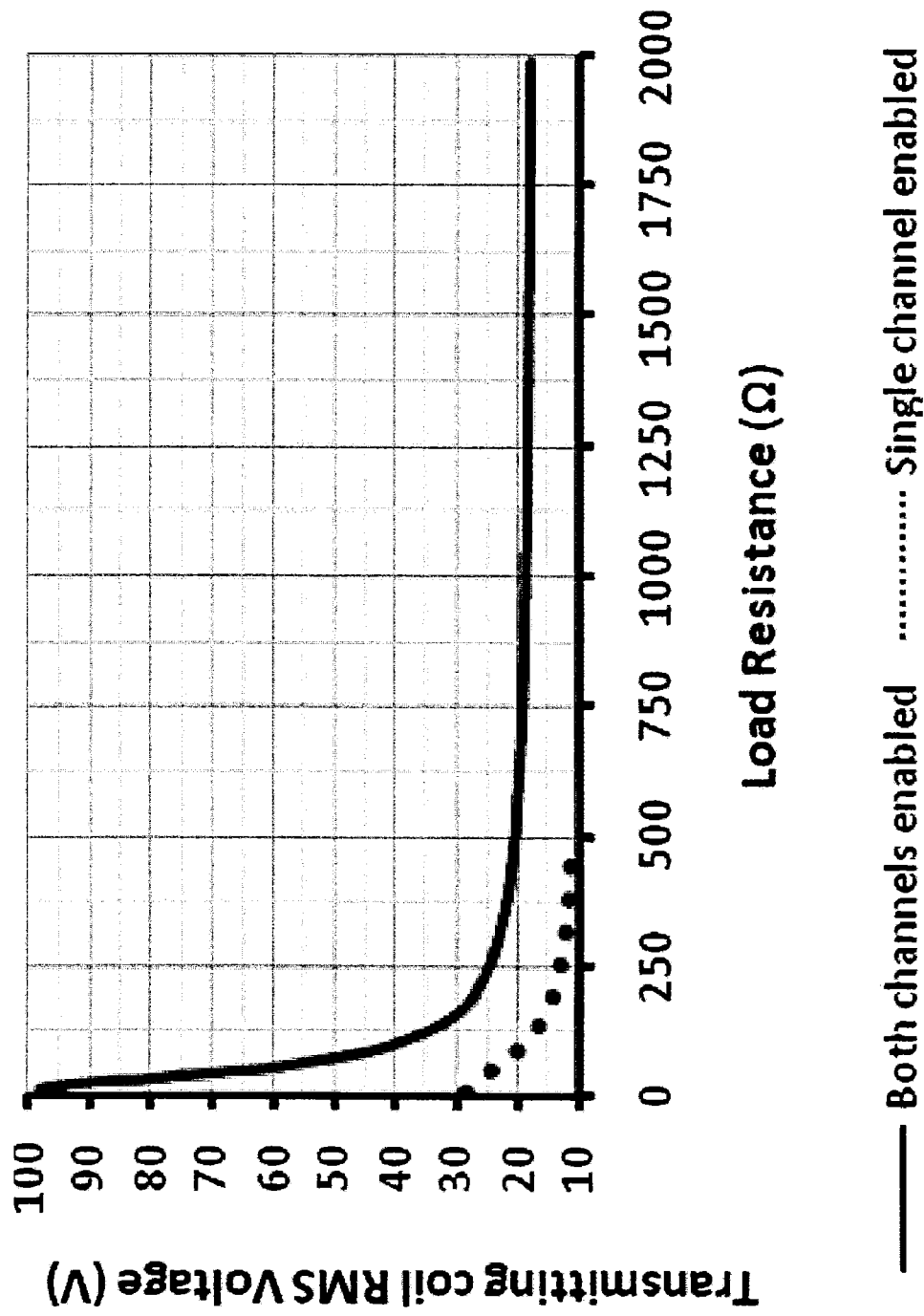
FIG. 66 shows primary coil RMS voltage having a unique load resistance for each value.
Figure 67:
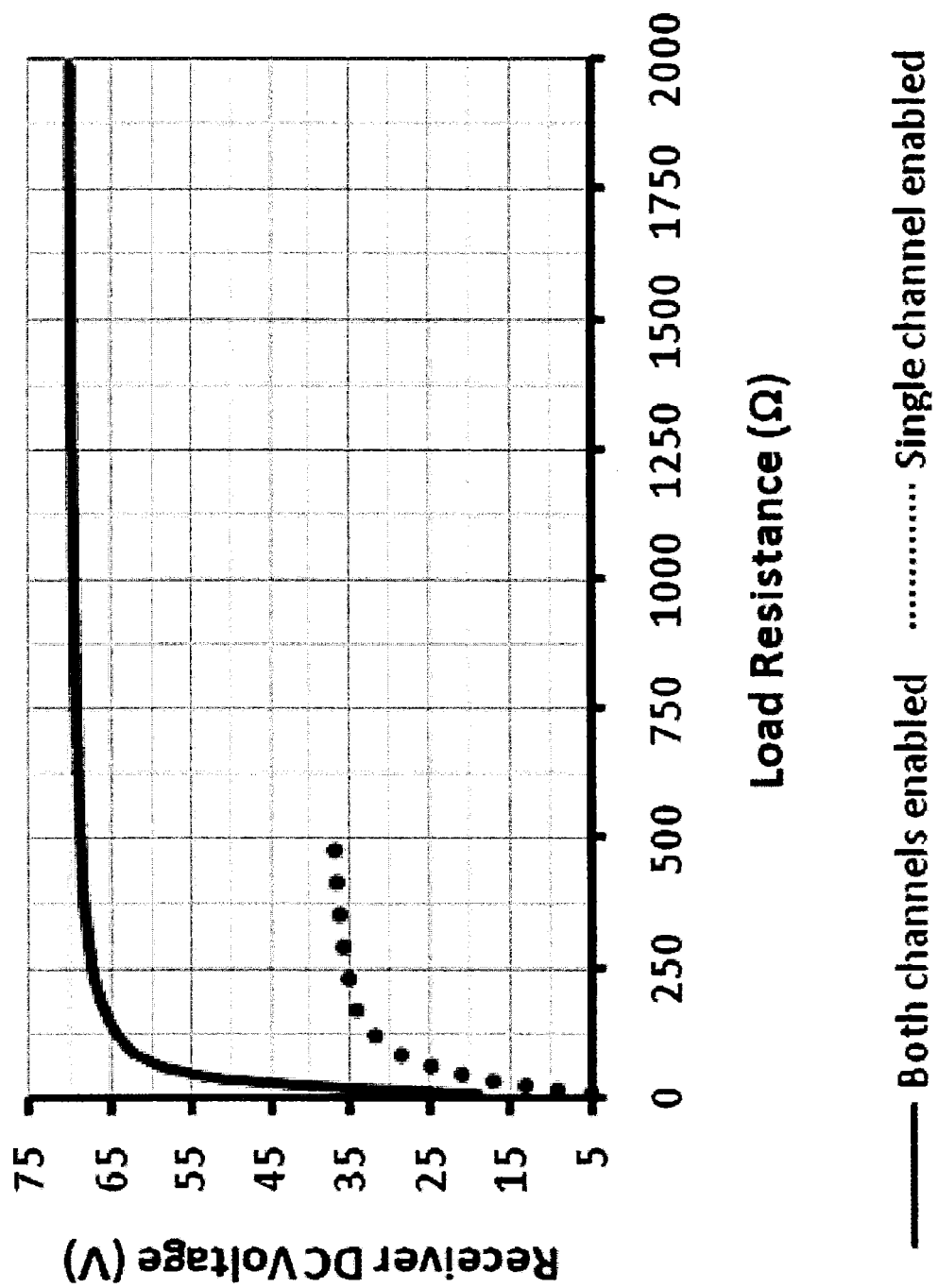
FIG. 67 shows receiver DC voltage converging to approximately 70V for dual channel and 37V for single channel.

The efficiency of the single channel is approximately 10-15% lower for the same load resistance because the current is flowing through a single $L_{out}$ inductor instead of a pair of them, which means the parasitic resistance is doubled, thus resulting in a low system and transmitter efficiency as shown in FIG. 63 and FIG. 64, respectively. However, when the system goes into light load mode or trickle charge mode, it would be desirable to go into the single channel mode. It can be seen from FIG. 65 that the system efficiency is approximately 15% higher than the dual channel mode for delivering the same amount of power below 10 W. Instead of operating at high load resistance for a dual channel mode resulting in high receiver DC voltage as shown in FIG. 67, it is possible to achieve similar power delivery at much lower load resistance for a single channel mode resulting in lower receiver DC voltage as lower load resistance would result in higher system efficiency. In addition, a typical buck regulator has higher DC-DC efficiency when the input voltage is lower. Therefore, a load resistance detection scheme can be used to determine the switch over point from dual channel to single channel. It can be seen from FIG. 62 that a power delivery of 10 W occurs at 500Ω load resistance of the dual channel mode making it a good switch over point. It can be concluded that a 500Ω load resistance would translate to an approximate primary coil RMS voltage of 20V for the dual channel mode as shown in FIG. 66. Likewise, if the power requirement for the single channel mode is too high, it can be switched to dual channel mode. It can be inferred from FIG. 62 that the switch over point would be approximately 75Ω, which translates to a RMS coil voltage of 22V from FIG. 65. The coil voltage can be read using an ADC where the DC voltage at the input of the ADC can be transformed from the coil voltage by rectification and stepping down using a potential divider.

Figure 42:
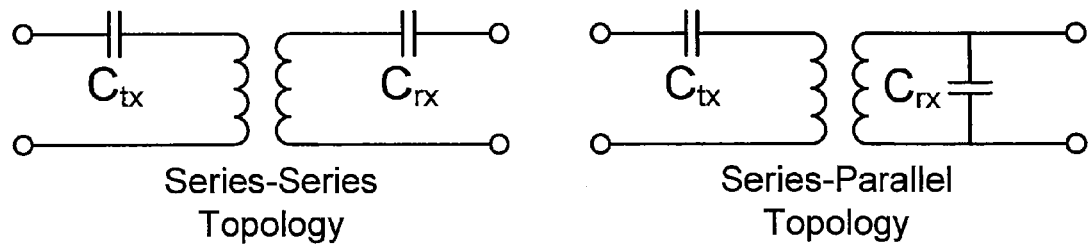
FIG. 42 shows some of the possible topologies for a single-element transformation network.
Figure 43:
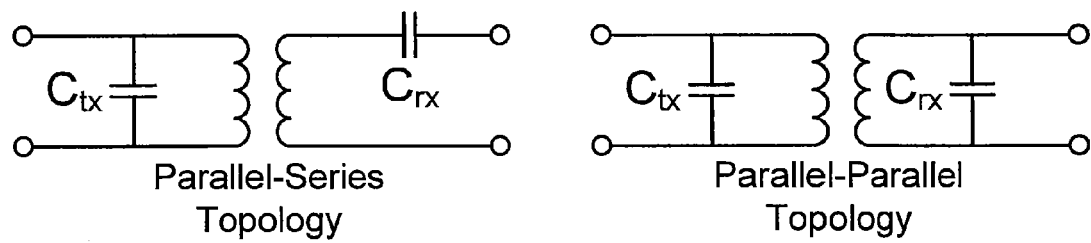
FIG. 43 shows some of the possible topologies for a single-element transformation network.

In a specific embodiment, for size and efficiency considerations, capacitors can be used for the network. This is because resistors dissipate power and a low loss inductor would be large in size. Alternative embodiments can incorporate resistors and inductors. Although, a multi-element transformation network might achieve a more appropriate response, for simplicity and low components count, an embodiment of the system uses a single-element transformation network. Four topologies are shown in FIGS. 42 and 43.

A series capacitor only introduces a negative reactance and does not change the real part of the impedance. A parallel capacitor affects both the real and imaginary part of the impedance. For simplicity, the receiver input impedance can be modeled using a variable resistor load such that equation (7) illustrates the transformation performed by the parallel capacitor.

$$Z_{rx} = \frac{R}{1+\omega^2 C^2 R^2} - j\frac{\omega C R^2}{1+\omega^2 C^2 R^2} \qquad (7)$$

Equation (7) shows that the resistance is "compressed" non-linearly by a factor of $1/(1+\omega^2 C^2 R^2)$. Thus, the effective resistance decreases with increasing load resistance. At high load resistance, the transformed resistance is small. Therefore, a significant part of the power received is dissipated across the secondary coil as heat. This phenomenon is actually desirable if the receiver is in a state that requires very little power or during trickle charge. Therefore, it has a "decoupling" effect regulating the power delivery with increasing load resistance. However, this should preferably occur only when the transmitter is designed to use limited power at this state of operation as heating would become an issue if too much power is being dissipated across the secondary coil. By using a parallel capacitor, a reactive term can be introduced. The reactive term decreases nonlinearly from null with increasing load resistance with an asymptote of $-1/\omega C$, which can be useful in compensating the secondary coil inductance.

From equation (6) it can be observed that the resistance looking into the transmitter coil can be reduced significantly with the increase of resistance looking from the receiver coil into the receiver. Due to loose coupling between the coils, the resistance looking into the primary coil can be further reduced as the mutual inductance can be relatively low. If the total resistance looking into the primary coil is comparable to the parasitic resistance of the primary coil, limited power is transmitted to the receiver as most of the power would be dissipated across the primary coil as heat. Therefore, it would be preferred for a power transmission via loosely coupled coils to have a parallel capacitor on the secondary coil. By substituting equation (7) into equation (6), $$Z_{tx} = \left( \frac{\omega^2 M_{12}^2 \left( \frac{R}{1+\omega^2 C^2 R^2} \right)}{\left( \frac{R}{1+\omega^2 C^2 R^2} \right)^2 + \left( \omega M_{22} - \frac{\omega C R^2}{1+\omega^2 C^2 R^2} \right)^2} \right) + j\left( \omega M_{11} - \frac{\omega^2 M_{12}^2 \left( \omega M_{22} - \frac{\omega C R^2}{1+\omega^2 C^2 R^2} \right)}{\left( \frac{R}{1+\omega^2 C^2 R^2} \right)^2 + \left( \omega M_{22} - \frac{\omega C R^2}{1+\omega^2 C^2 R^2} \right)^2} \right) \quad (8)$$

For the transmitter transformation network, a series or parallel topology can be used. However, to maintain an ideal efficiency above 95%, the allowable variation of load resistance of an ideal class E inverter can be kept within +55% and −37% [F. H. Raab, "Effects of circuit variations on the class E tuned power amplifier," *IEEE Journal of Solid-State Circuits*, vol. 13, pp. 239-247, April 1978.]. Therefore, if the variation of resistance with respect to load resistance looking into the transmitter is too large, it can be preferable to use a parallel capacitor instead of a series capacitor. A capacitor value can be selected that ensures that the transmitter would not suffer immediate failure when there is no secondary coil as well as having an increasing reactance trend with increasing load resistance. Having an increasing reactance trend with increasing load resistance can ensure the preferred power delivery trend.

Figure 15:
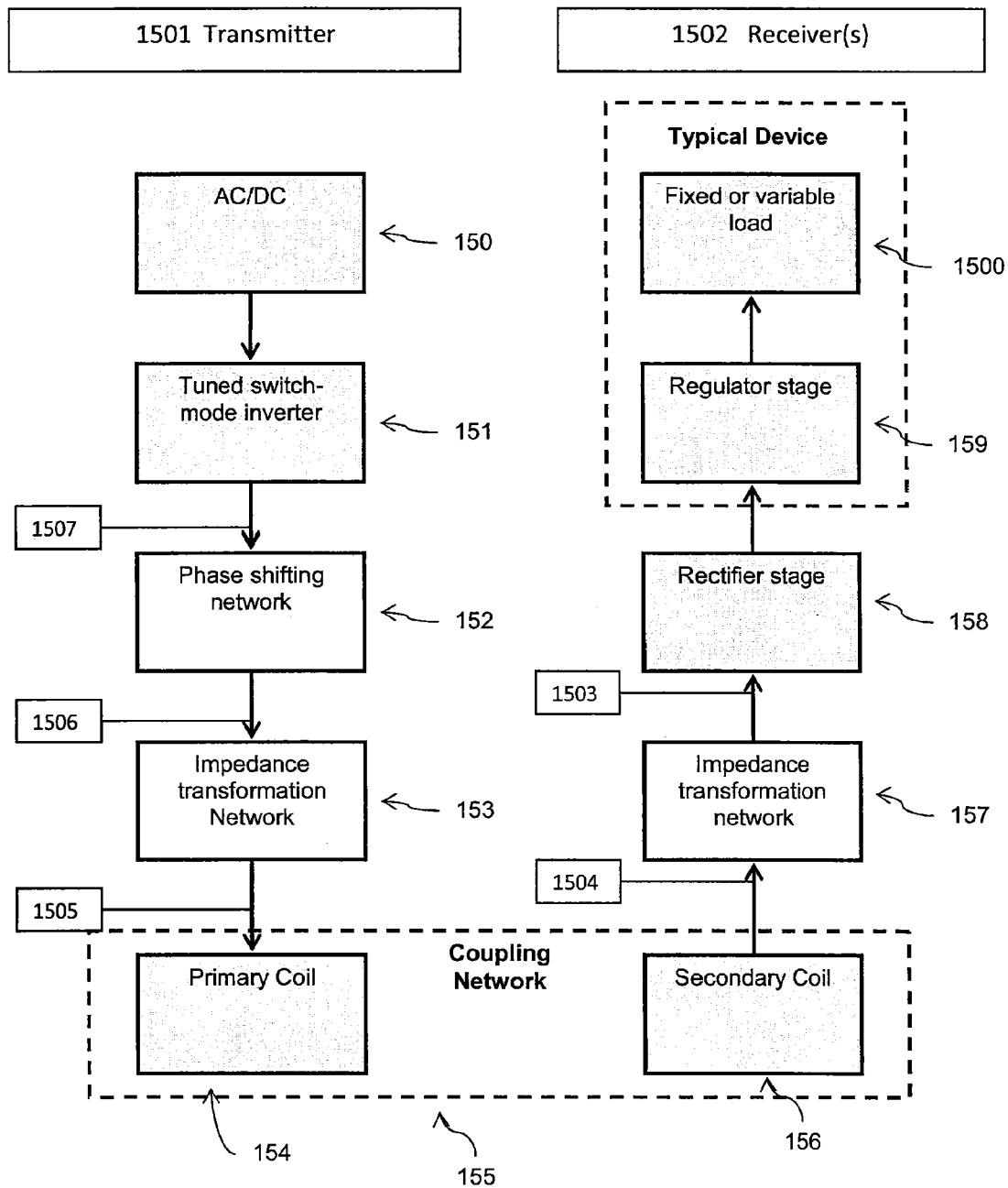
FIG. 15 shows a block diagram of a system in accordance with an embodiment of the subject invention, where the block diagram shows the direction of power flow and the various networks that can be used.

FIG. 15 shows an example configuration of a system that can work in this mode of operation in accordance with an embodiment of the subject invention. Other circuit configurations can also be utilized to work in this mode of operation in accordance with the subject invention. The transmitter 1501 and receiver 1502 include grayed boxes, which include an AC/DC converter 150, switch-mode inverter 151, primary coil 154, secondary coil 156, rectifier stage 158, regulator stage 159, and load 1500, are components of a typical contactless power system, for example, as shown in FIG. 1. In order to achieve the method of operation in accordance with the subject invention, this system uses four transformation networks, including receiver-side impedance transformation network 157, coupling network 155, transmitter-side impedance transformation network 153, phase shift network 152. Measuring the impedance at probe points looking into the rectifier stage 1503, receiver-side impedance transformation network 1504, primary coil 1505, transmitter-side impedance transformation network 1506, and phase shift network 1507, facilitate a better understanding of the operation.

Figure 16:
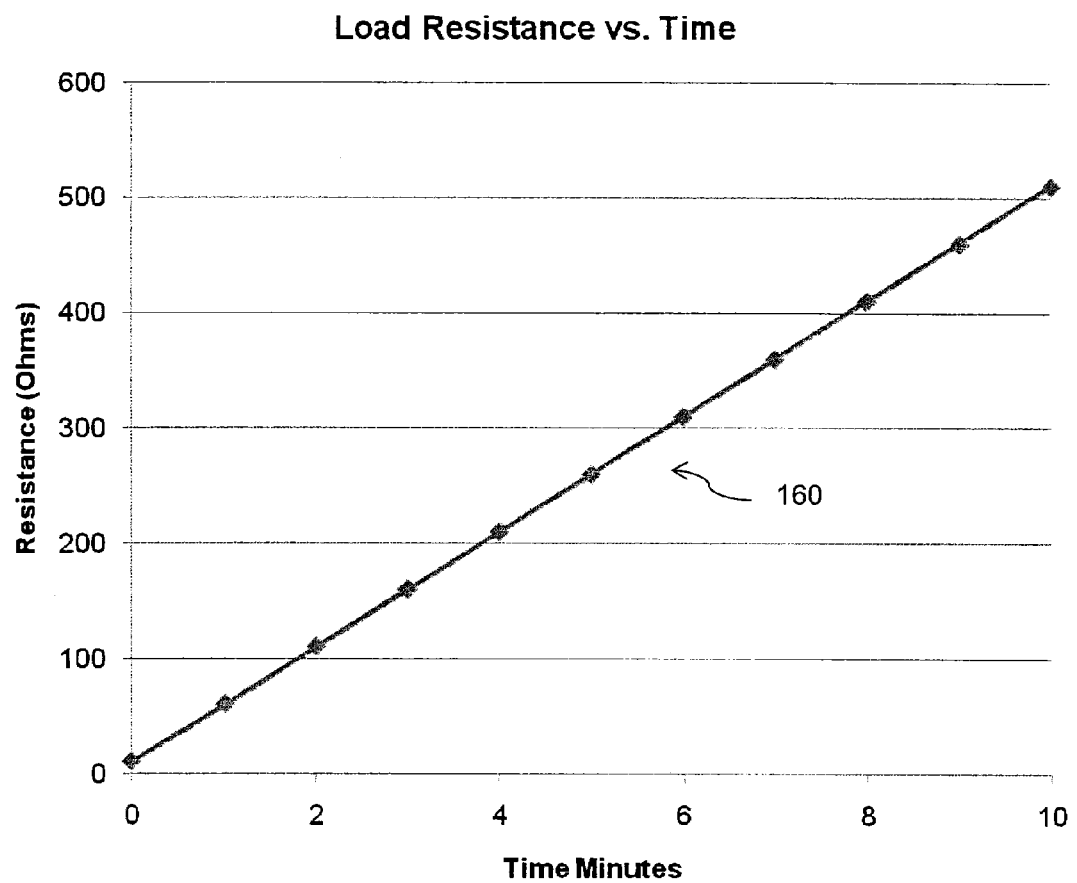
FIG. 16 shows a typical load resistance vs. time plot as seen from the input of a rectifier feeding into a device.

FIG. 16 shows a simulated load resistance vs. time 160 measured looking into the rectifier stage from probe 1503. The swing from 0-500 ohms is well outside usable operating range of an inverter 20 and 31, shown in FIG. 2 and FIG. 3, respectively. It would be desirable to compress the resistance into a useable operating range 20, 31. At this stage there is no reactive component which is introduced by the impedance transformation network 157 in order to use the phase angle method of power control in accordance with embodiments of the invention.

Figure 17:
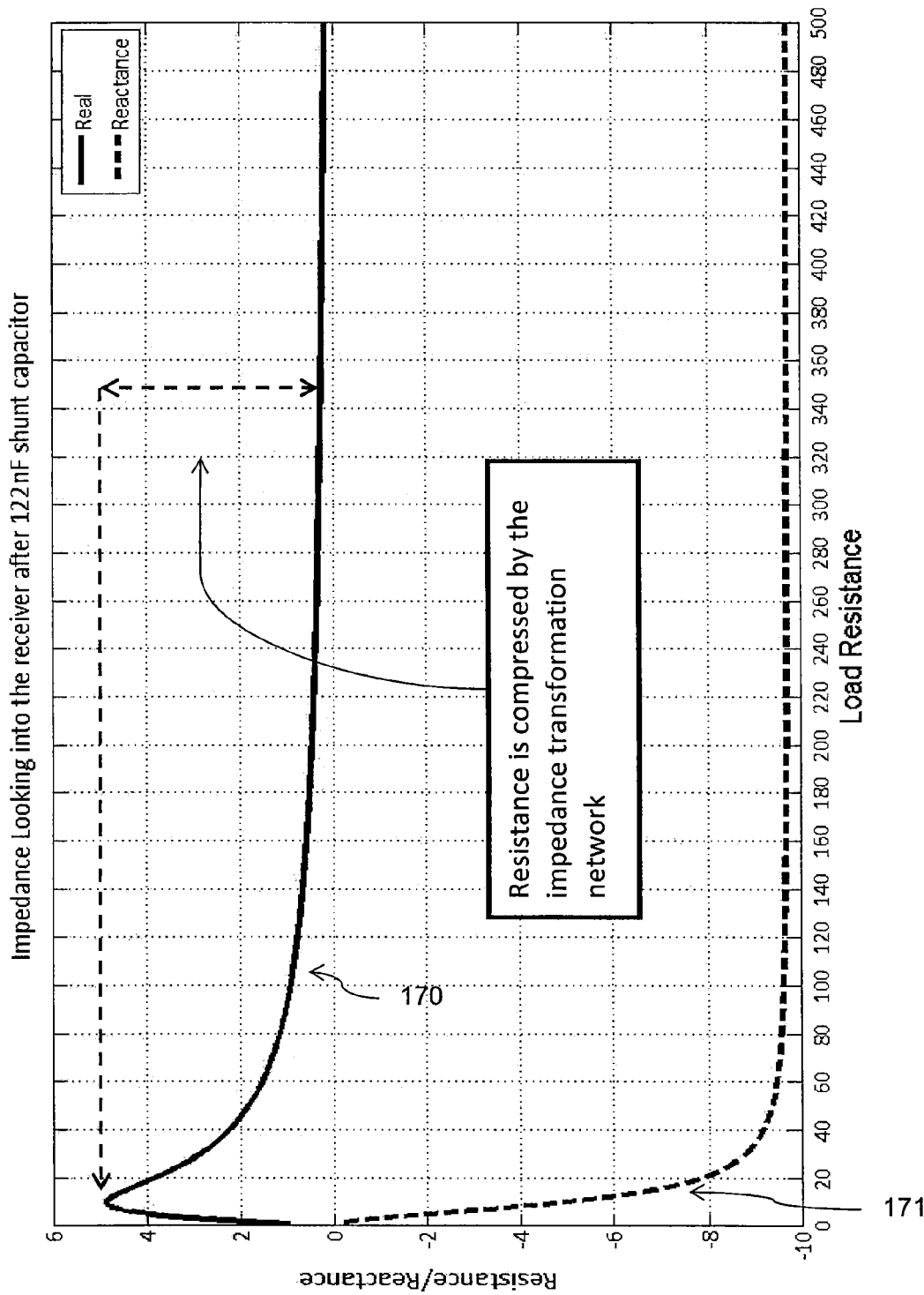
FIG. 17 shows the real and reactive components of the impedance as seen looking into the receiver side impedance transformation network, where the impedance characteristic at this point is measured from a system operating in accordance with a preferred embodiment of the invention.

FIG. 17 shows the transformed load resistance 170 looking into the receiver-side impedance transformation stage from probe 1504. The objective of this stage is to achieve the decoupling effect shown in FIG. 14. This decoupling effect is automatic decoupling where the degradation of coupling efficiency between the contactless power transmitter and the load(s) effectively decouples the receiver from the transmitter. FIG. 17 also shows the reactive component 171 introduced by the impedance transformation network 157. The introduction of the reactive component 171 compresses the resistance looking into the receiver in order to stay within the useable operating range of the inverter identified in FIG. 2. Additional reactive components will be further added on the transmitter side for implementing the phase-angle method of control in accordance with the invention. At this stage the reactive component 171 decreases with respect to load resistances, which means that phase angle is decreasing with respect to load resistance. From FIG. 11, we can see that the working range 114 requires an increase in phase angle for inductive load, to reduce power output. Impedance transformation networks 153 on the transmitter side can compensate from the phase angle introduced by the impedance transformation network 157.

Figure 18:
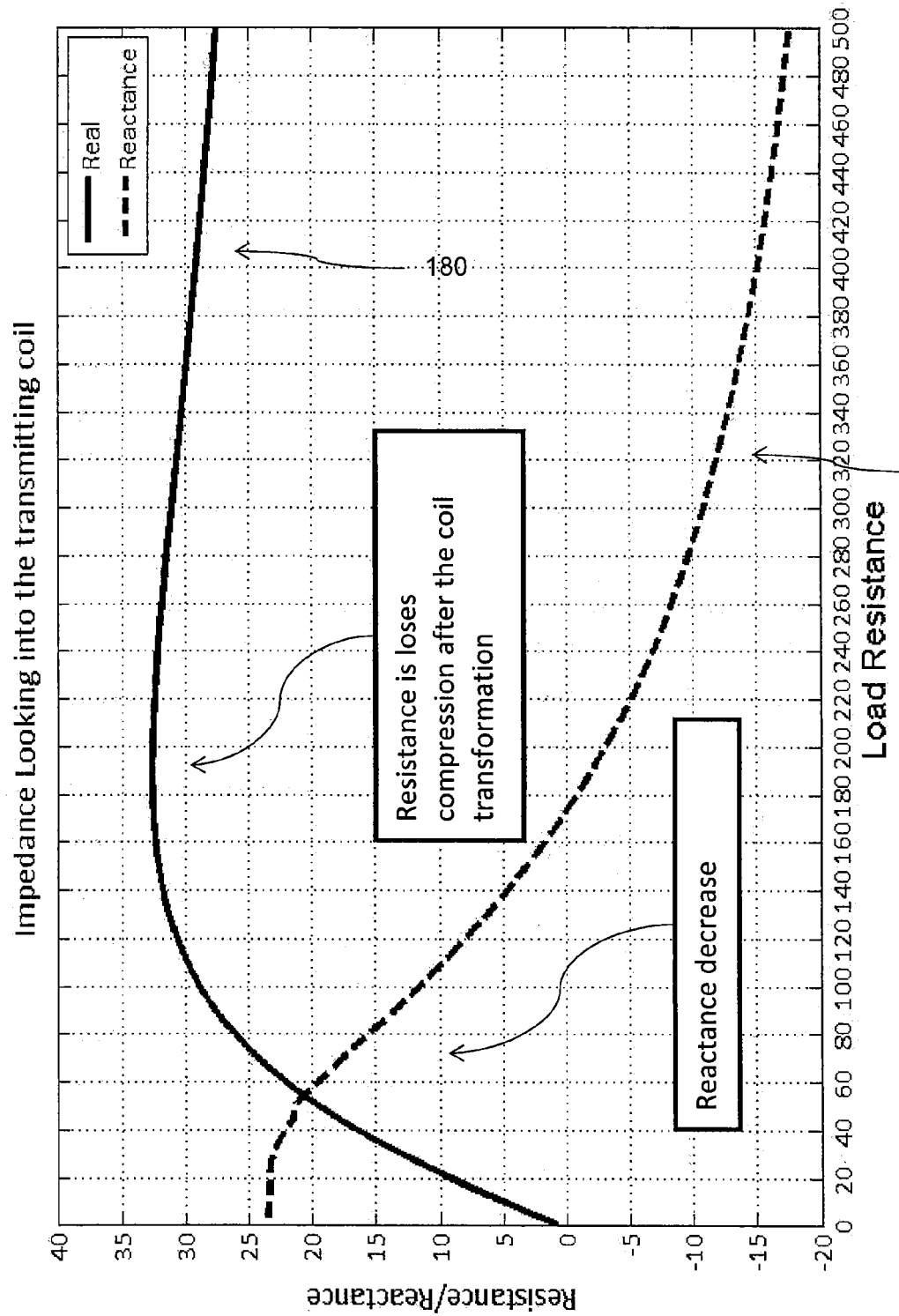
FIG. 18 shows the real and reactive components of the impedance as looking into the primary coil, where the impedance characteristic at this point is measured from a system operating in accordance with a preferred embodiment of the invention.

FIG. 18 shows the impedance transformation that is the result of the coupling network 155 and is measured looking into the primary coil 154 from probe 1505. The objective is to maximize the real part 170 shown in FIG. 17, which has been compressed to the point where parasitic losses would become less dominant. Increasing the resistance can improve the efficiency of the circuit. The real part 180 is much greater at this stage and has been increased to maximize power delivery through to the secondary coil 156 and minimize the losses from other parasitic upstream stages closer to the wall outlet, or AC/DC 150. The negative aspect, however, is that magnitude change of the real component 180 is too large when compared to the working region of a switch-mode supply 20 and 31, shown in FIG. 2 and FIG. 3, respectively. This can be corrected by the upstream transformation networks, such as impedance transformation network 153. The reactive component 181 still trends downward with load resistance and can also be corrected by upstream transformation networks.

Figure 19:
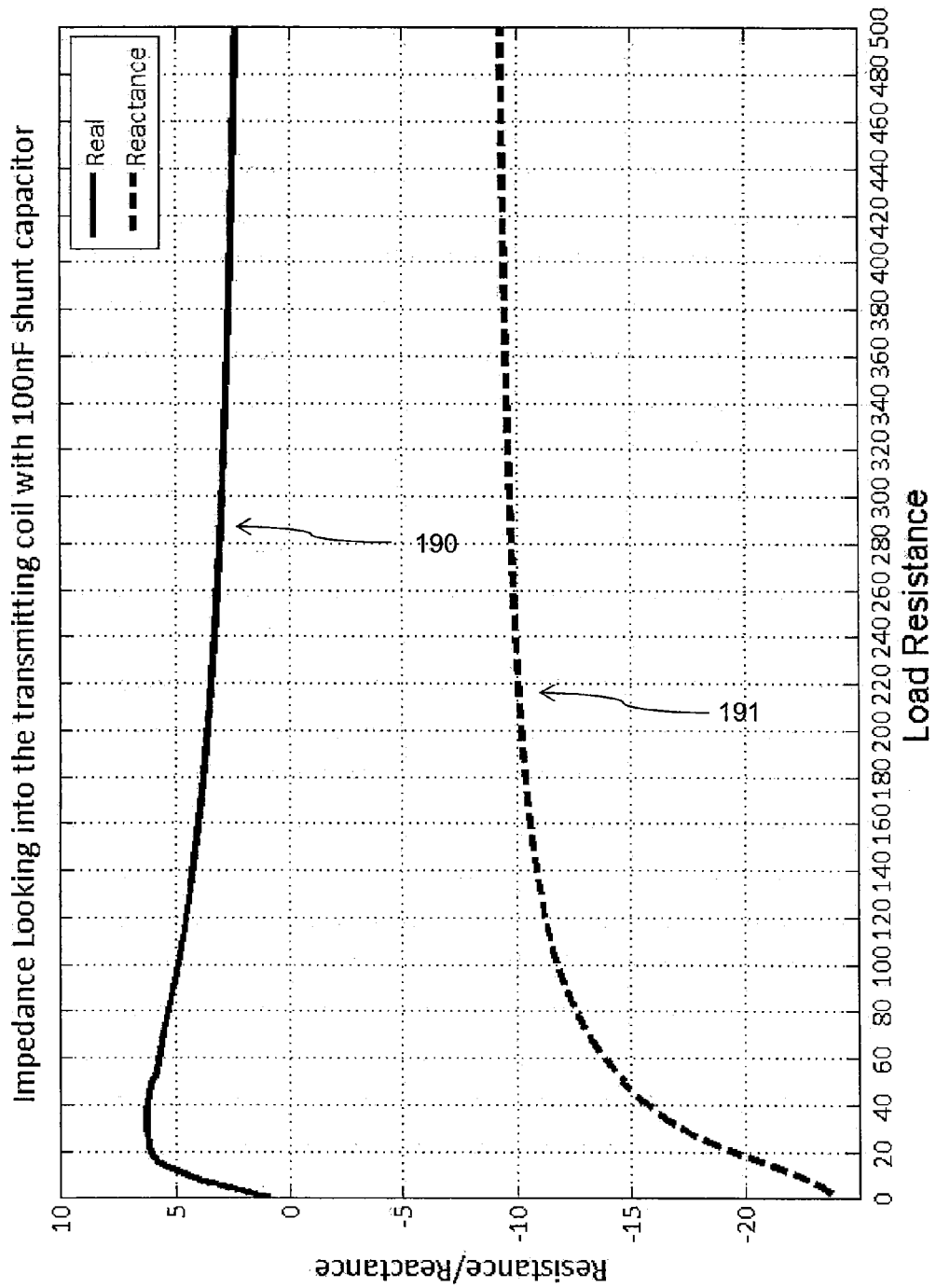
FIG. 19 shows the real and reactive components of the impedance as seen from the transmitter side load-transformation network, where the impedance characteristic at this point is measured from a system operating in accordance with a preferred embodiment of the invention.

FIG. 19 shows the impedance transformation that is the result of impedance transformation network 153 and is measured looking into the impedance transformation network 153 from probe 1506. The objective is to compress the real component 180 such that it falls within the operating range 20 and 31, defined in FIG. 2 and FIG. 3, respectively. The second objective is to transform the reactive component 181 such that the increase in load resistance increases the reactive component and phase angle. The real part 190 is compressed back within the operating range of a switch-mode inverter 20 and 31. The reactive part 191 has been corrected such that it trends upward with increasing load resistance. This corresponds to an increasing phase angle and decreased power delivery as load resistance increases. The reactive part 191 is negative at this stage and this would correspond to a negative phase angle. From FIG. 11, it can be seen, for a class E inverter, that a negative phase angle corresponds with poor efficiency and high actual power losses. The same is true for class D and Phi inverters. The trend is undesirable at this stage because an increase in phase angle on the negative slope of 110 would increase power output. The reactive component can be shifted by phase shift network 152, for example, so that is falls within the working region 114.

Figure 20:
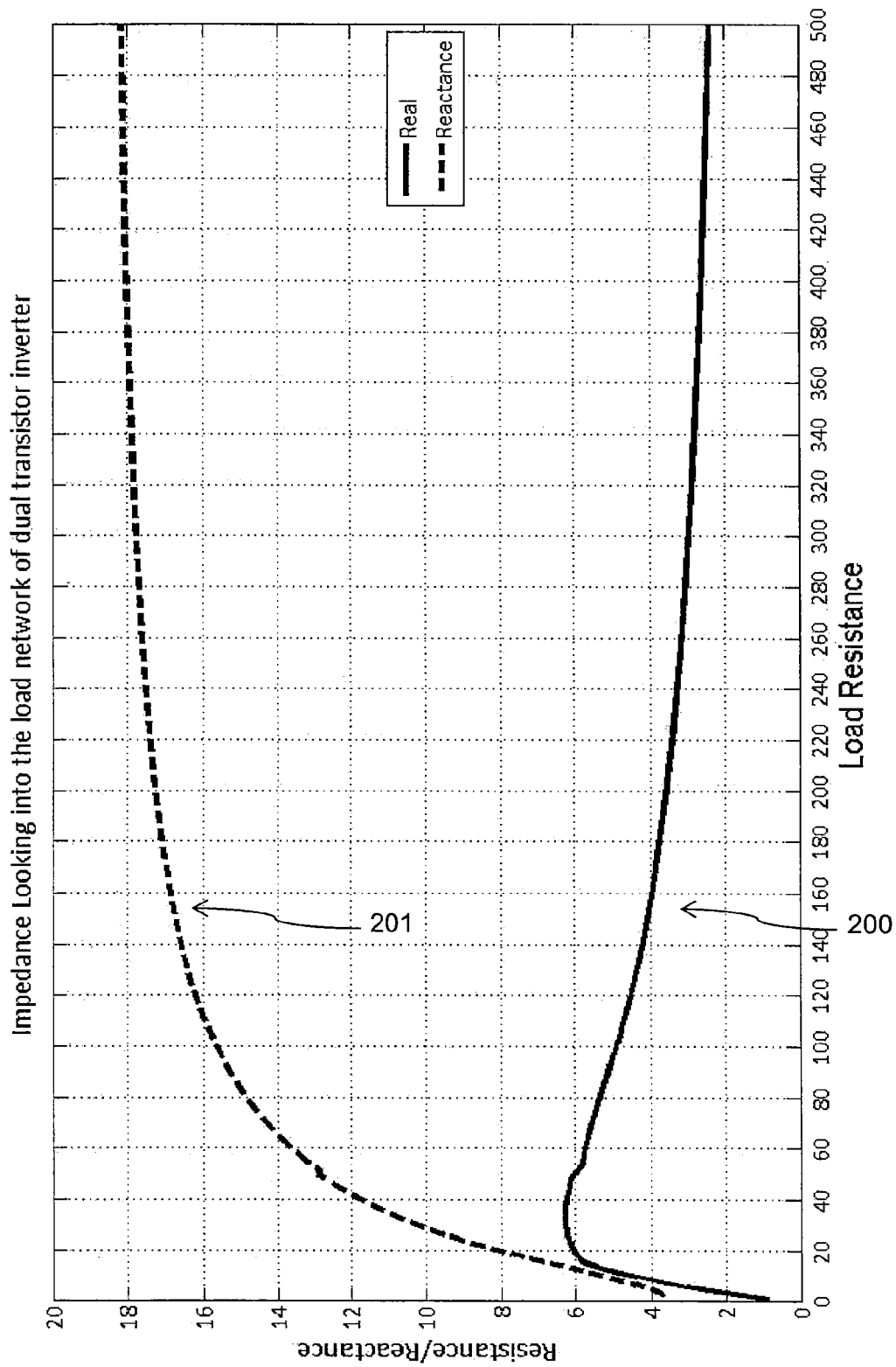
FIG. 20 shows the real and reactive components of the impedance as seen from the transmitter-side, phase shift network, where the impedance characteristic at this point is measured from a system operating in accordance with a preferred embodiment of the invention.
Figure 21:
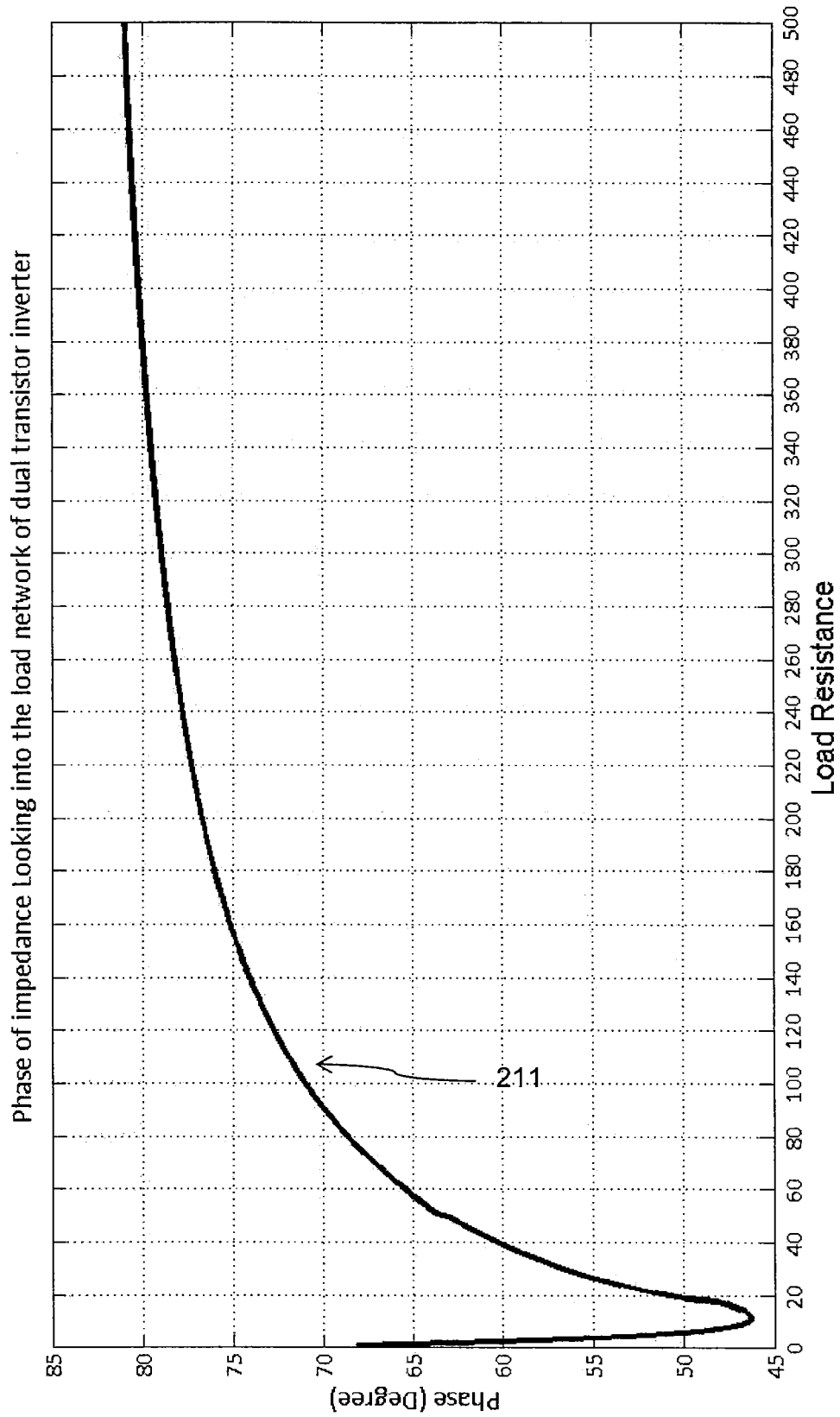
FIG. 21 shows the phase angle of the impedance as it is seen from the inverter, where the impedance characteristic at this point is measured from a system operating in accordance with a preferred embodiment of the invention.

FIG. 20 shows the impedance transformation that is the result of the phase shift network 152 and is measured looking into the phase shift network 152 from probe 1507. The objective is to keep the real part 190 in the operating range of the switch-mode inverter and shift the reactive part 191 into the operating range of the switch-mode inverter. The real part 200 is within the operating range of resistances of a switch-mode inverter 20 and 31, from FIG. 2 and FIG. 3, respectively. The reactive part 201 now falls in the correct operating region 114 shown in FIG. 11. Confirmation that the phase angle and trend are correct can be shown by converting 200 and 201 into a phase angle plot, as shown in FIG. 21. The phase angle 211 is within the operating region 114 and increases with respect to load resistance. The phase angle 211 has a dip at very low impedances and in specific embodiments the initial dip in phase can be avoided.

Figure 22:
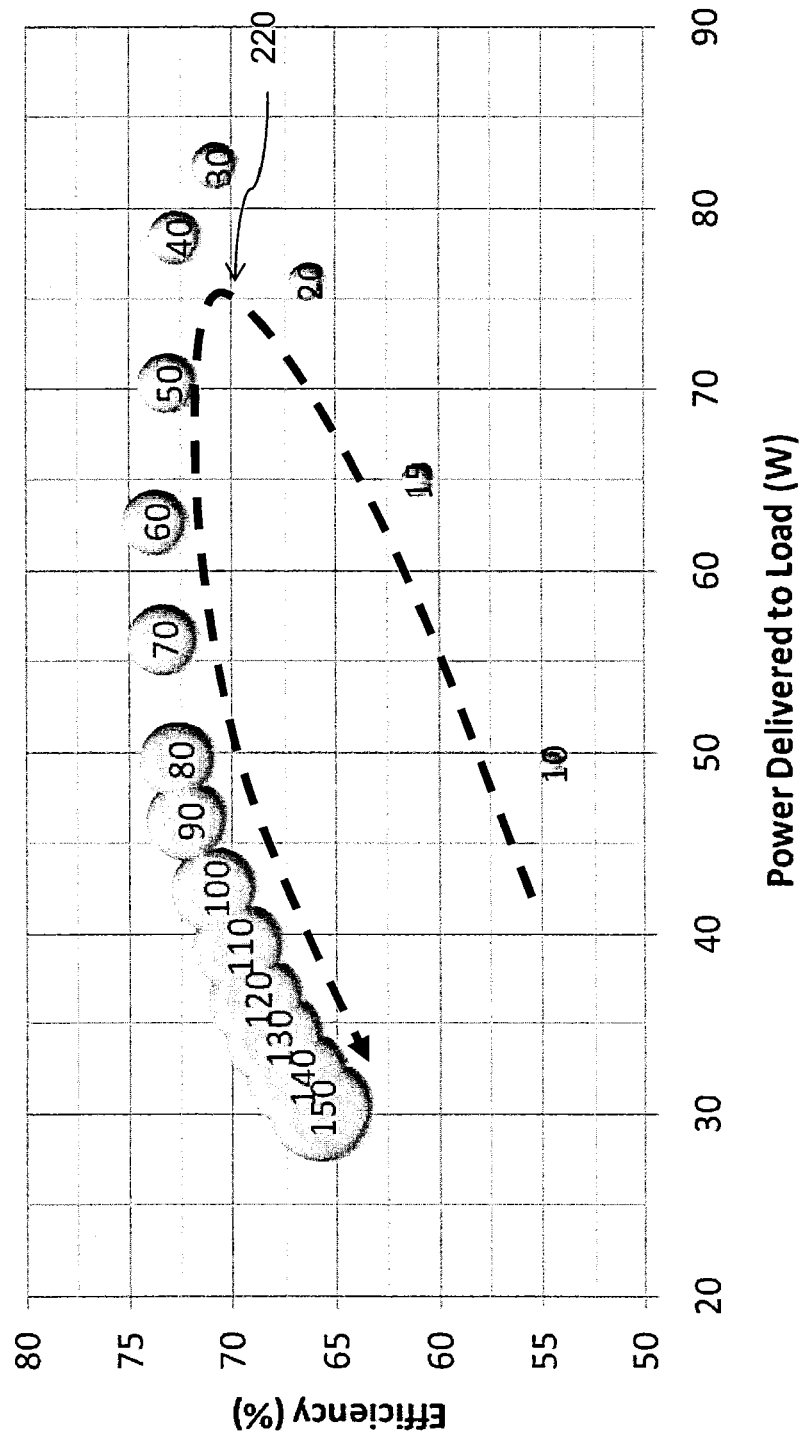
FIG. 22 shows the actual power delivery and efficiency of a system that is operating in accordance with a preferred embodiment of the invention.
Figure 23B:
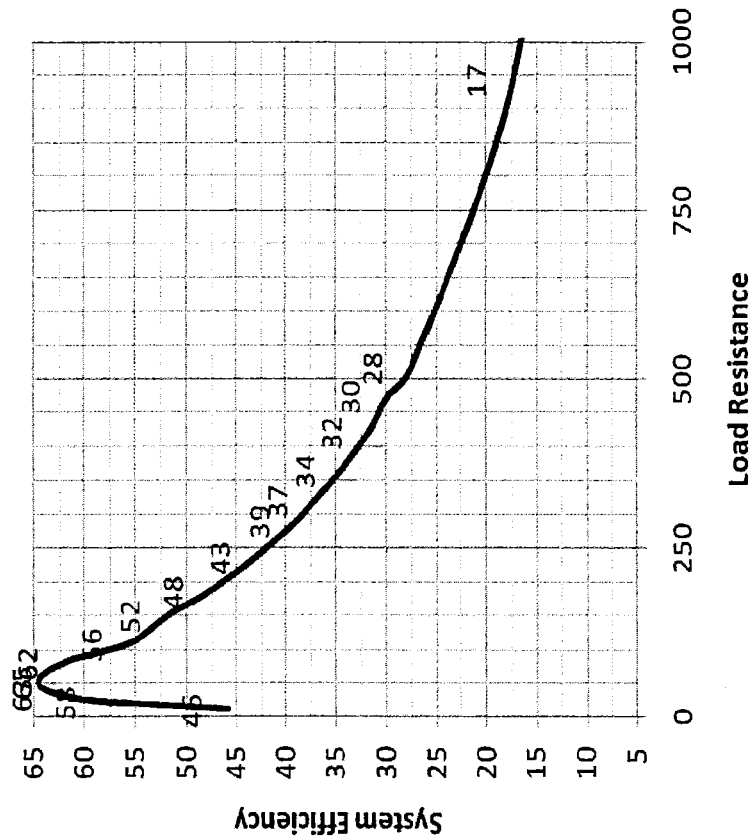
FIGS. 23A-23C show the actual power delivery and efficiency for another system in accordance with the invention. The experimental results are from a 12V supply system. Efficiency peaks at main power delivery band, which is approximately 25-100Ω load resistance, are shown. Power delivery drops rapidly after 100Ω, when the system goes into low load condition or trickle charge condition. Although the efficiency at high load resistance is poor, the absolute power loss is kept at about 1.75 W, while power delivery continues to drop. This power loss is distributed in the system and little or no heat issues are observed (especially at the receiver) during the low load operation.
Figure 23A:
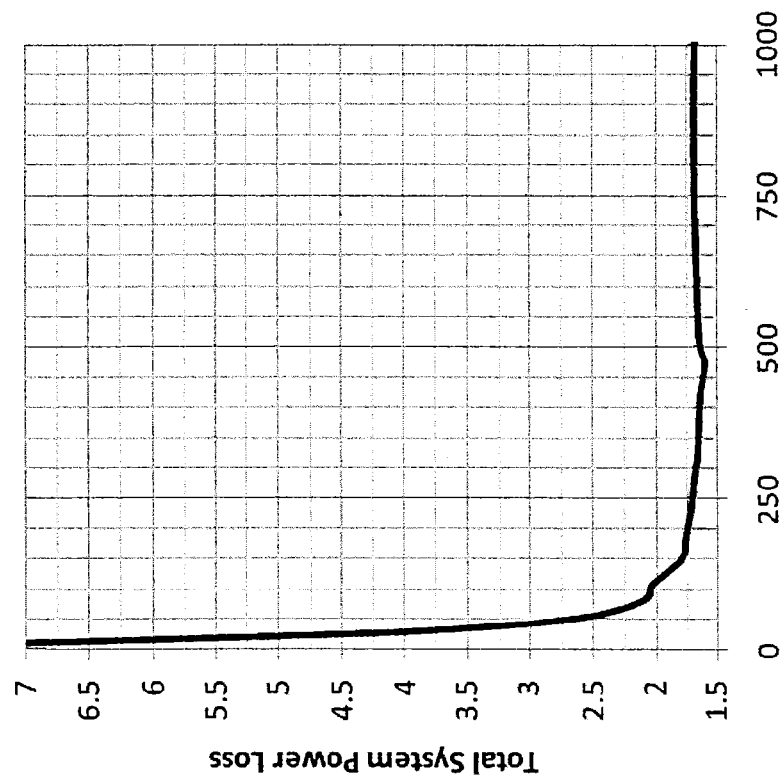
Figure 23C:
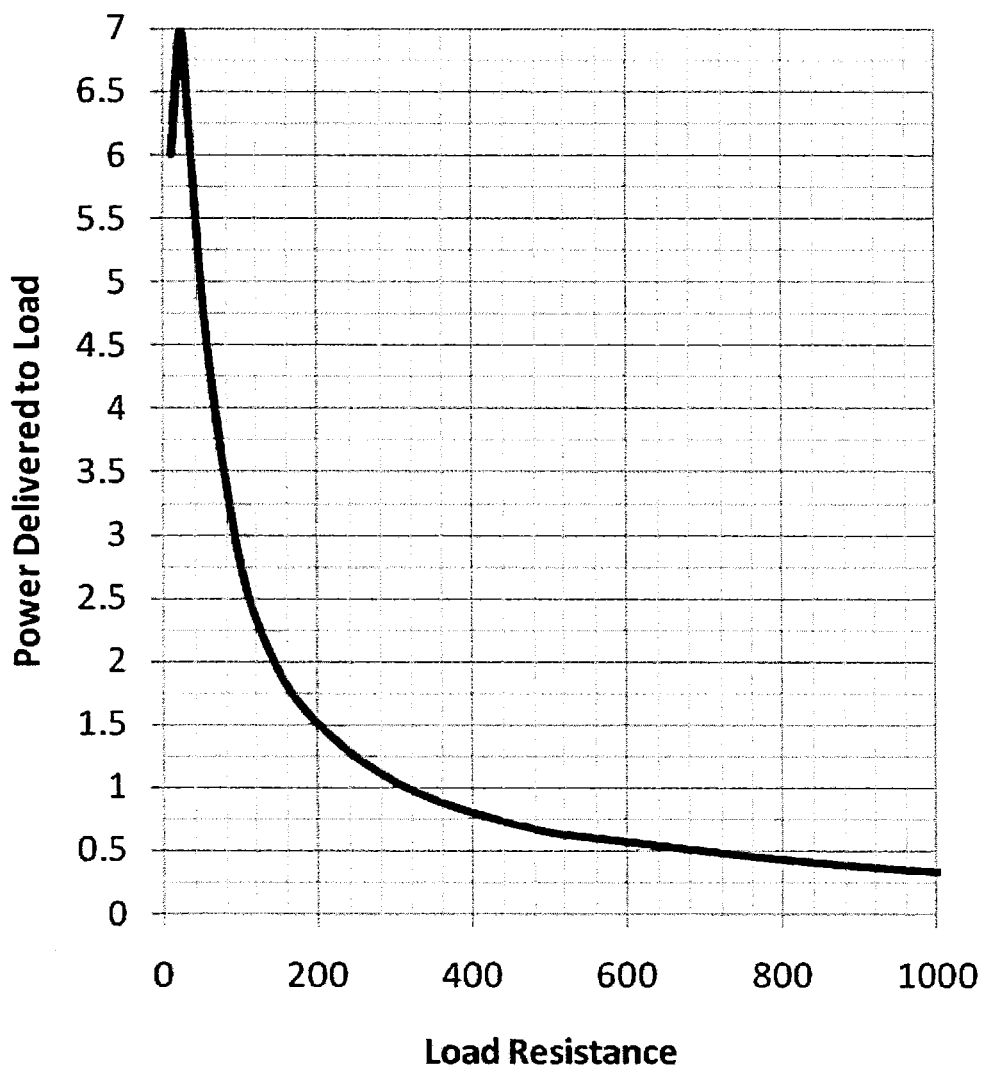

FIG. 22 shows actual experimental data taken from the system shown in FIG. 15. After the 30 Ohm inflection point 220, power output decreases with load impedance and the system achieves high operating efficiency. Because a typical portable electronic device will operate at impedances greater than 30 ohms when the supply voltage is sufficiently high, this is an example of a preferred power delivery vs. load resistance vs. efficiency plot.

Example 2

A primary coil parallel capacitor value in a specific embodiment can meet two constraints.

Figure 24:
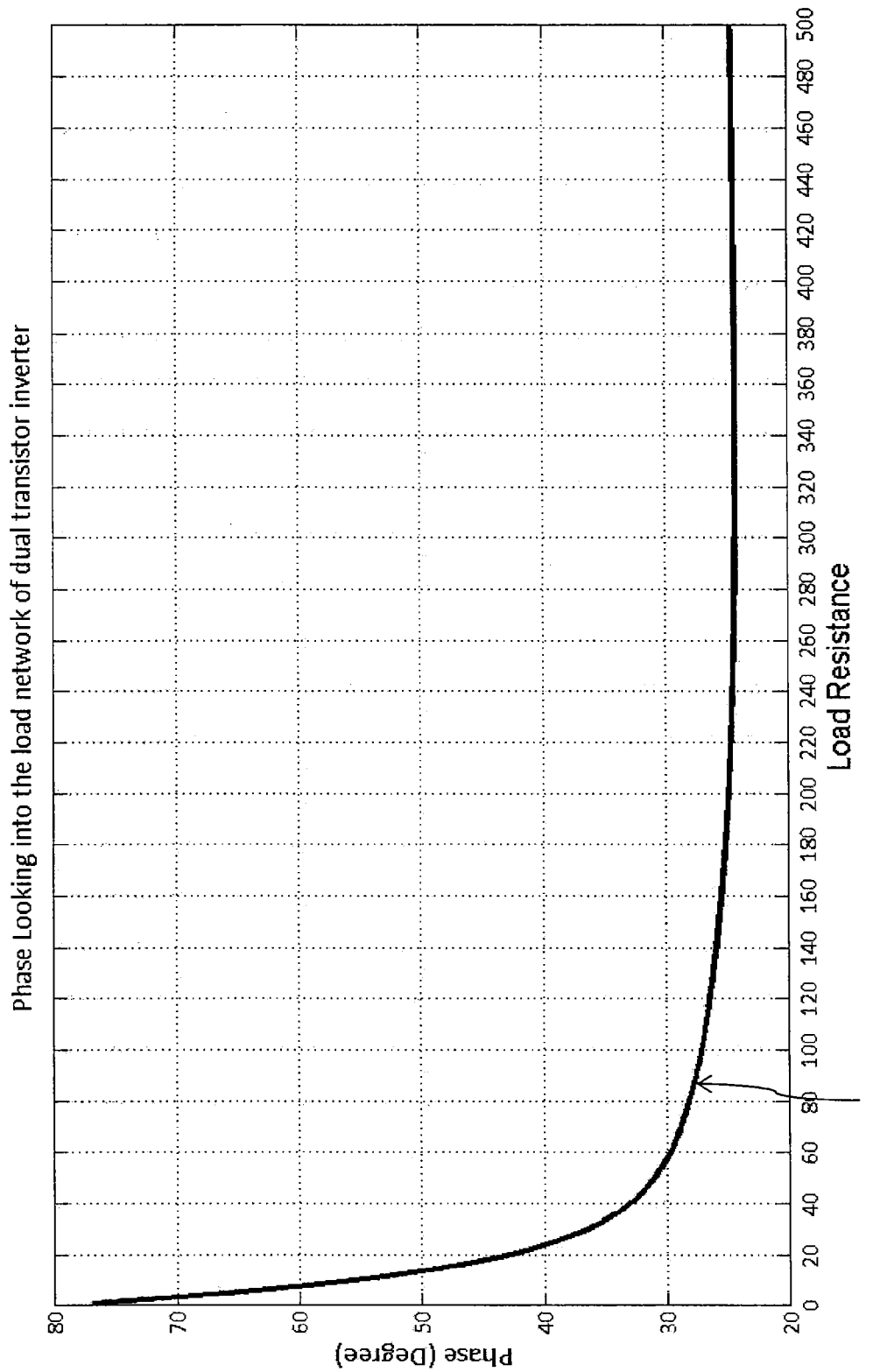
FIG. 24 shows the phase angle of the impedance as it is seen from the inverter, where the impedance characteristic at this point is measured from a system operating in the non-preferred mode of operation.

FIG. 24 offers a contrast to the preferred phase angle vs. load resistance trend shown in FIG. 21. The reference phase angle is approximately 80 degrees and decreases with load resistance. The phase angle 240 decreases with load resistance.

Figure 25:
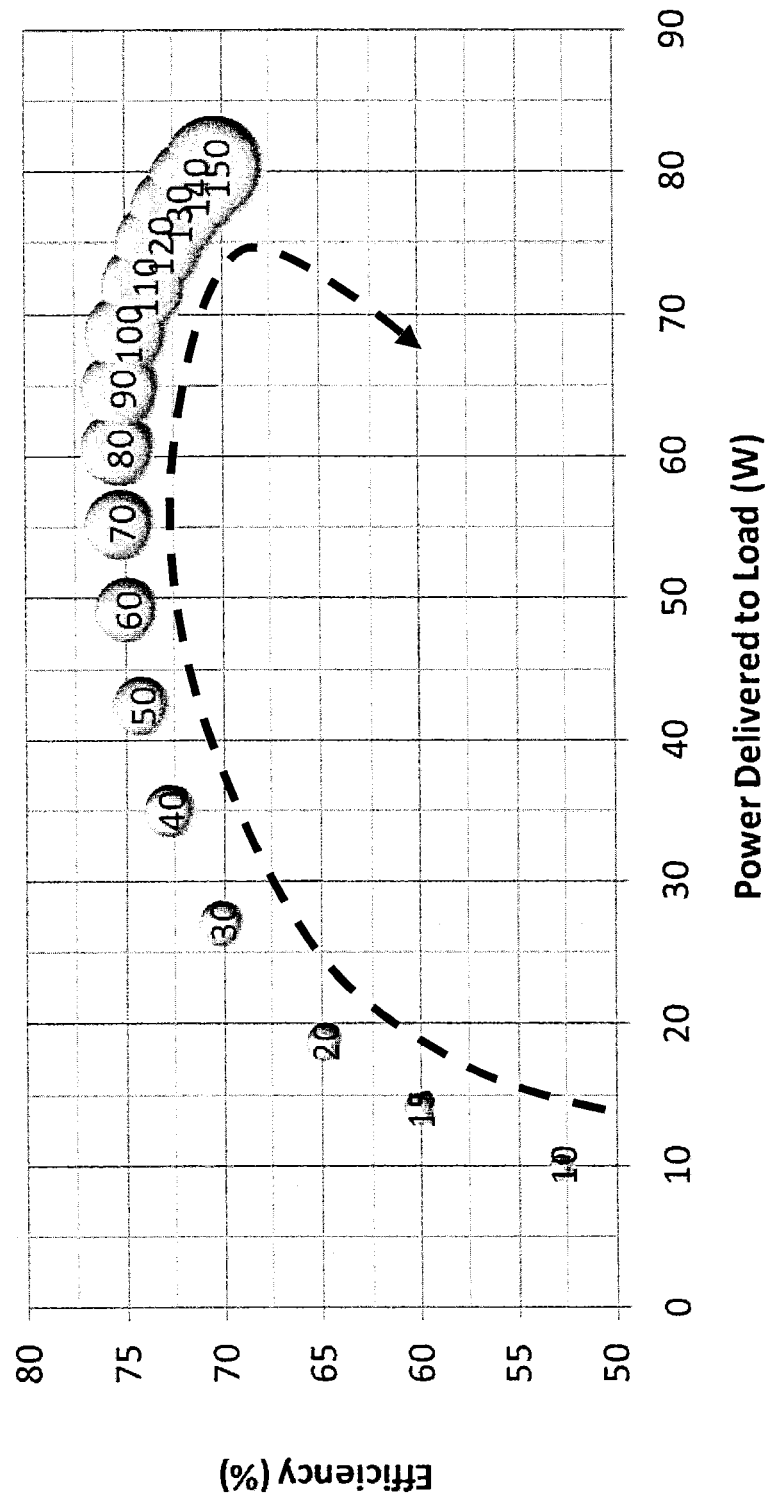
FIG. 25 shows the actual power delivery and efficiency of a system that is operating in the non-preferred mode of operation.
Figure 26A:
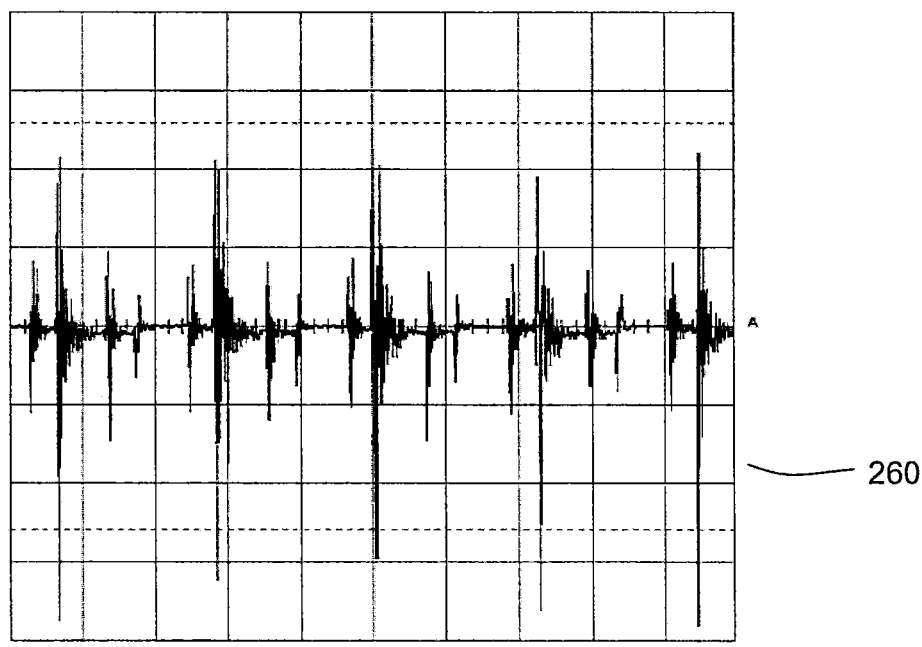
FIGS. 26A-26B show the instantaneous peak power loss for hard switching topologies, known in the art, as they are compared to soft-switching topologies, known in the art, where
Figure 26B:
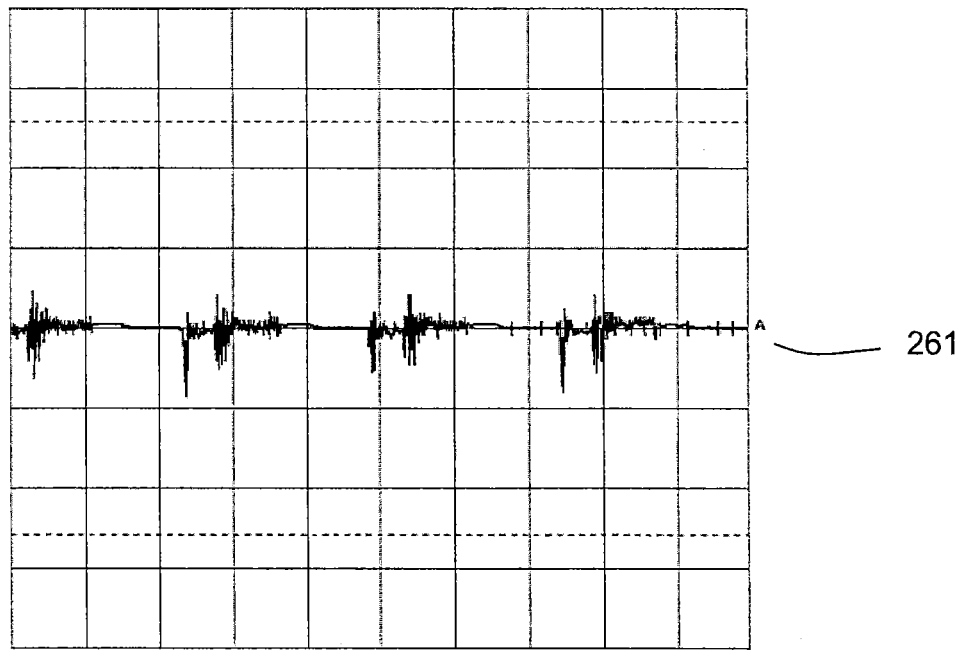

FIG. 25 shows the result of this mode of operation when there are no communication and control mechanisms in place. The power output increases with load resistance, which is exactly opposite the response of a fixed voltage DC supply 130 which is shown in FIG. 13.

Figure 27:
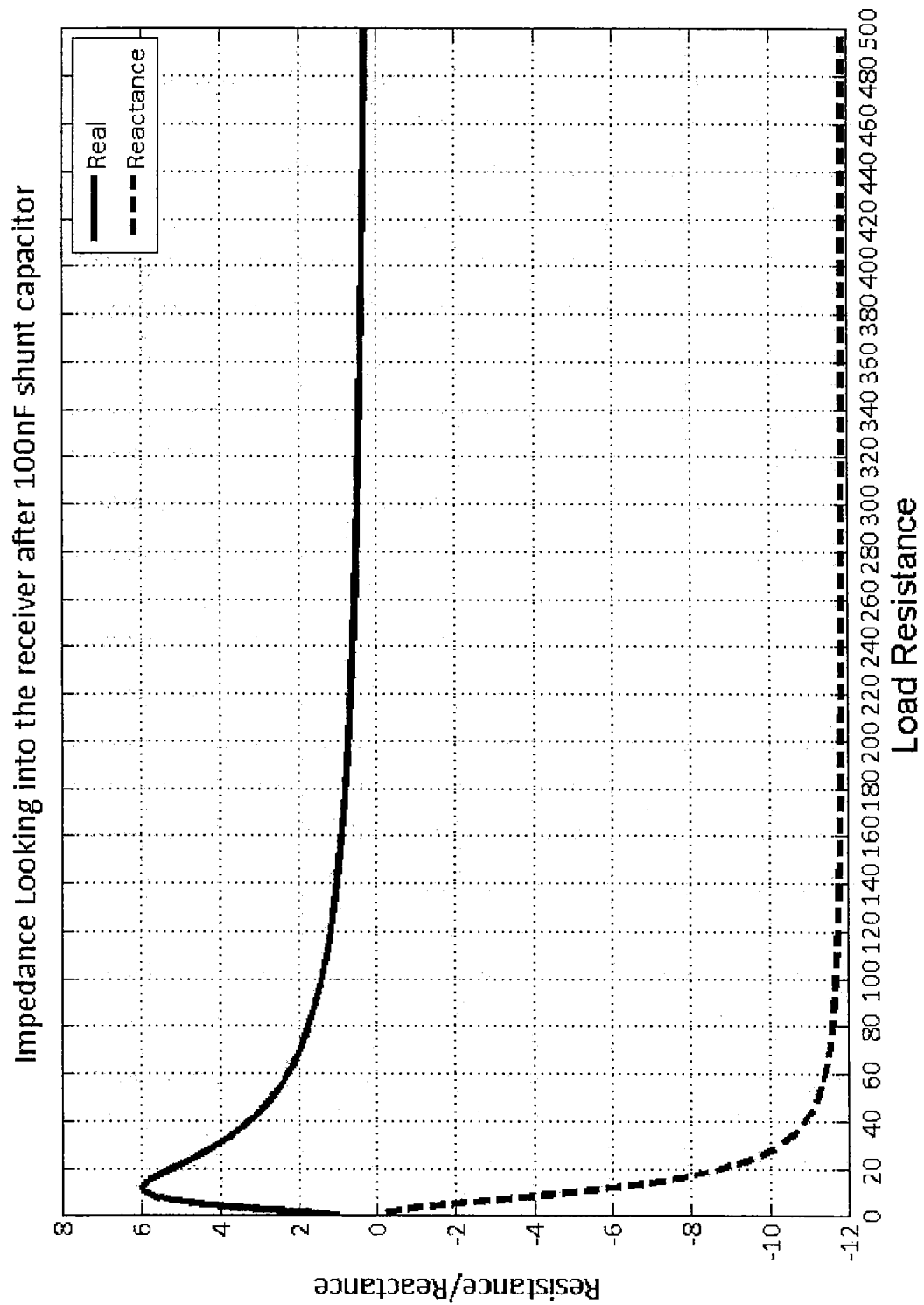
FIG. 27 shows the real and reactive components of the impedance as seen looking into the receiver side impedance transformation network, where the impedance characteristic at this point is measured from a system operating in an undesirable range.

FIG. 27 shows the real and reactive components of the impedance as seen looking into the receiver side impedance transformation network, where the impedance characteristic at this point is measured from a system operating in an undesirable range.

Figure 28:
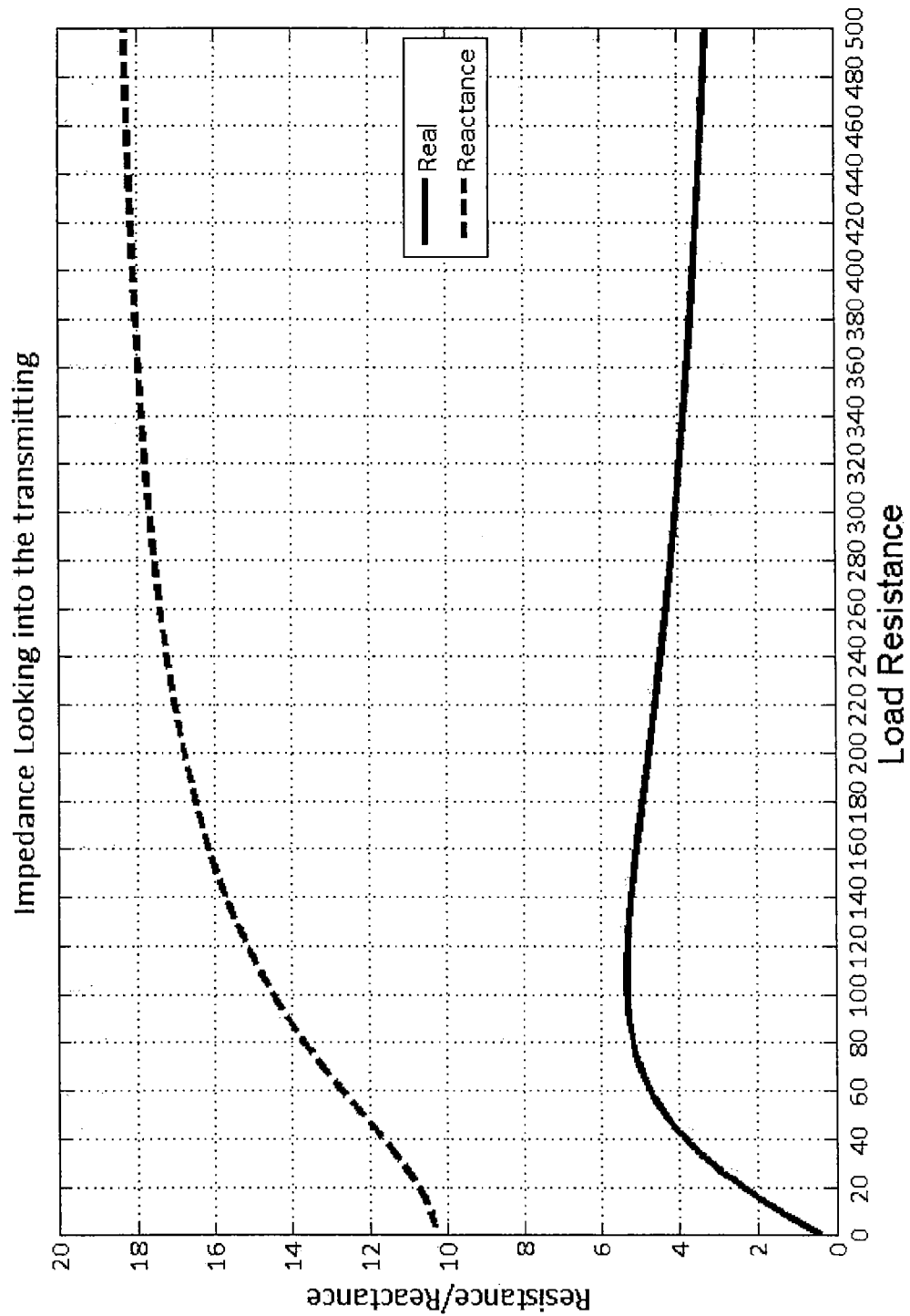
FIG. 28 shows the real and reactive components of the impedance as looking into the primary coil, where the impedance characteristic at this point is measured from a system operating in an undesirable range.

FIG. 28 shows the real and reactive components of the impedance as looking into the primary coil, where the impedance characteristic at this point is measured from a system operating in an undesirable range.

Figure 29:
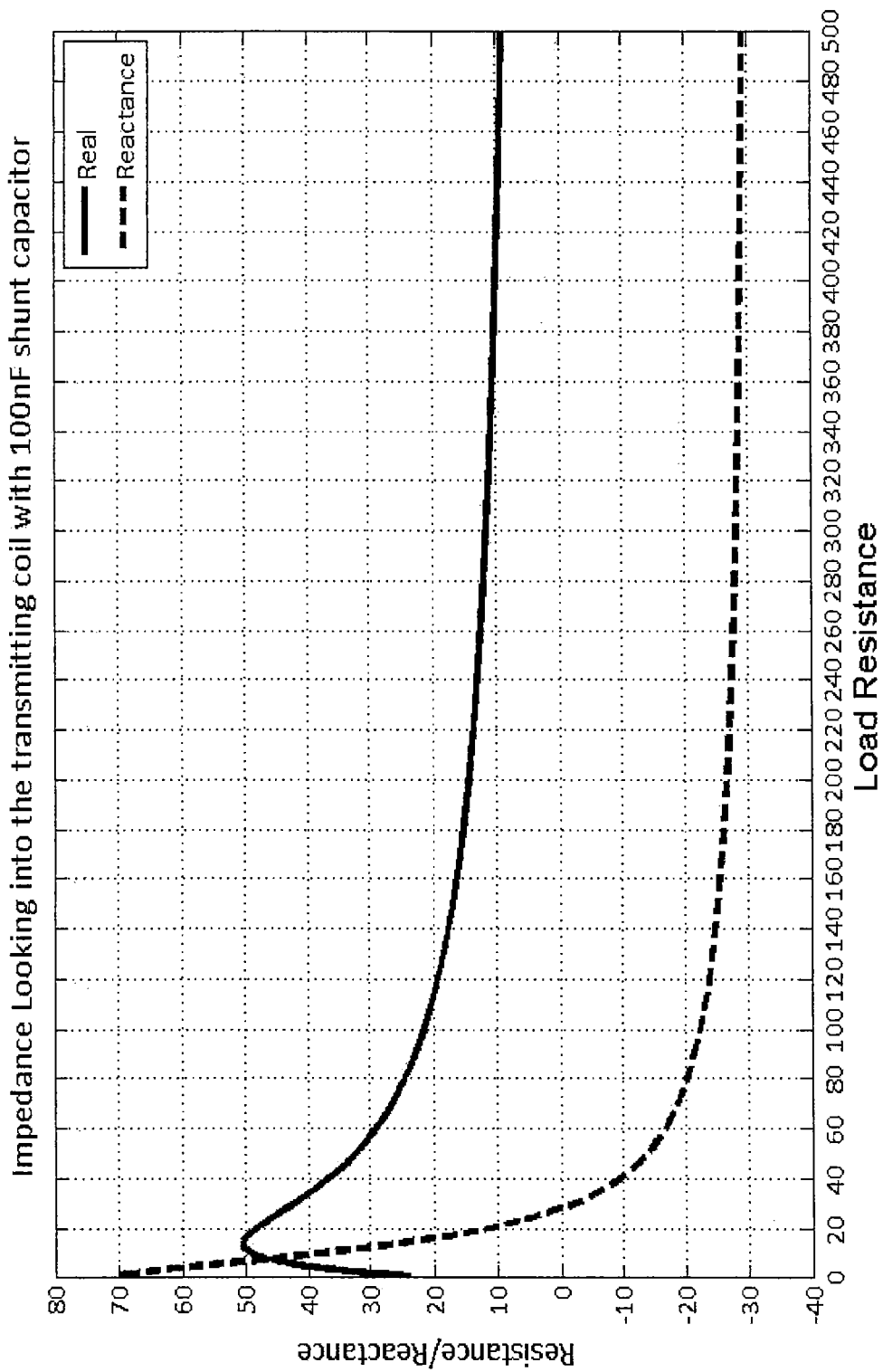
FIG. 29 shows the real and reactive components of the impedance as seen from the transmitter side load-transformation network, where the impedance characteristic at this point is measured from a system operating in an undesirable range.

FIG. 29 shows the real and reactive components of the impedance as seen from the transmitter side load-transformation network, where the impedance characteristic at this point is measured from a system operating in an undesirable range.

Figure 30:
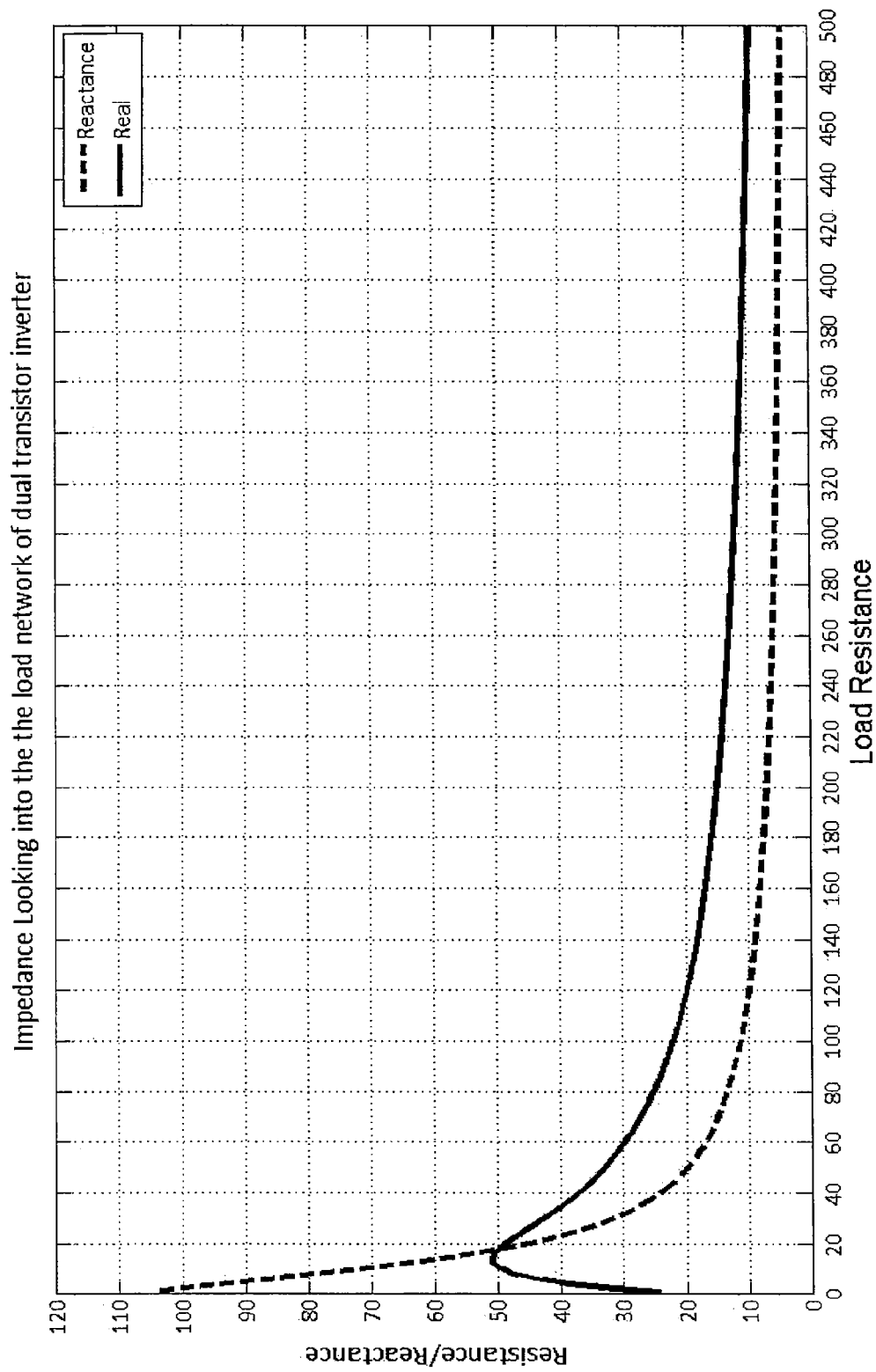
FIG. 30 shows the real and reactive components of the impedance as seen from the transmitter-side, phase shift network, where the impedance characteristic at this point is measured from a system operating in an undesirable range.

FIG. 30 shows the real and reactive components of the impedance as seen from the transmitter-side, phase shift network, where the impedance characteristic at this point is measured from a system operating in an undesirable range.

FIGS. 31-40 show a variety of ways that the components of various embodiments of the subject invention can be located, for example proximate the transmitter coil, proximate the receiver coil, or separate from both.

Figure 31:
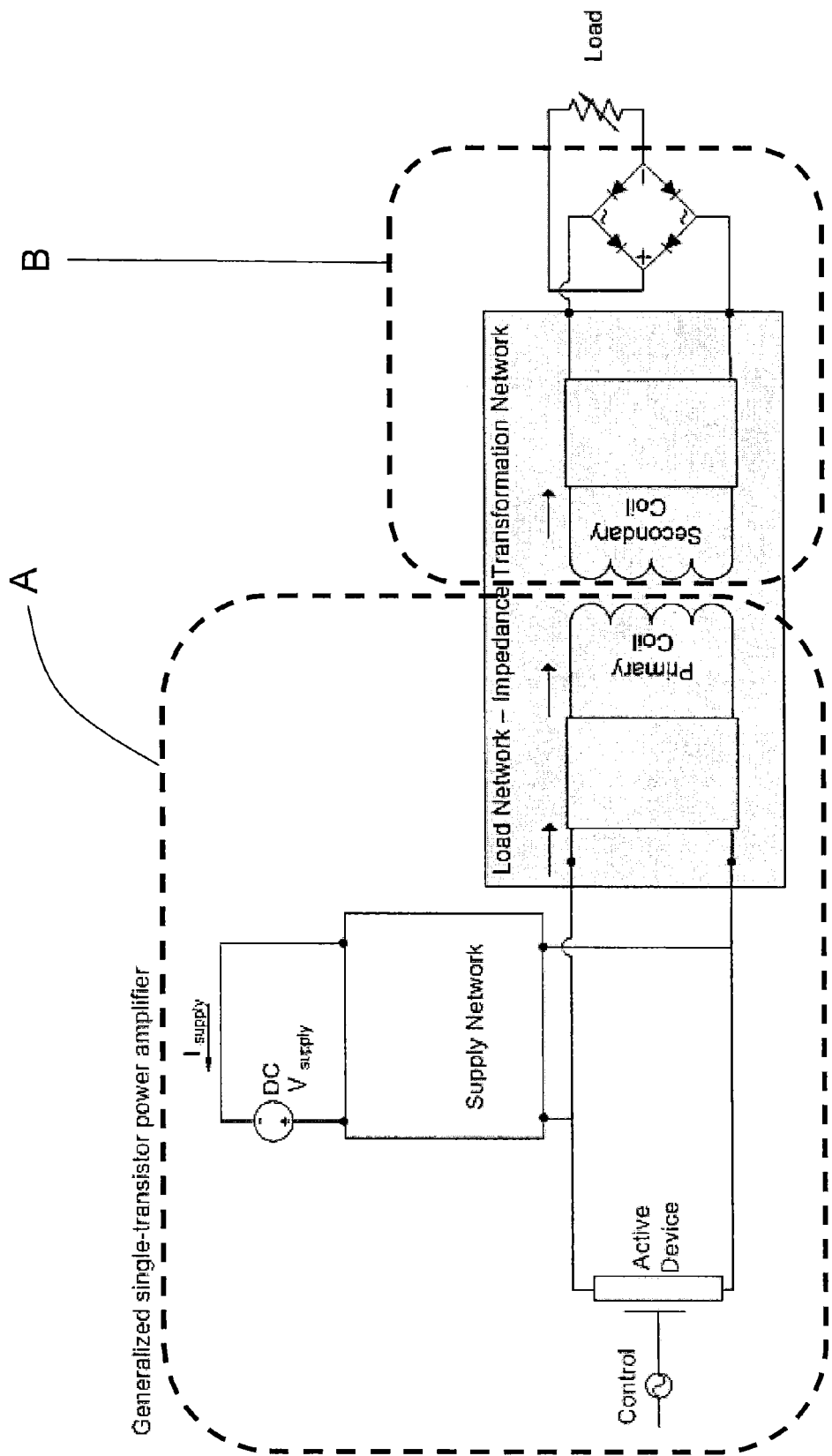
FIG. 31 shows the circuitry shown in FIG. 68 with dotted lines, labeled A and B, around portions of the circuitry to show one embodiment of how the circuitry can be split between a transmitter unit, for example a transmitter pad, and a receiver unit.
Figure 68:
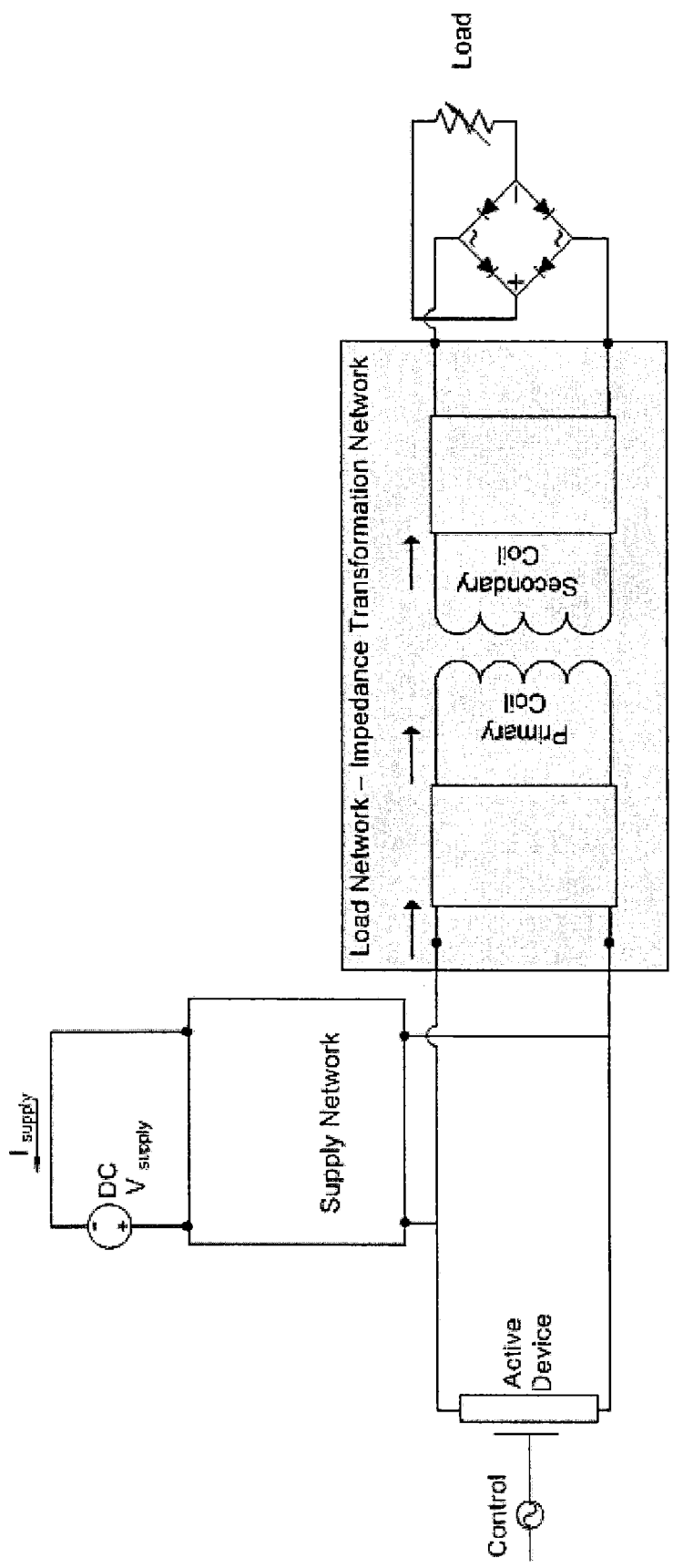
FIG. 68 shows a generalized contactless power system with a single transistor power amplifier in a single ended configuration.

FIG. 31 shows the circuitry shown in FIG. 68 with dotted lines, labeled A and B, around portions of the circuitry to show one embodiment of how the circuitry can be split between a transmitter unit, for example a transmitter pad, and a receiver unit.

Figure 32:
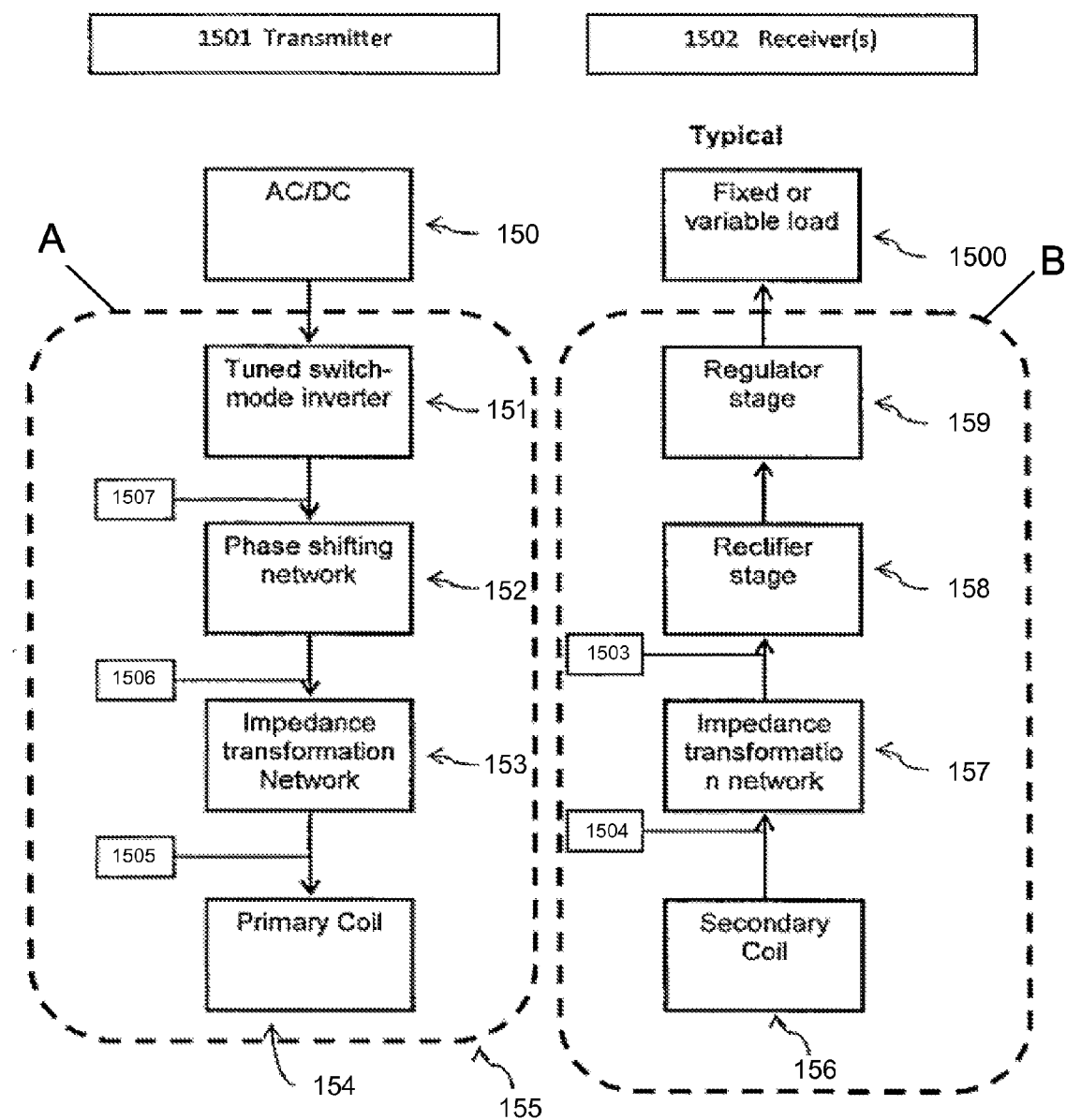
FIG. 32 shows the block diagram of FIG. 15 with dotted lines, labeled A and B, around portions of the block diagram elements to show how the block diagram elements can be split between a transmitter unit, for example a transmitter pad, and a receiver unit, in accordance with the embodiment shown in FIG. 31.

FIG. 32 shows the block diagram of FIG. 15 with dotted lines, labeled A and B, around portions of the block diagram elements to show how the block diagram elements can be split between a transmitter unit, for example a transmitter pad, and a receiver unit, in accordance with the embodiment shown in FIG. 31.

Figure 33:
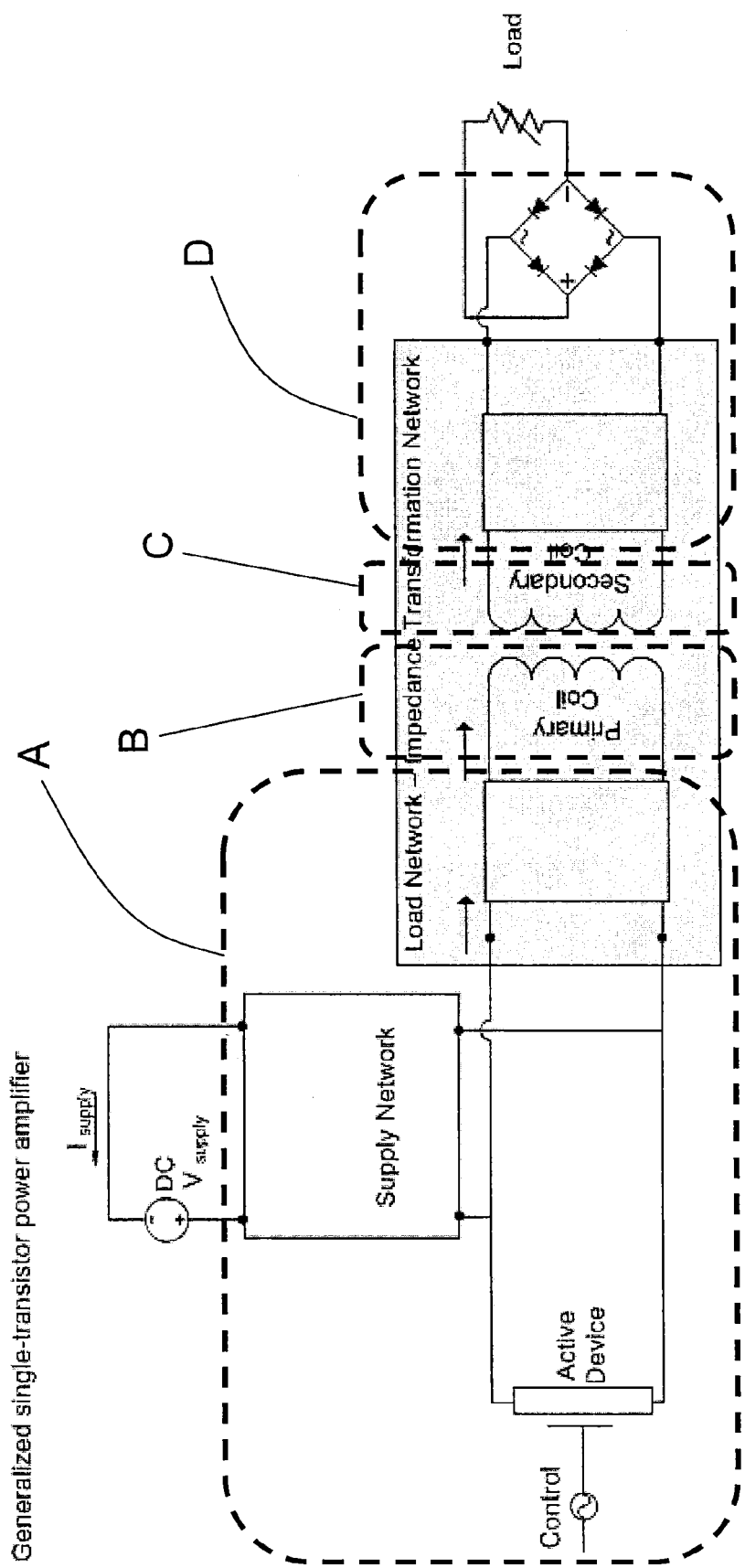
FIG. 33 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

FIG. 33 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

Figure 34:
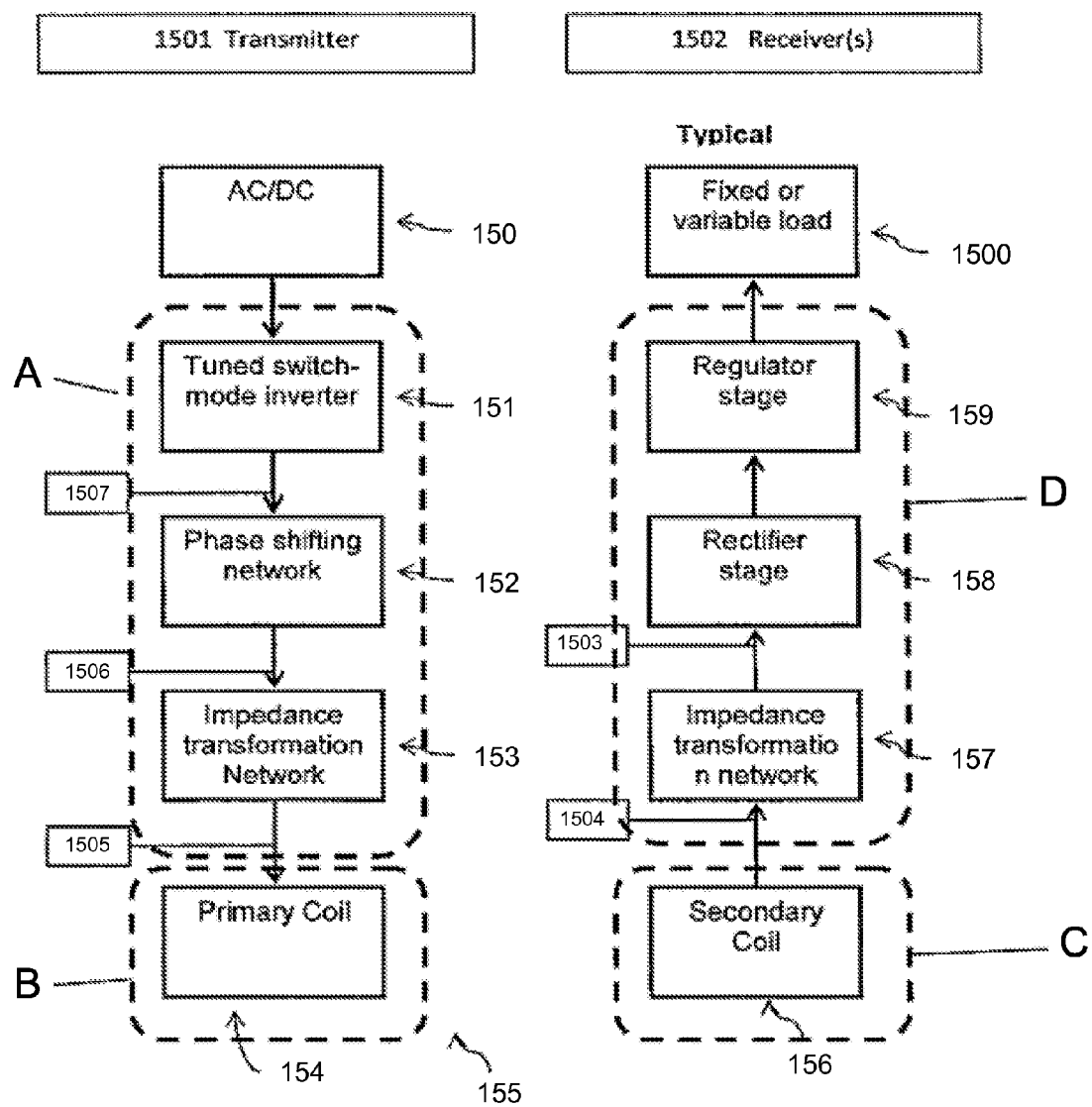
FIG. 34 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 33.

FIG. 34 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 33.

Figure 35:
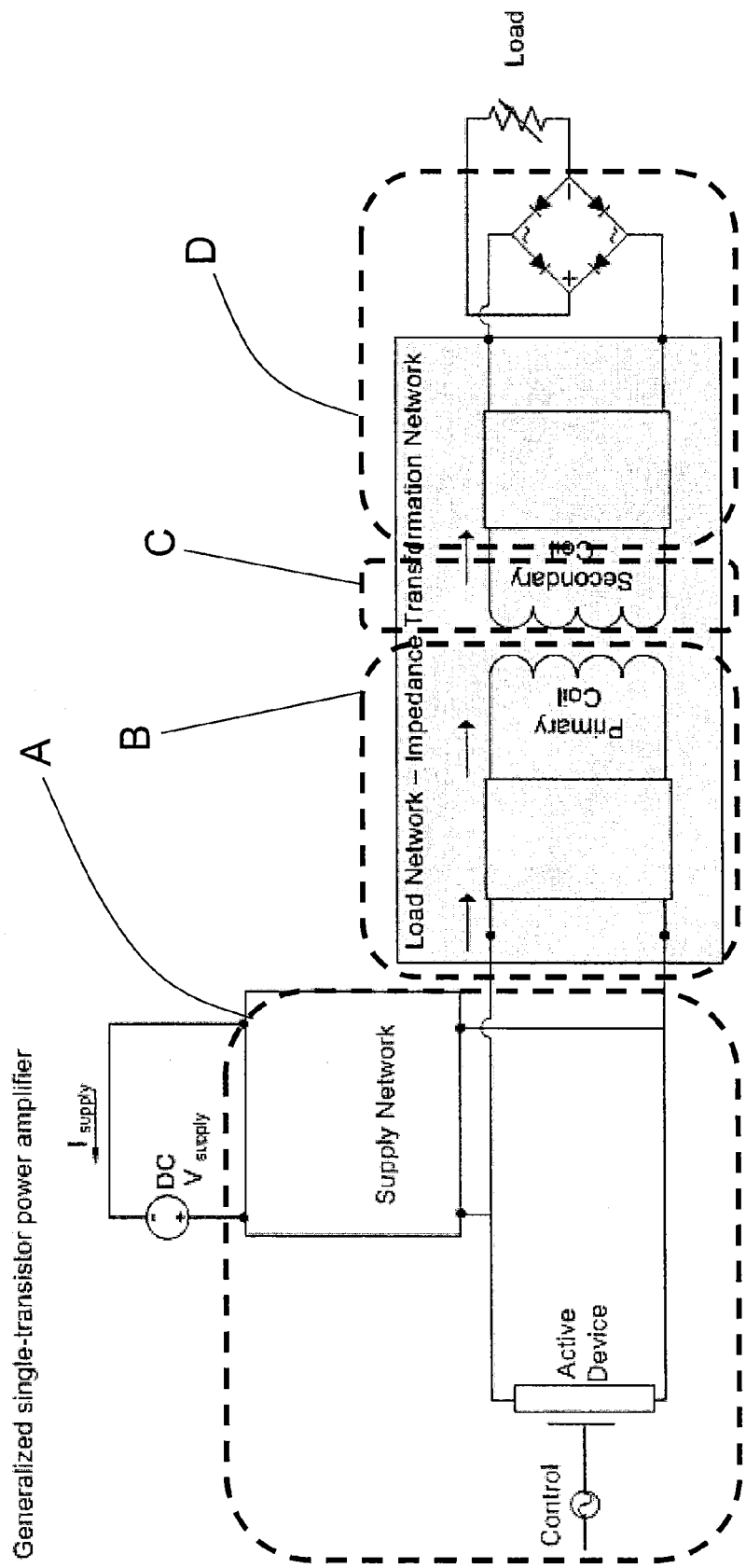
FIG. 35 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

FIG. 35 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

Figure 36:
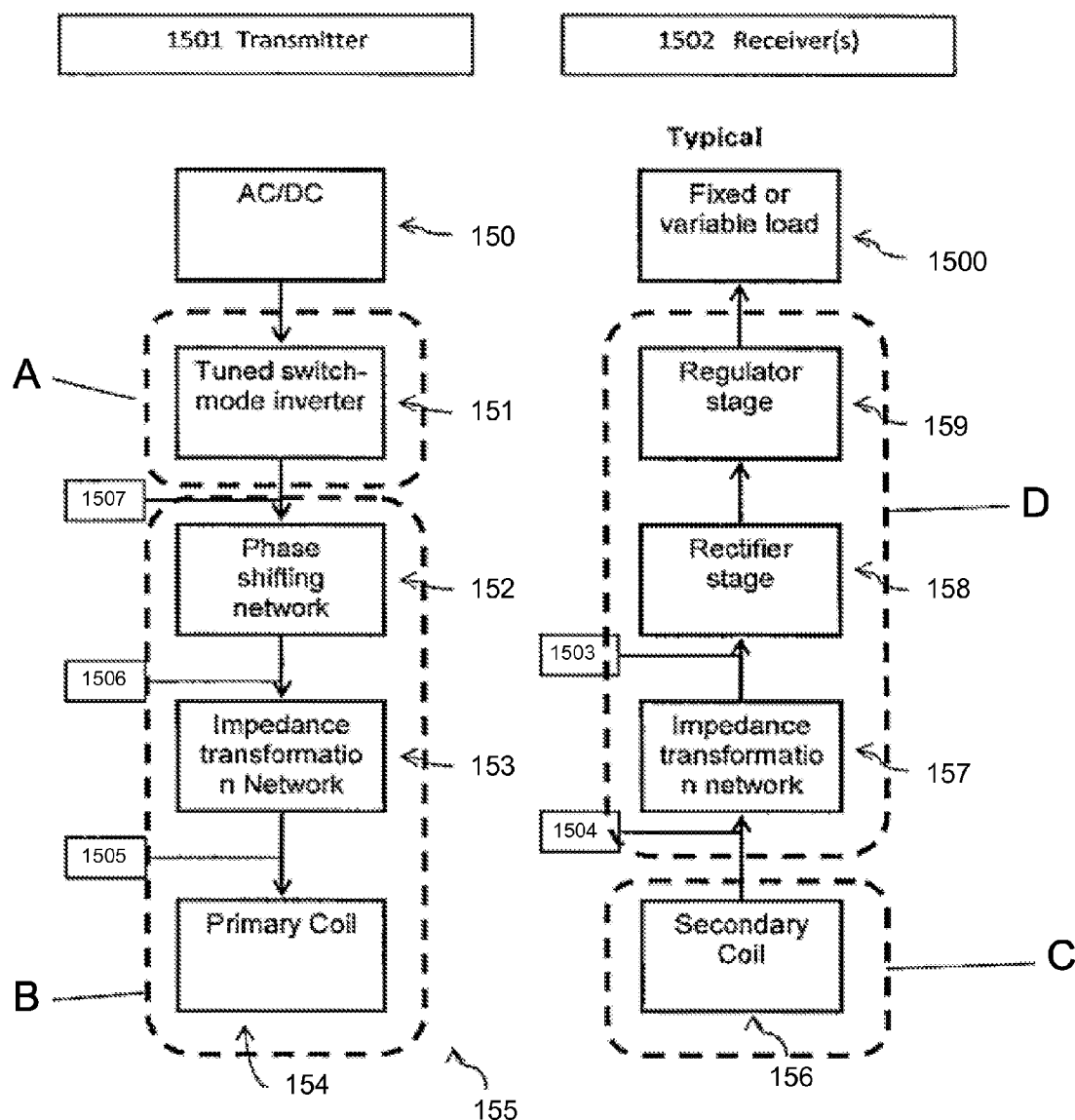
FIG. 36 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 35.

FIG. 36 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 35.

Figure 37:
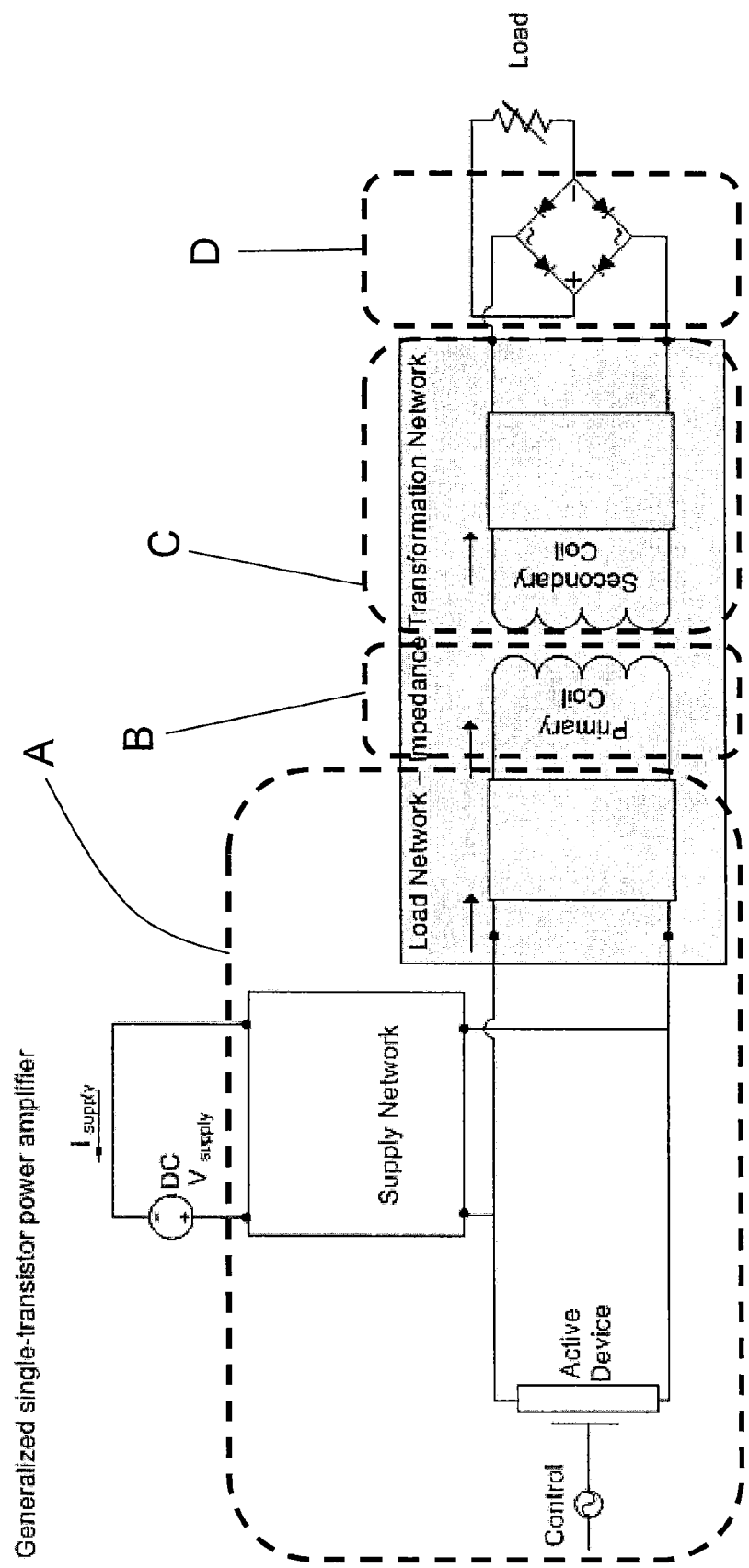
FIG. 37 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

FIG. 37 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

Figure 38:
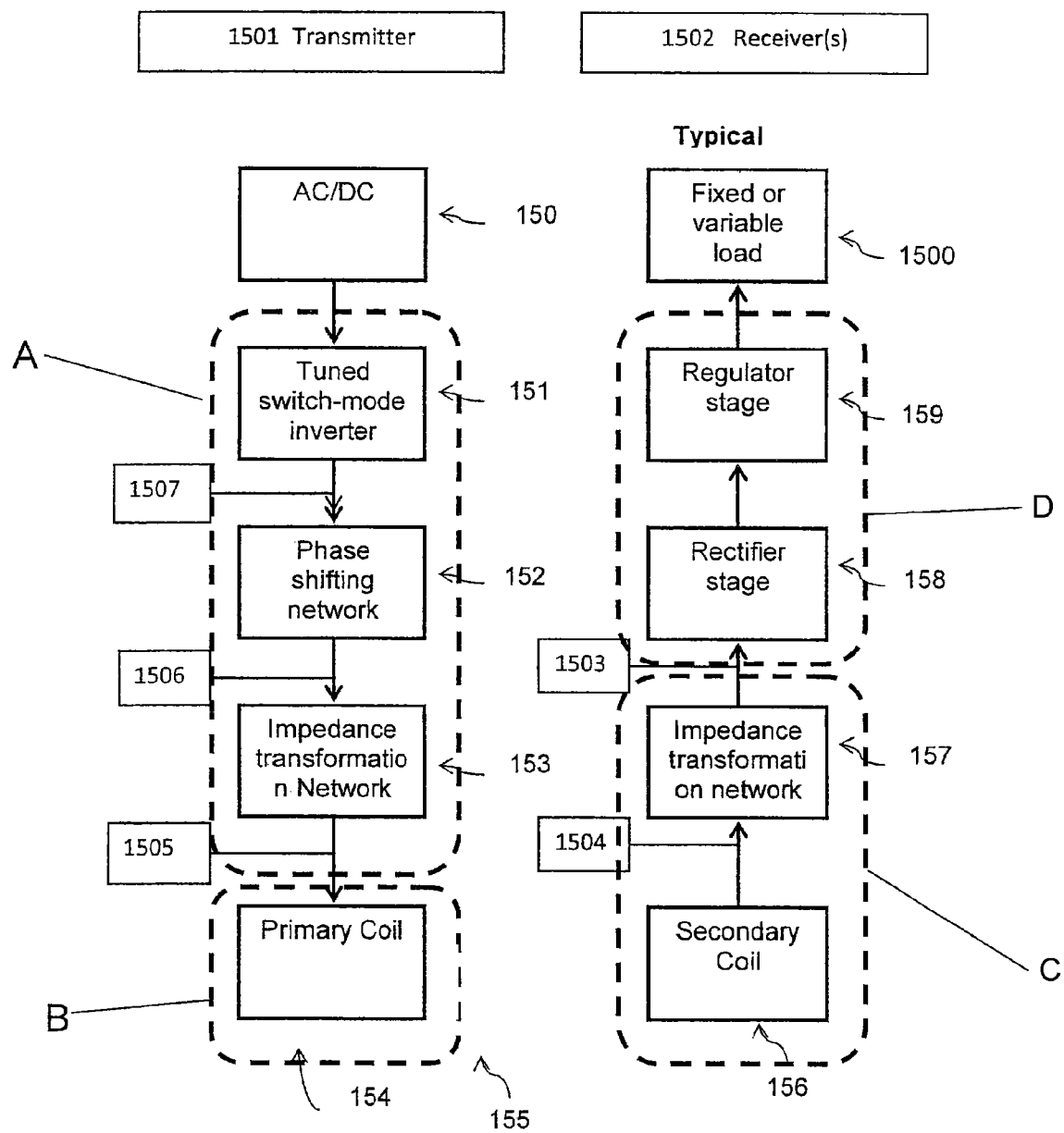
FIG. 38 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 37.

FIG. 38 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 37.

Figure 39:
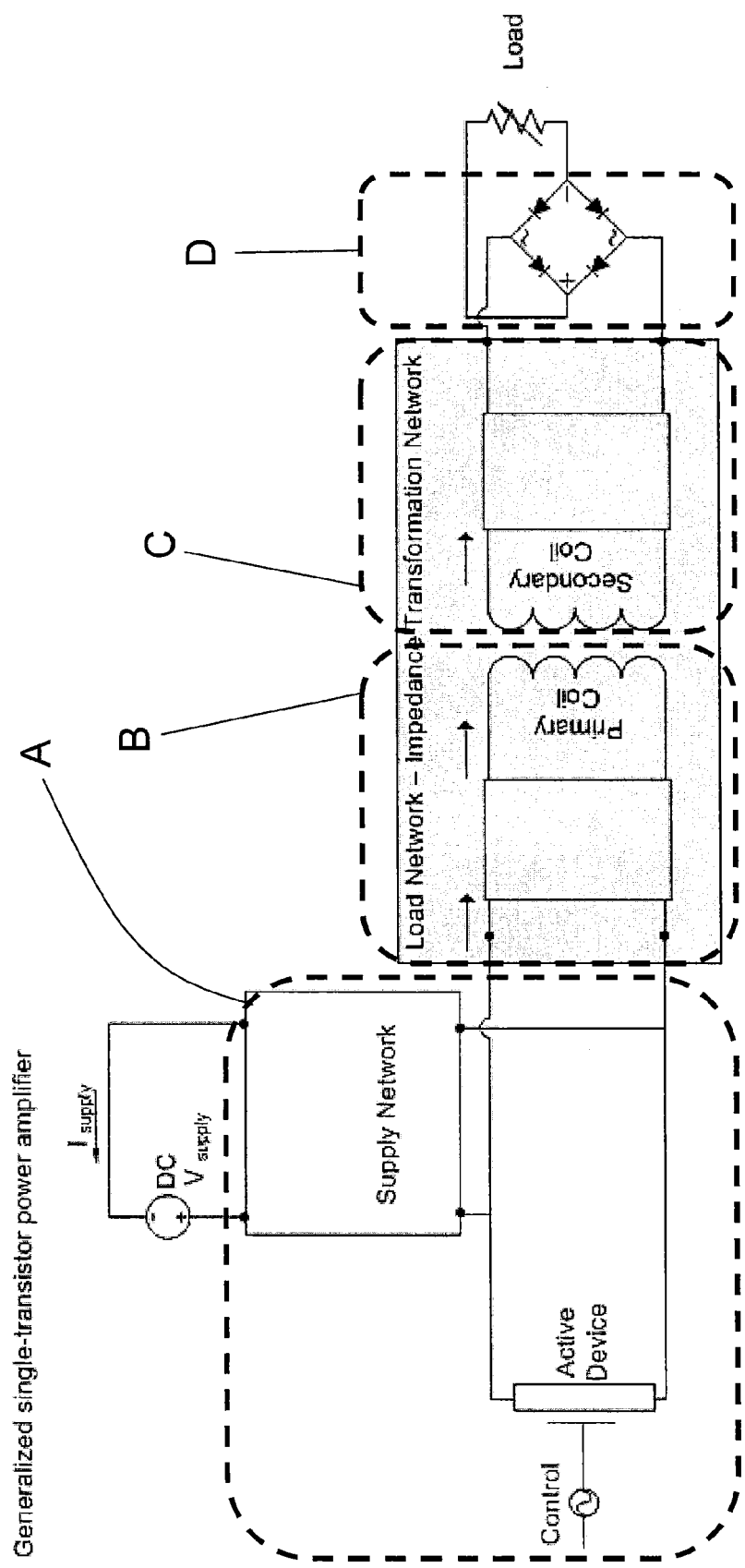
FIG. 39 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

FIG. 39 shows the circuitry shown in FIG. 68 with dotted lines, labeled A, B, C, and D, around portions of the circuitry to show one embodiment of how the circuitry can be split between a transmitter unit, for example a transmitter pad, and a receiver unit.

Figure 40:
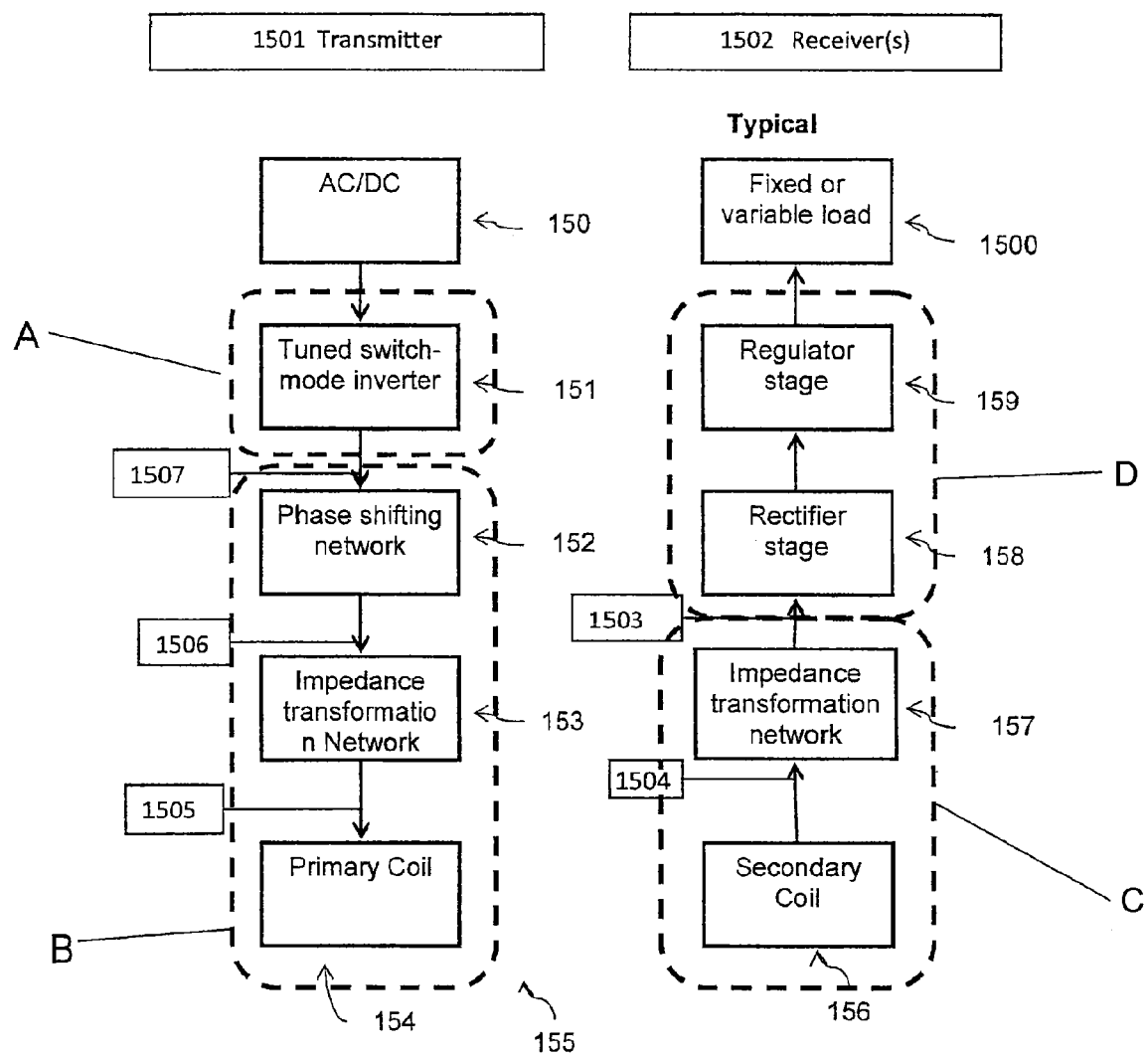
FIG. 40 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 39.

FIG. 40 shows the block diagram of FIG. 15 with dotted lines, labeled A, B, C, and D, around portions of the block diagram elements to show how the block diagram elements can be split between a transmitter unit, for example a transmitter pad, and a receiver unit, in accordance with the embodiment shown in FIG. 39.

Figure 41:
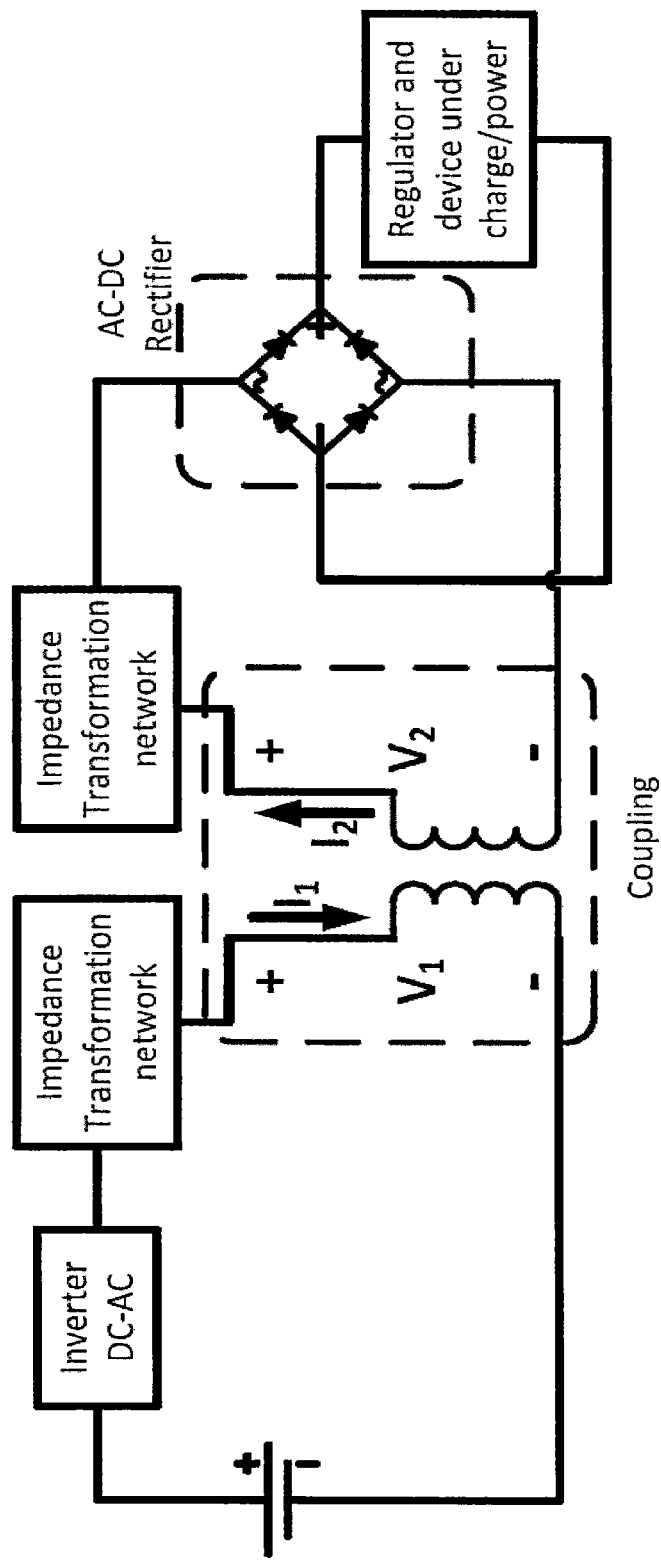
FIG. 41 shows a typical inductive coupling system.

FIG. 41 shows a typical inductive coupling system.

FIGS. 42-83 show various components and systems or subsystems that can be utilized with various embodiments of the invention, and/or data corresponding to various embodiments of the invention.

FIG. 42 shows some of the possible topologies for a single-element transformation network.

FIG. 43 shows some of the possible topologies for a single-element transformation network.

Figure 44:
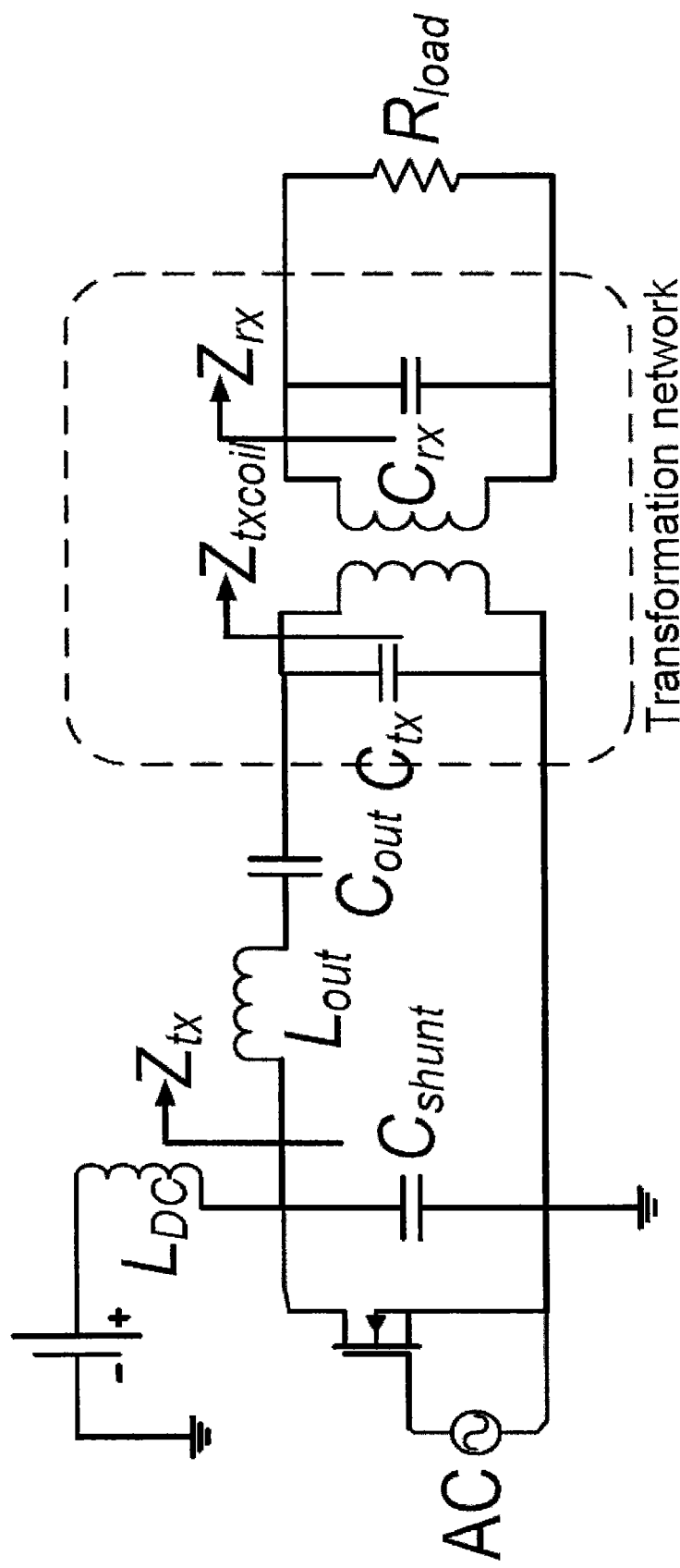
FIG. 44 shows a typical Class E driver using parallel-parallel transformation network.

FIG. 44 shows a typical Class E driver using parallel-parallel transformation network.

Figure 45:
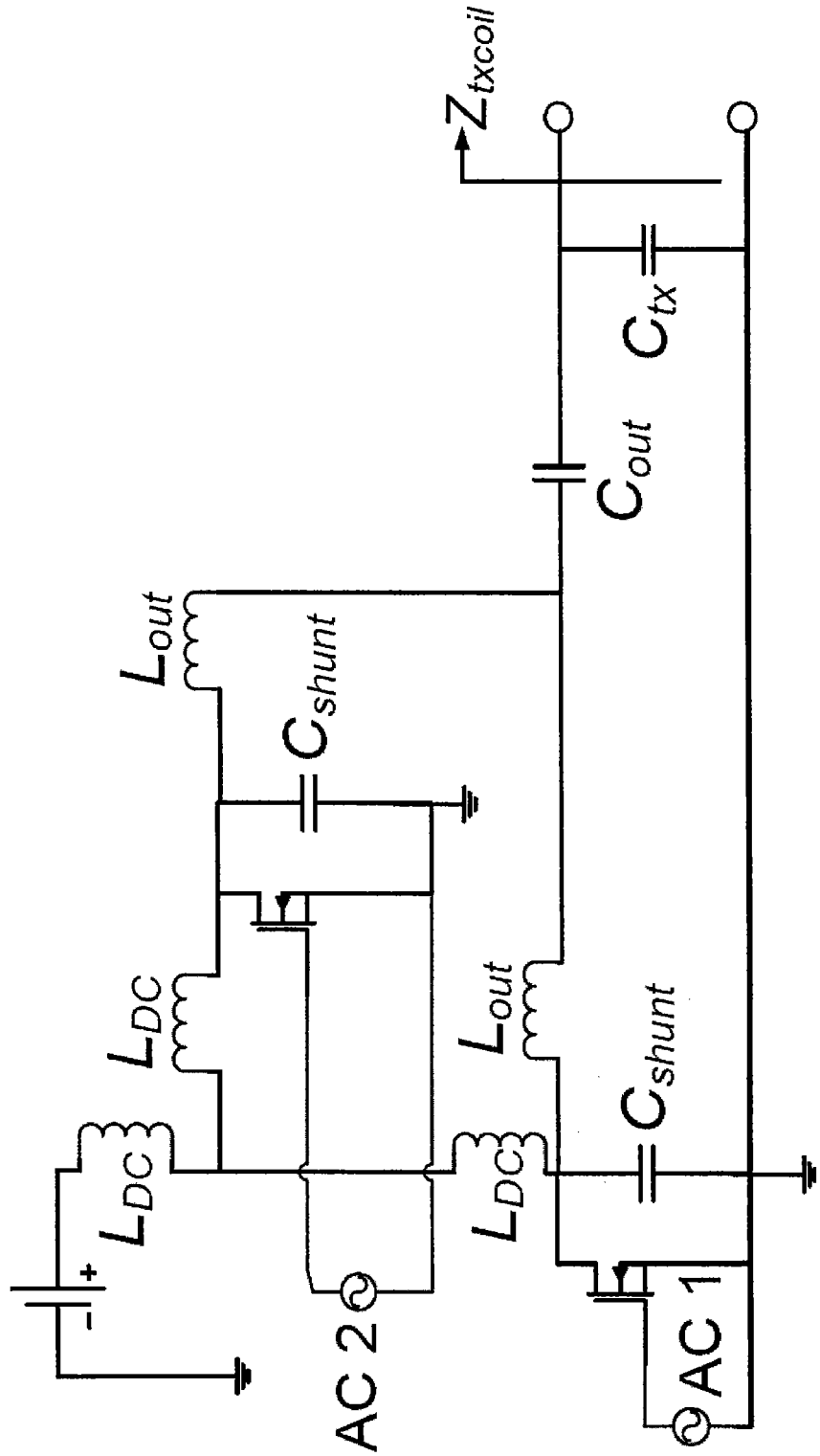
FIG. 45 shows a dual channel class E driver that can be used in accordance with an embodiment of the invention.

FIG. 45 shows a dual channel class E driver that can be used in accordance with an embodiment of the invention.

Figure 46:
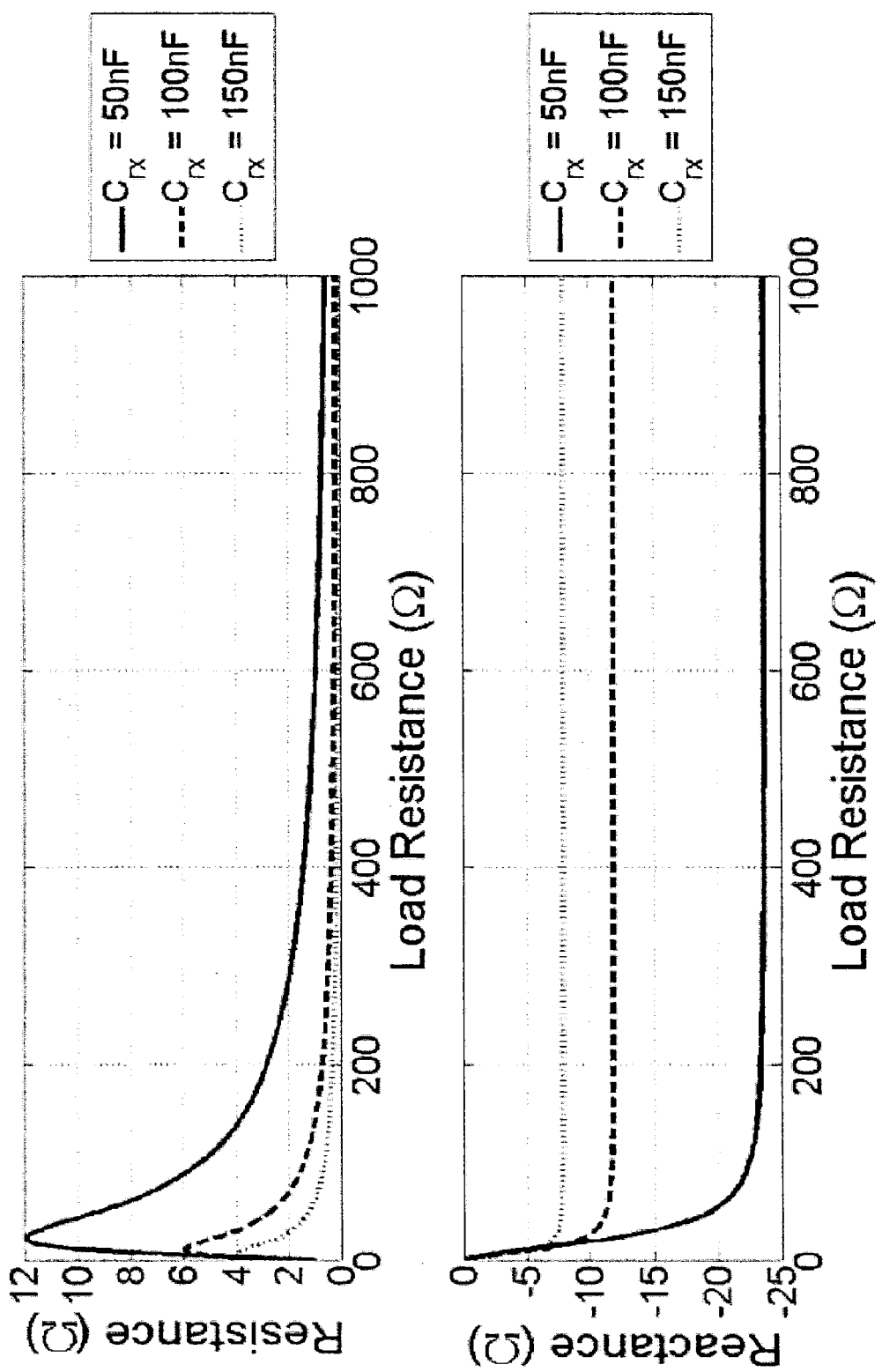
FIG. 46 shows an impedance response looking into receiver with different parallel capacitor value.

FIG. 46 shows an impedance response looking into receiver with different parallel capacitor value.

Figure 47:
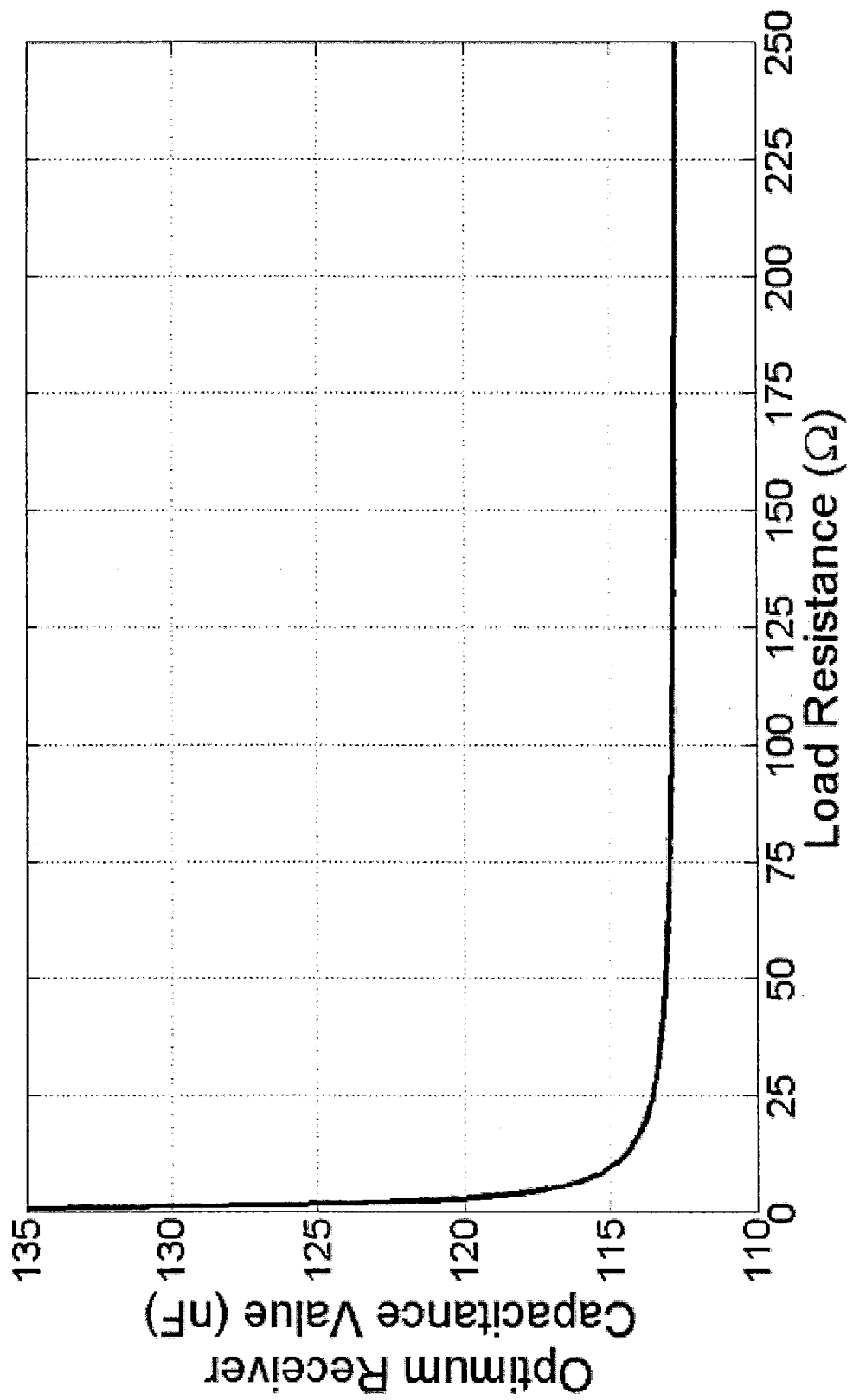
FIG. 47 shows an optimum receiver capacitor value across a range of load resistances to achieve maximum R looking into the transmitter coil.

FIG. 47 shows an optimum receiver capacitor value across a range of load resistances to achieve maximum R looking into the transmitter coil.

Figure 48A:
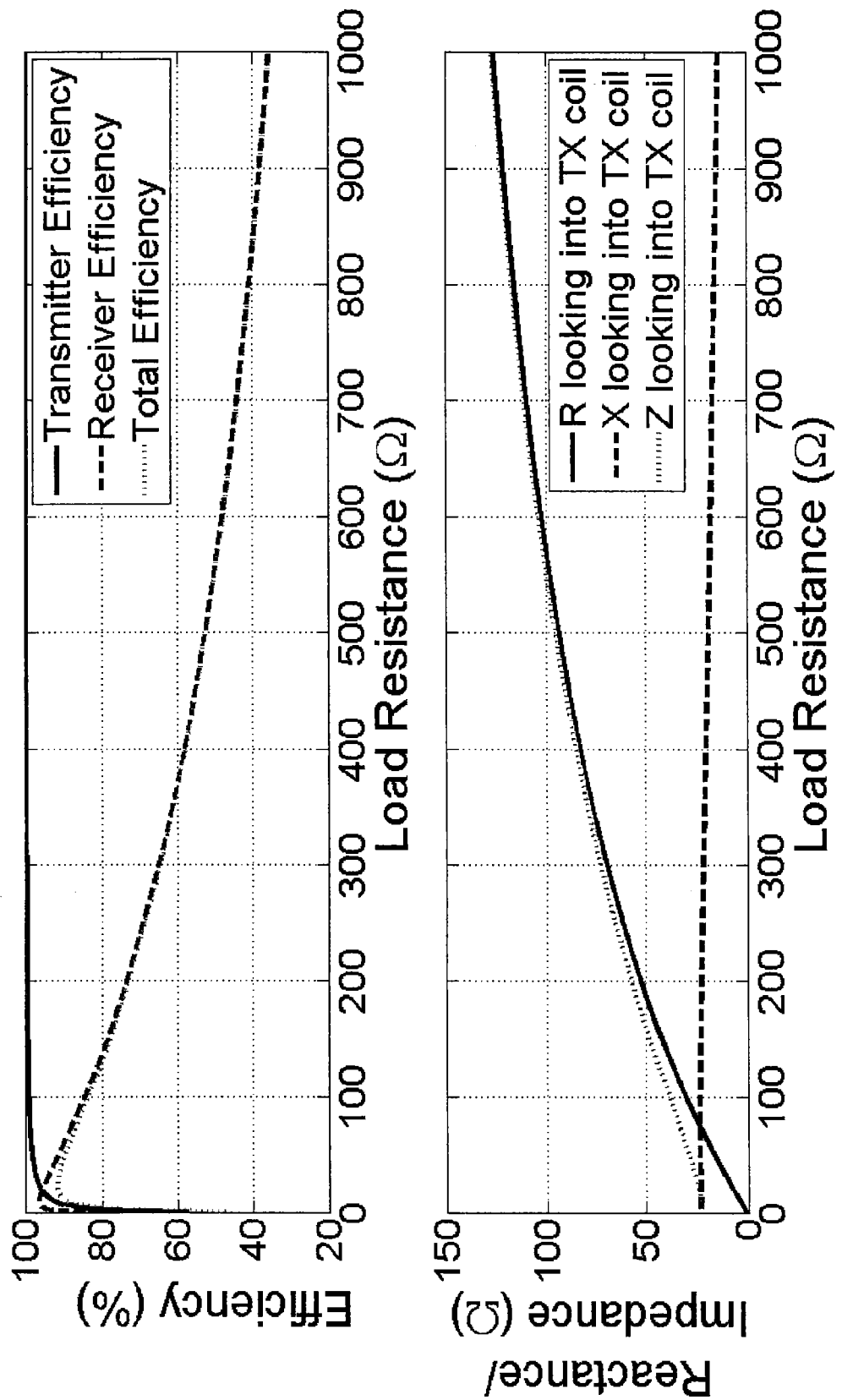
FIGS. 48A-48B show a coupling efficiency and transformed impedance looking into the primary coil.
Figure 48B:
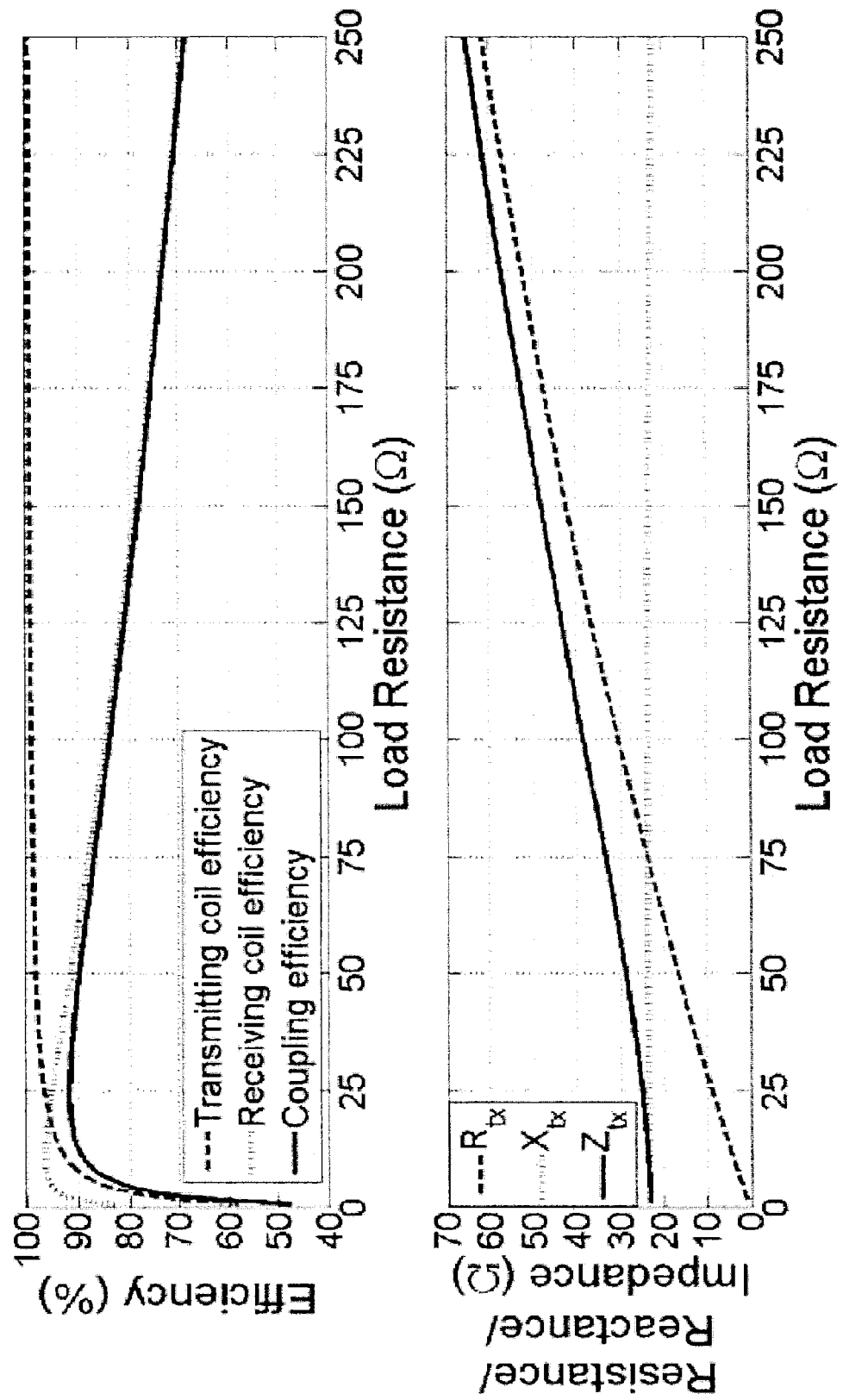

FIGS. 48A-48B show a coupling efficiency and transformed impedance looking into the primary coil.

Figure 49:
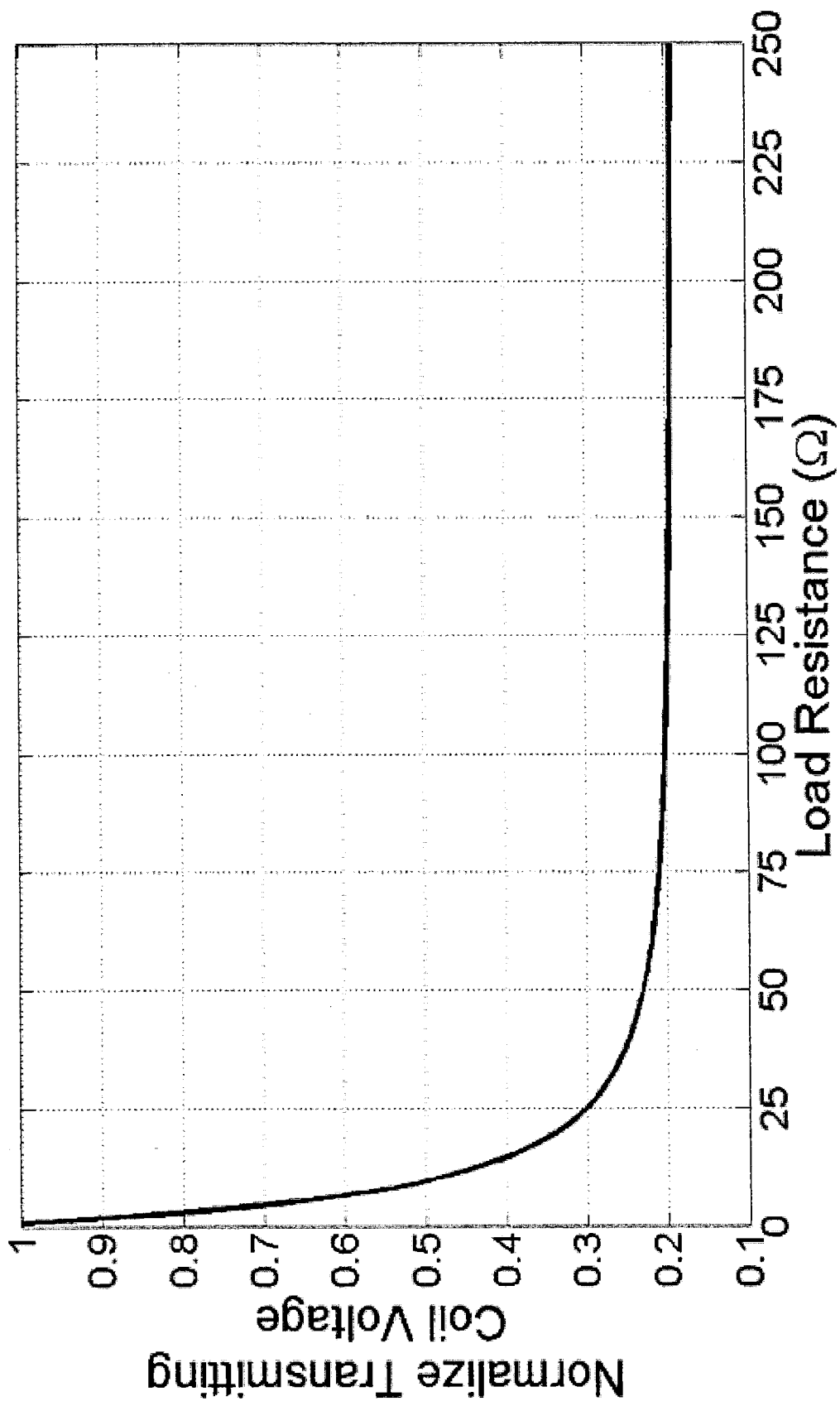
FIG. 49 shows a normalize primary coil voltage across a range of load resistances.

FIG. 49 shows a normalize primary coil voltage across a range of load resistances.

Figure 50:
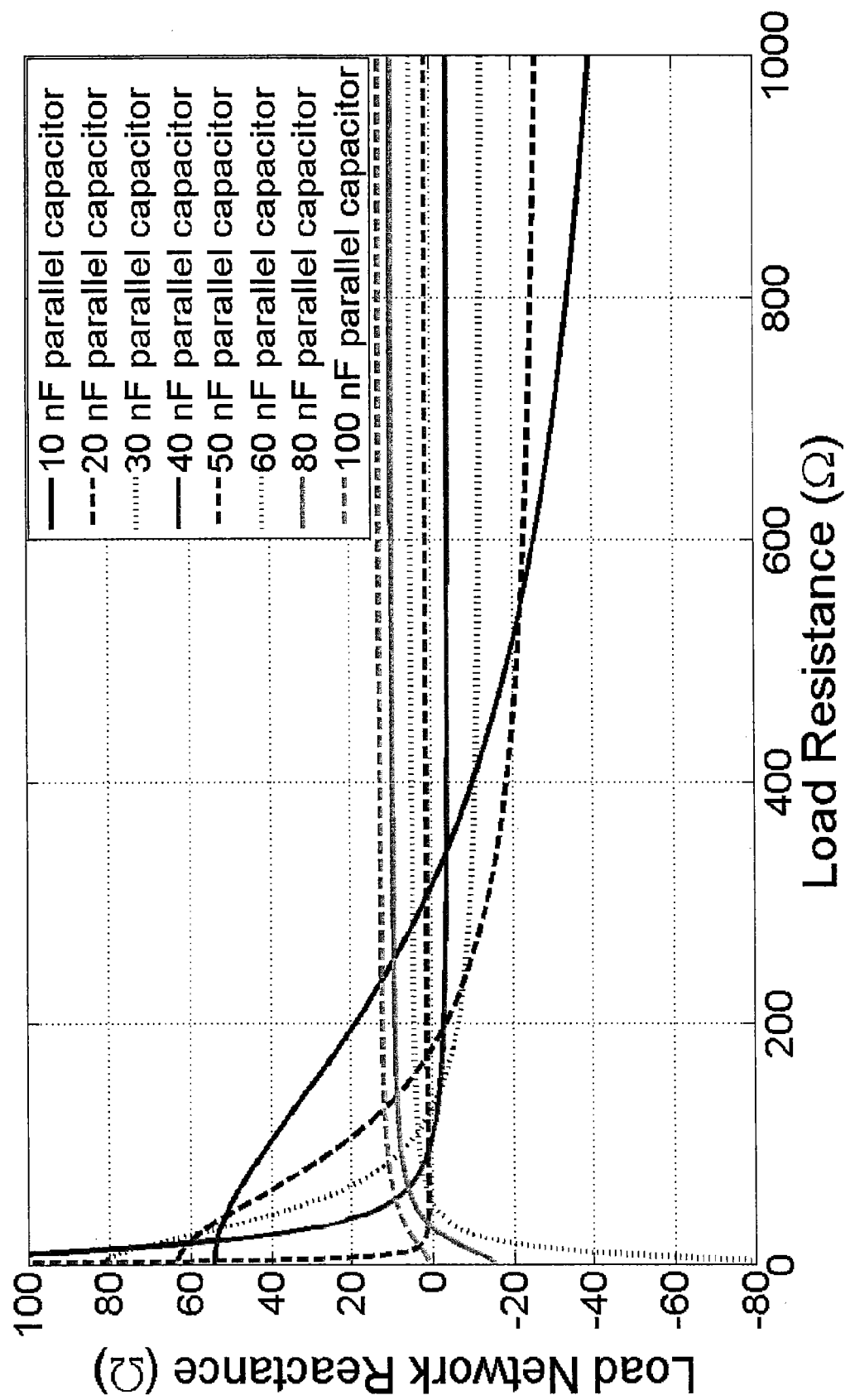
FIG. 50 shows a load network reactance with different transmitter capacitor.

FIG. 50 shows a load network reactance with different transmitter capacitor.

Figure 51:
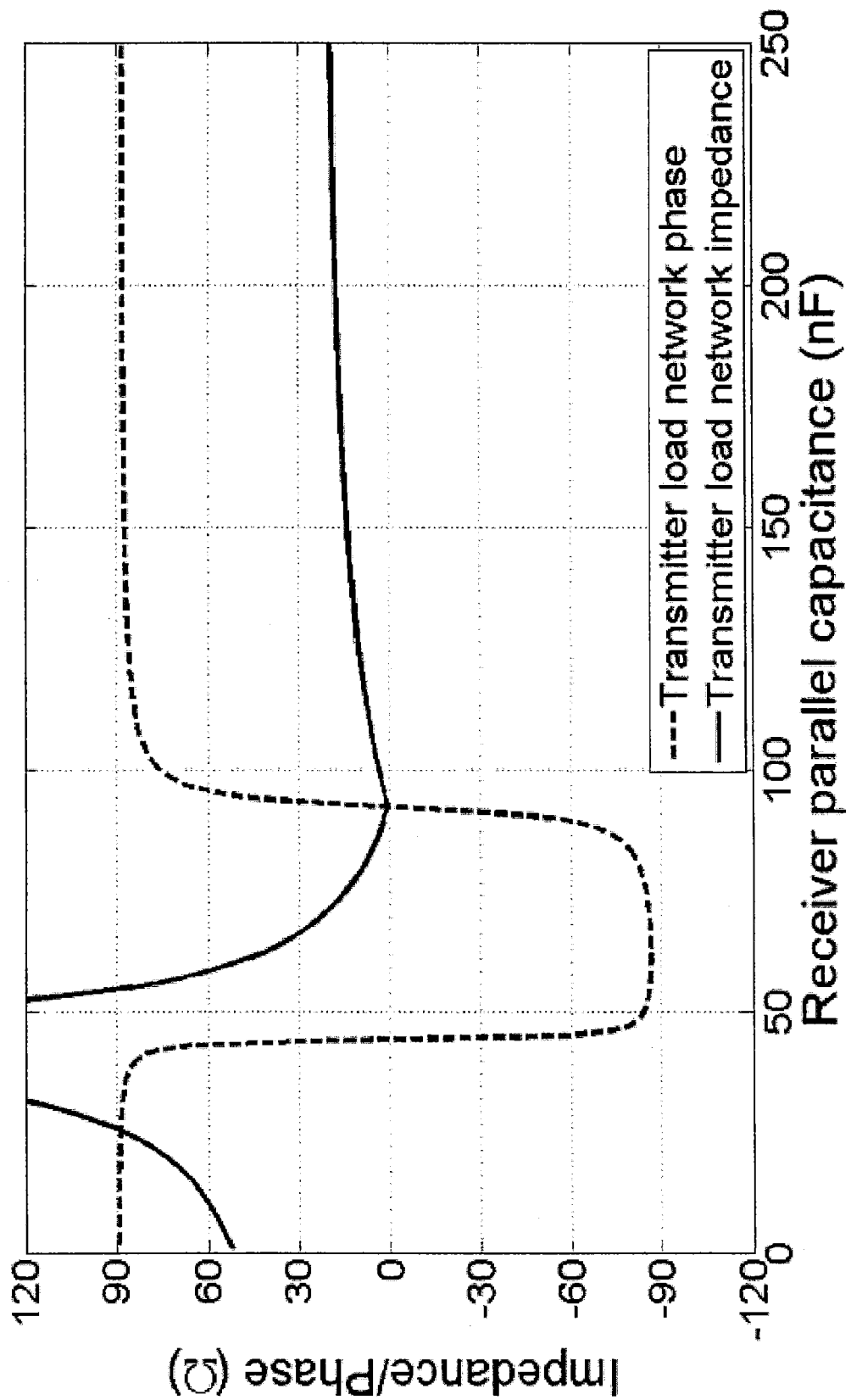
FIG. 51 shows an amplitude and phase of impedance of unloaded transmitter load network with different $C_{tx}$.

FIG. 51 shows an amplitude and phase of impedance of unloaded transmitter load network with different $C_{tx}$.

Figure 52:
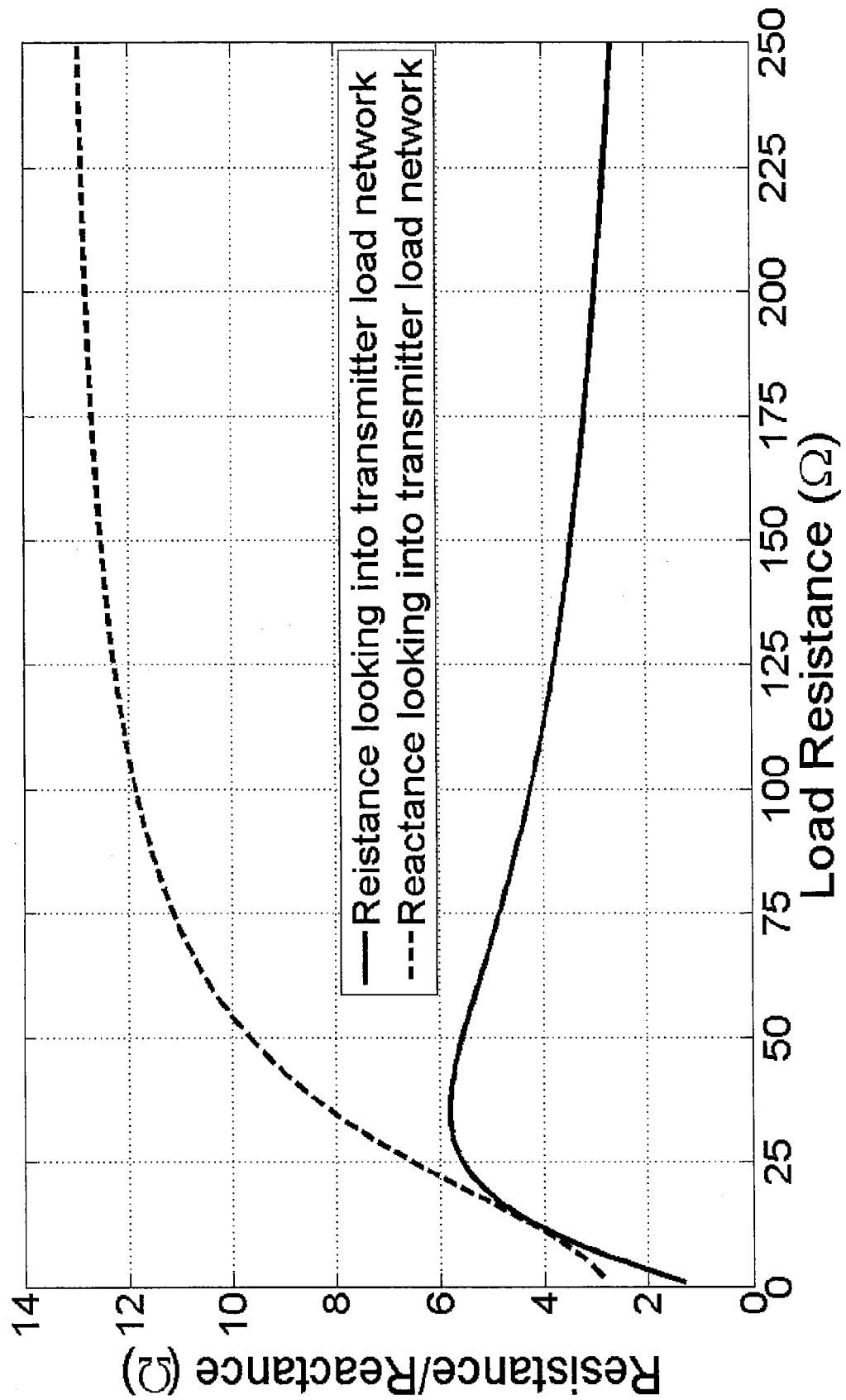
FIG. 52 shows an impedance looking into transmitter load network.

FIG. 52 shows an impedance looking into transmitter load network.

Figure 53:
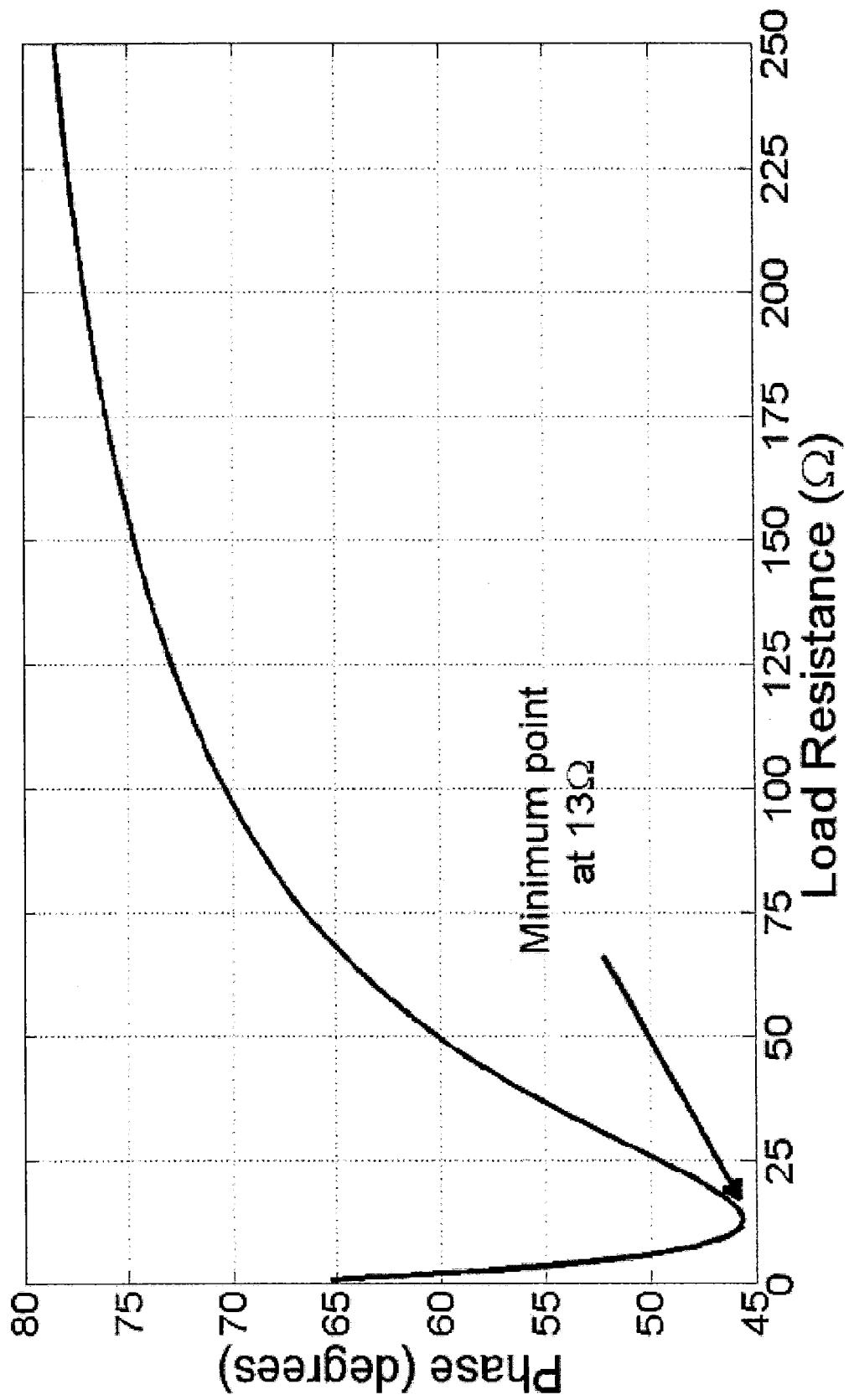
FIG. 53 shows a phase looking into transmitter load network.

FIG. 53 shows a phase looking into transmitter load network.

Figure 54:
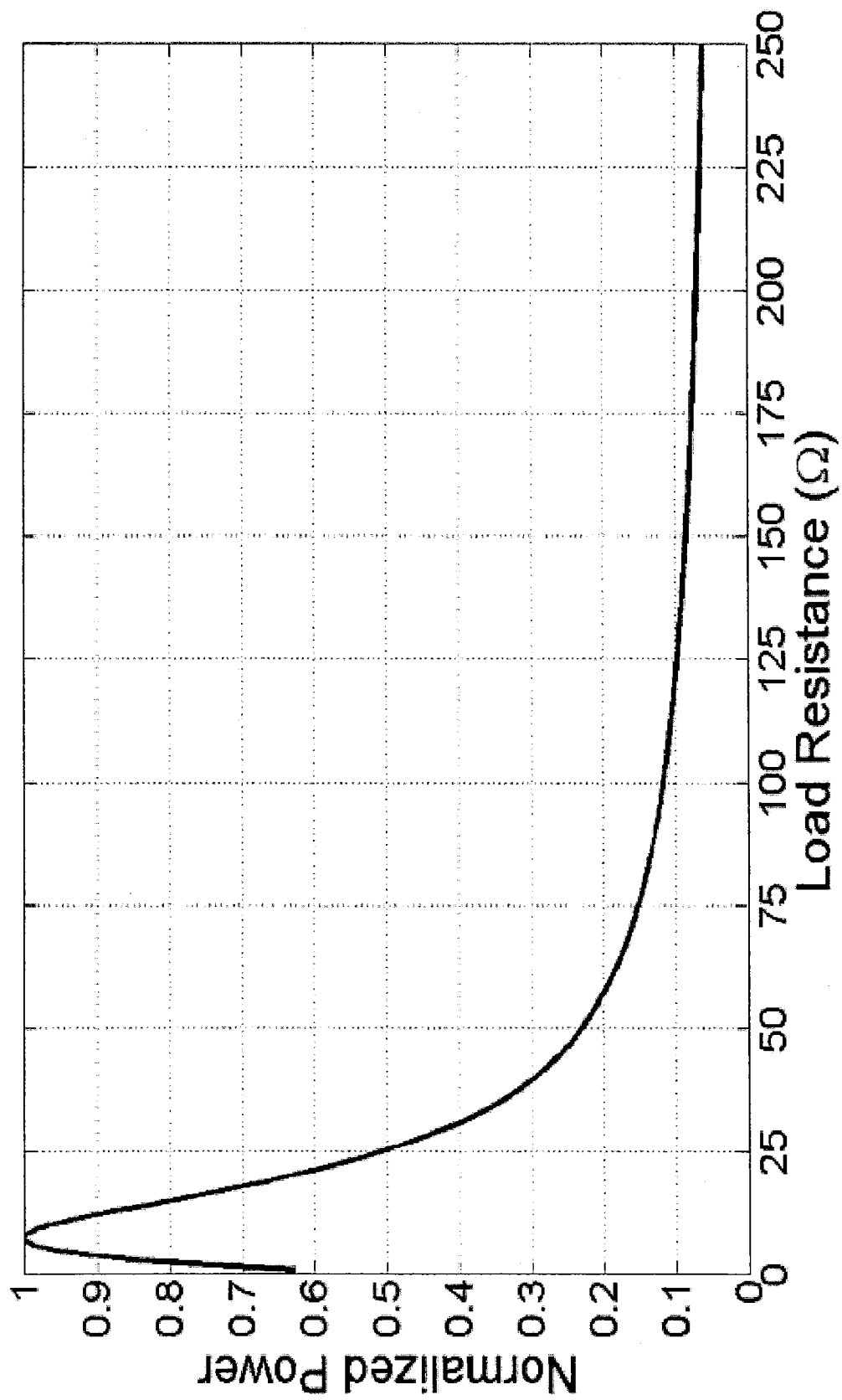
FIG. 54 shows a power delivered into the transmitting load network if transmitter is an ideal sine voltage source.

FIG. 54 shows a power delivered into the transmitting load network if transmitter is an ideal sine voltage source.

Figure 55:
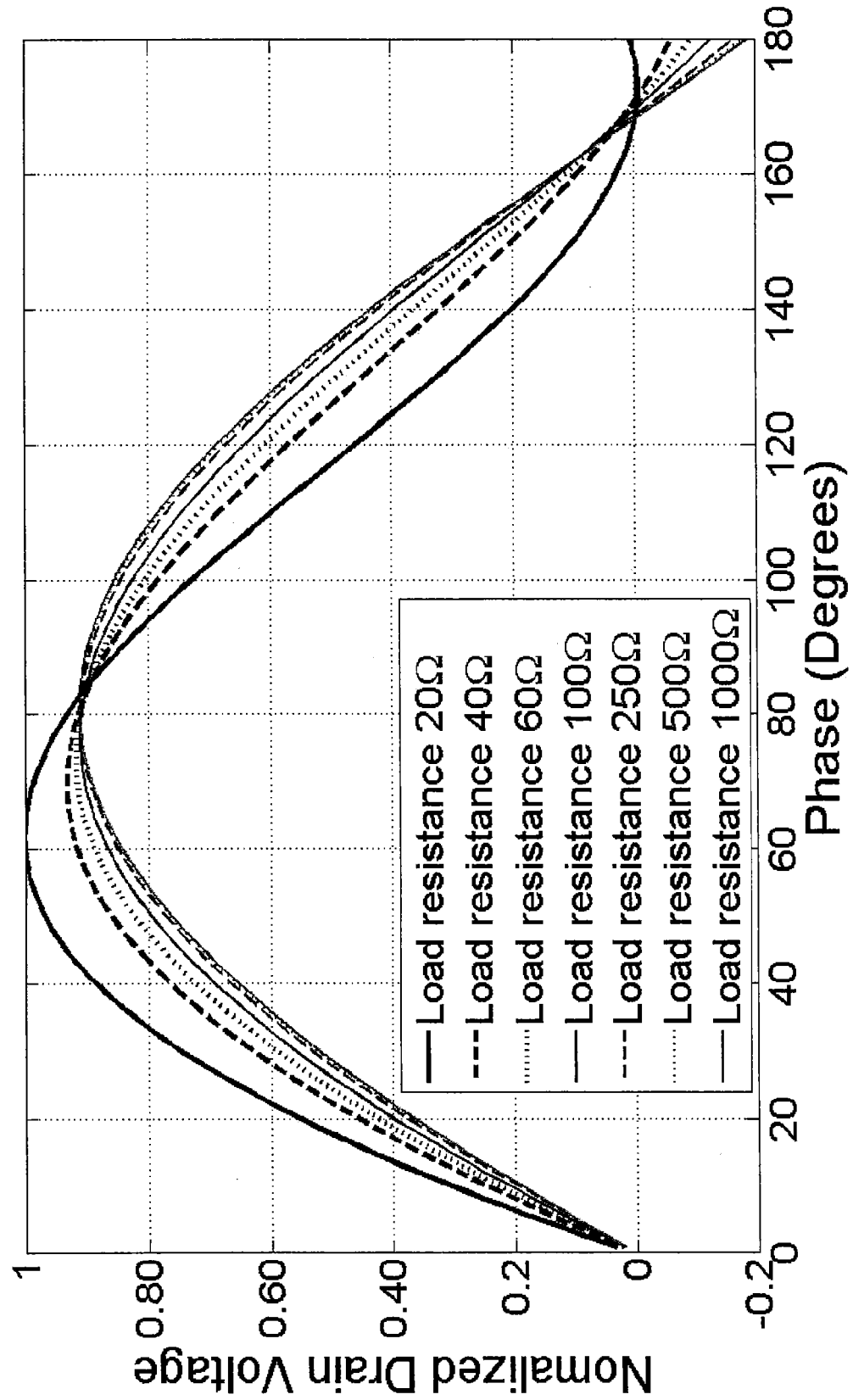
FIG. 55 shows a transistor drain voltage where $C_{shunt}=19$ nF.

FIG. 55 shows a transistor drain voltage where $C_{shunt}$=19 nF.

FIG. 56 shows a dual channel class E driver.

FIG. 57 shows a primary coil—10 turns (embedded into the table top) an secondary coil—5 turns (taped up).

FIG. 58 shows a power delivery and efficiency of 120V system with a peak power of 295 W.

Figure 59:
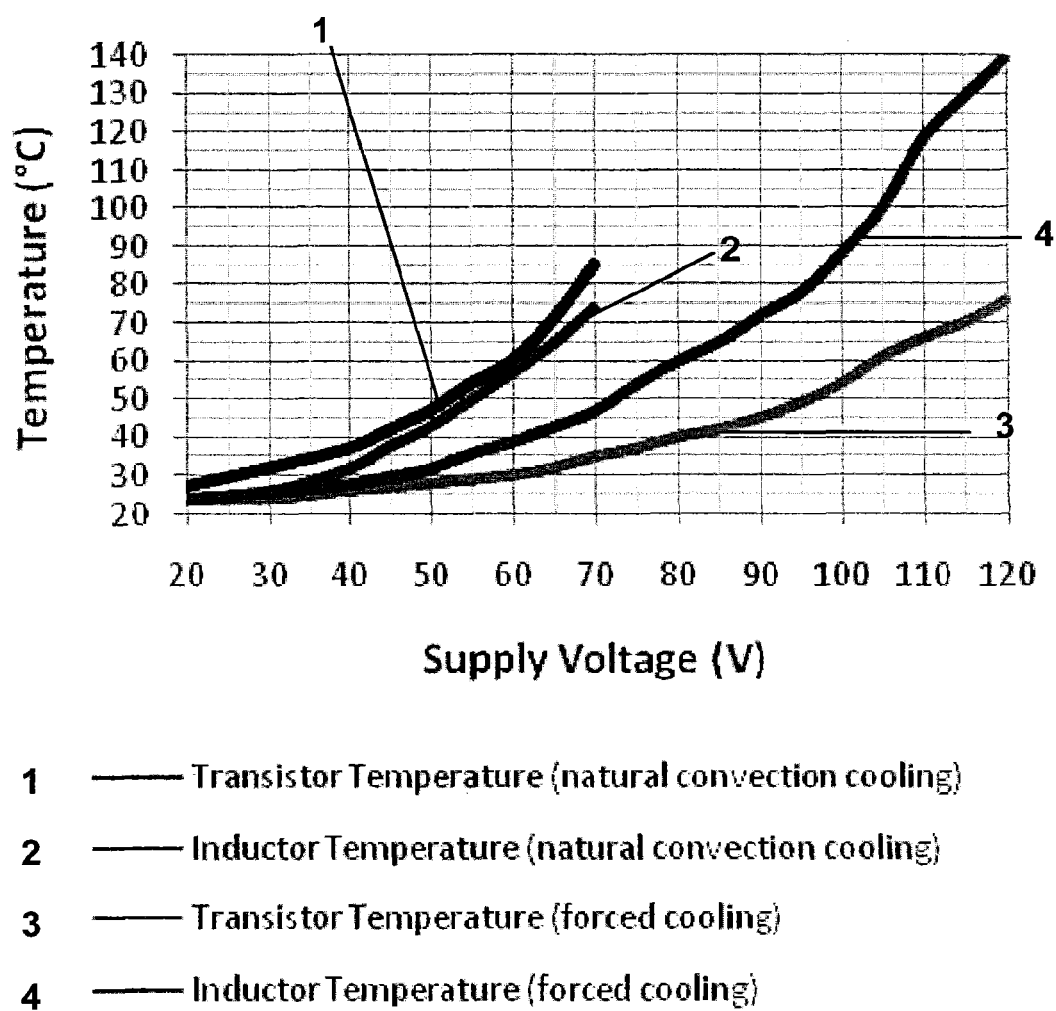
FIG. 59 shows a temperature of transistor and inductor with natural convection cooling and forced cooling.

FIG. 59 shows a temperature of transistor and inductor with natural convection cooling and forced cooling.

Figure 60:
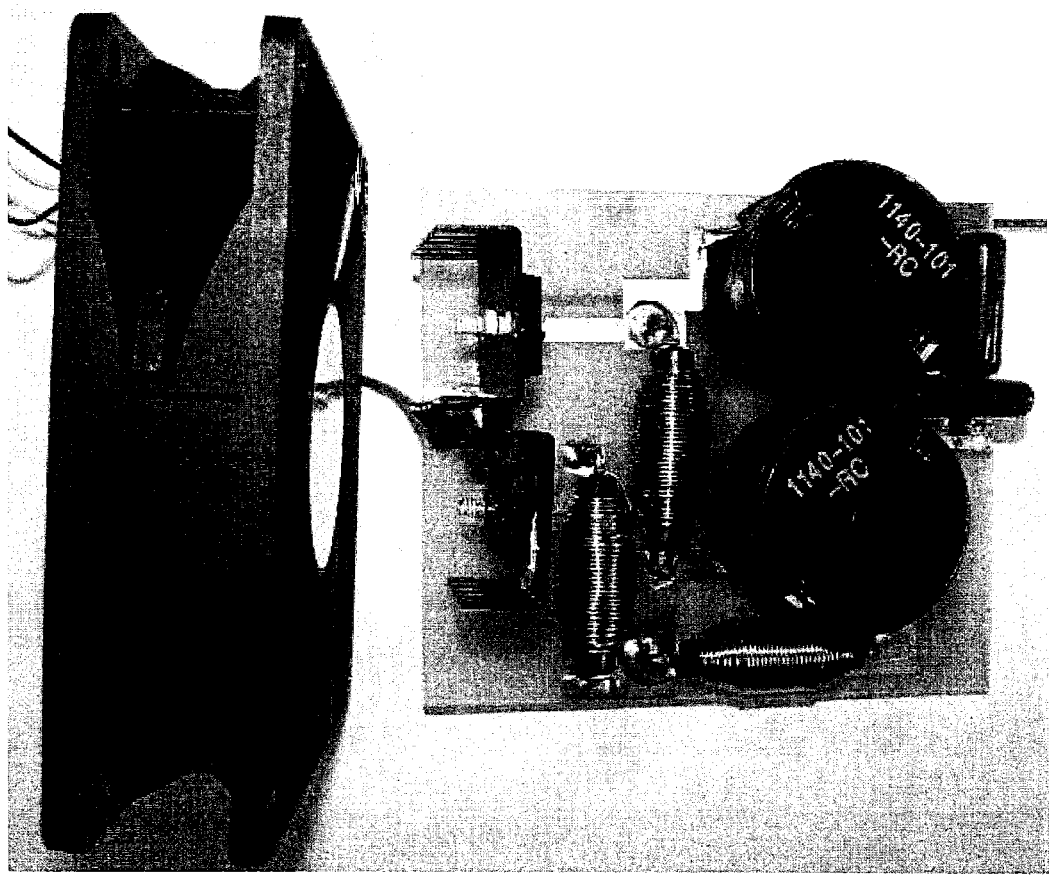
FIG. 60 shows a dual channel class E with forced air cooling.

FIG. 60 shows a dual channel class E with forced air cooling.

Figure 61:
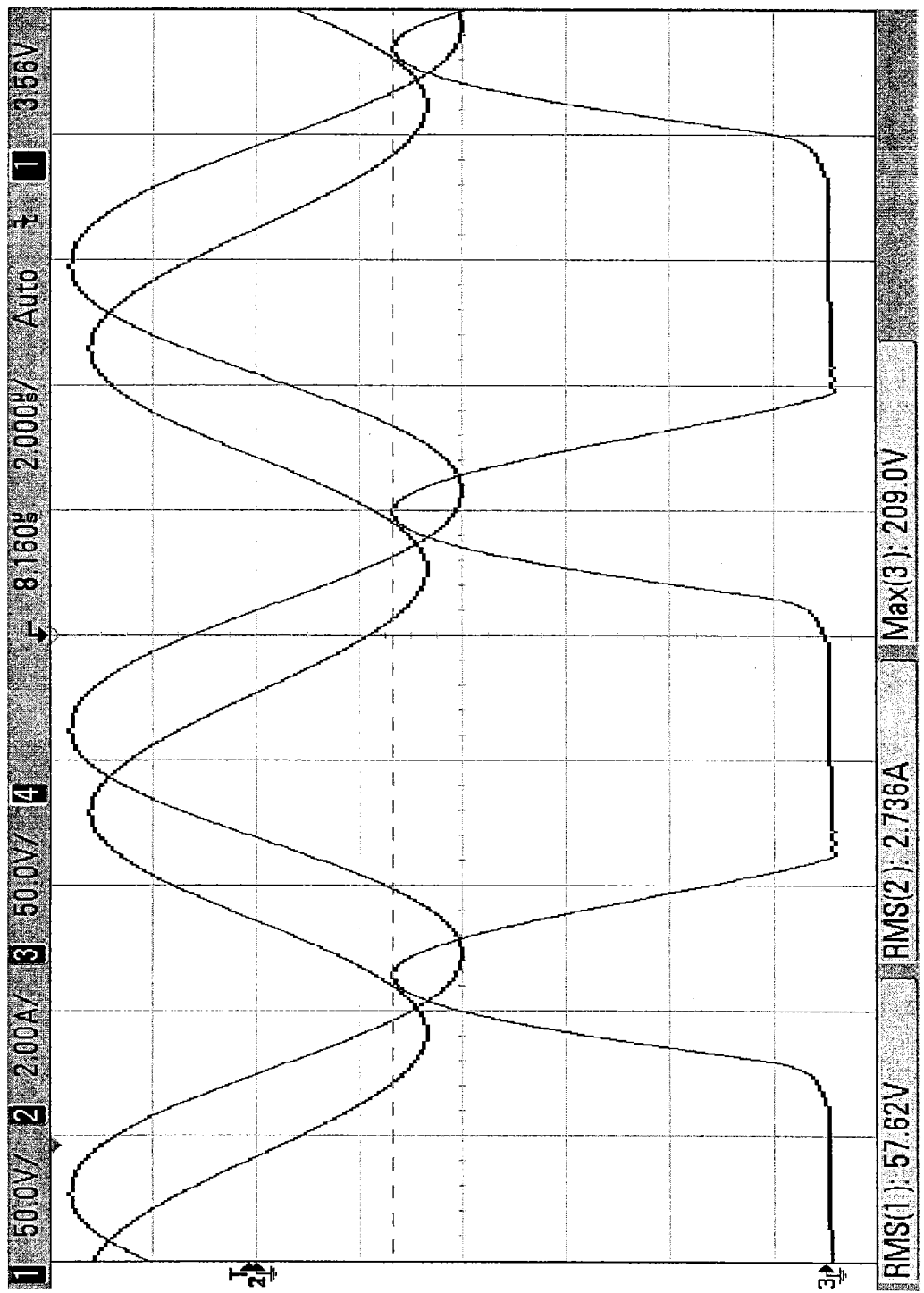
FIG. 61 shows a waveform of the class E driver.

FIG. 61 shows a waveform of the class E driver.

FIGS. 62A-62B show power delivered to load with respect to load resistance. Peak power occurs at approximately 50Ω load resistance for dual channel at 69 W for dual channel and 75Ω for single channel at 10 W for single channel.

FIG. 63 shows system efficiency with respect to load resistance with both peak efficiency of 64.5% for single channel and 76% of dual channel at approximately 70Ω load resistance.

FIG. 64 shows transmitter efficiency with respect to load resistance. Peak transmitter efficiency occurs across the band of 60Ω to 100Ω load resistance at 90% for dual channel and 79% for single channel.

Figure 65:
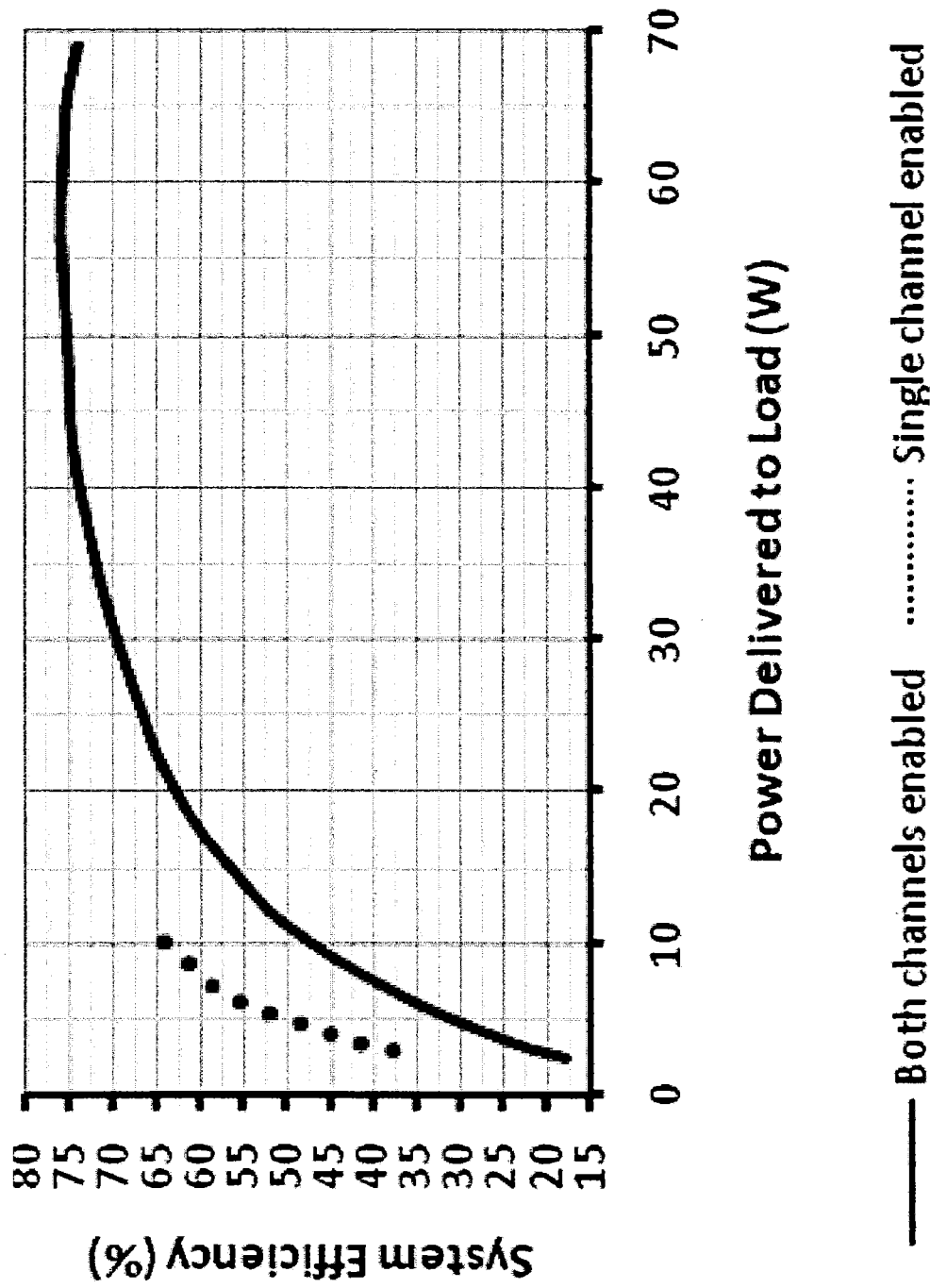
FIG. 65 shows system efficiency with respect to load resistance with both cases achieving high efficiency at heavy load and also illustrating that a single channel mode is more efficient at low power delivery state.

FIG. 65 shows system efficiency with respect to load resistance with both cases achieving high efficiency at heavy load and also illustrating that a single channel mode is more efficient at low power delivery state.

FIG. 66 shows primary coil RMS voltage having a unique load resistance for each value.

FIG. 67 shows receiver DC voltage converging to approximately 70V for dual channel and 37V for single channel.

FIG. 68 shows a generalized contactless power system with a single transistor power amplifier in a single ended configuration.

Figure 69:
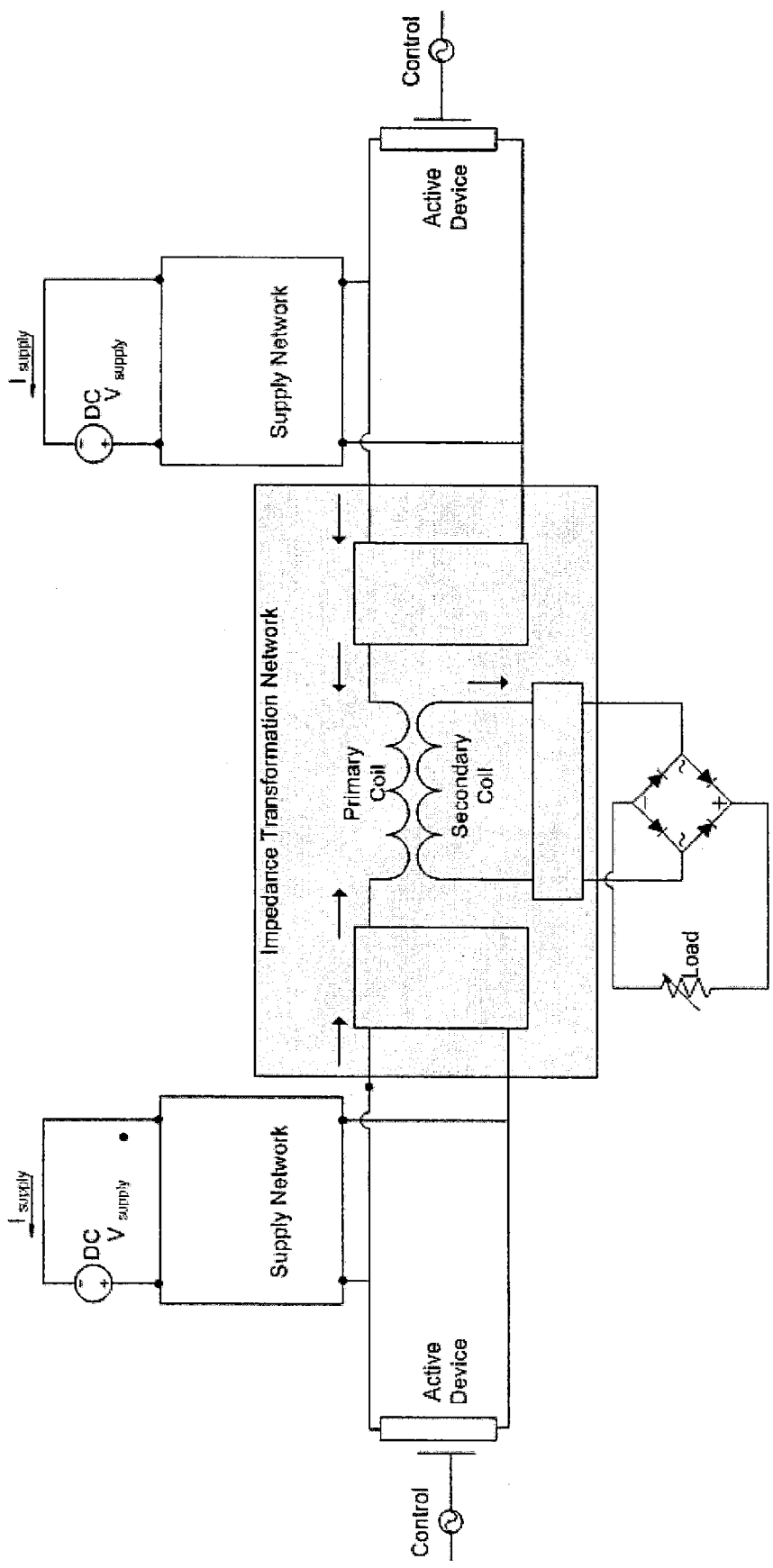
FIG. 69 shows a generalized contactless power system with two, single transistor power amplifiers in a push-pull configuration.

FIG. 69 shows a generalized contactless power system with two, single transistor power amplifiers in a push-pull configuration.

Figure 70:
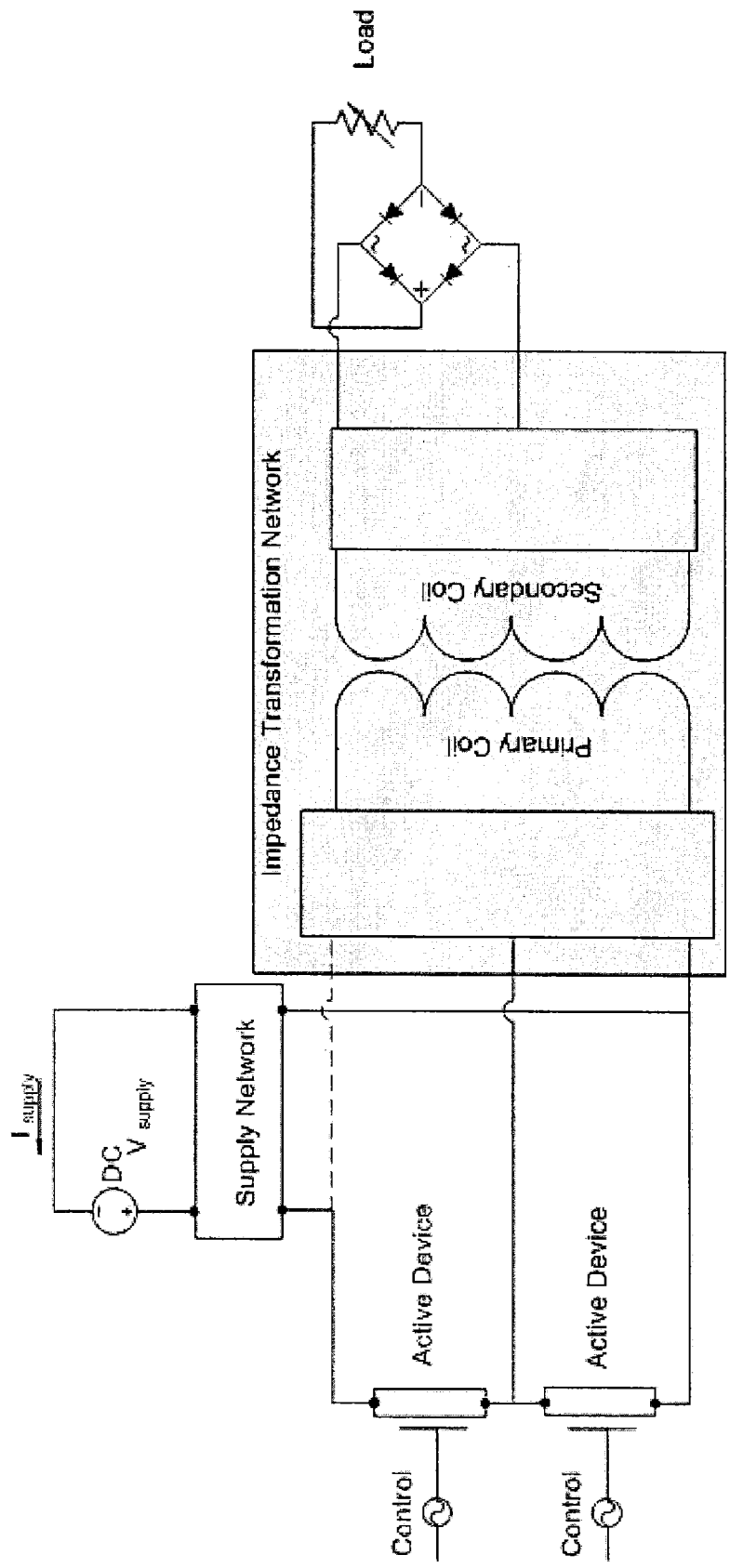
FIG. 70 shows a generalized contactless power with a two transistor power amplifier in a single ended configuration.

FIG. 70 shows a generalized contactless power with a two transistor power amplifier in a single ended configuration.

Figure 71:
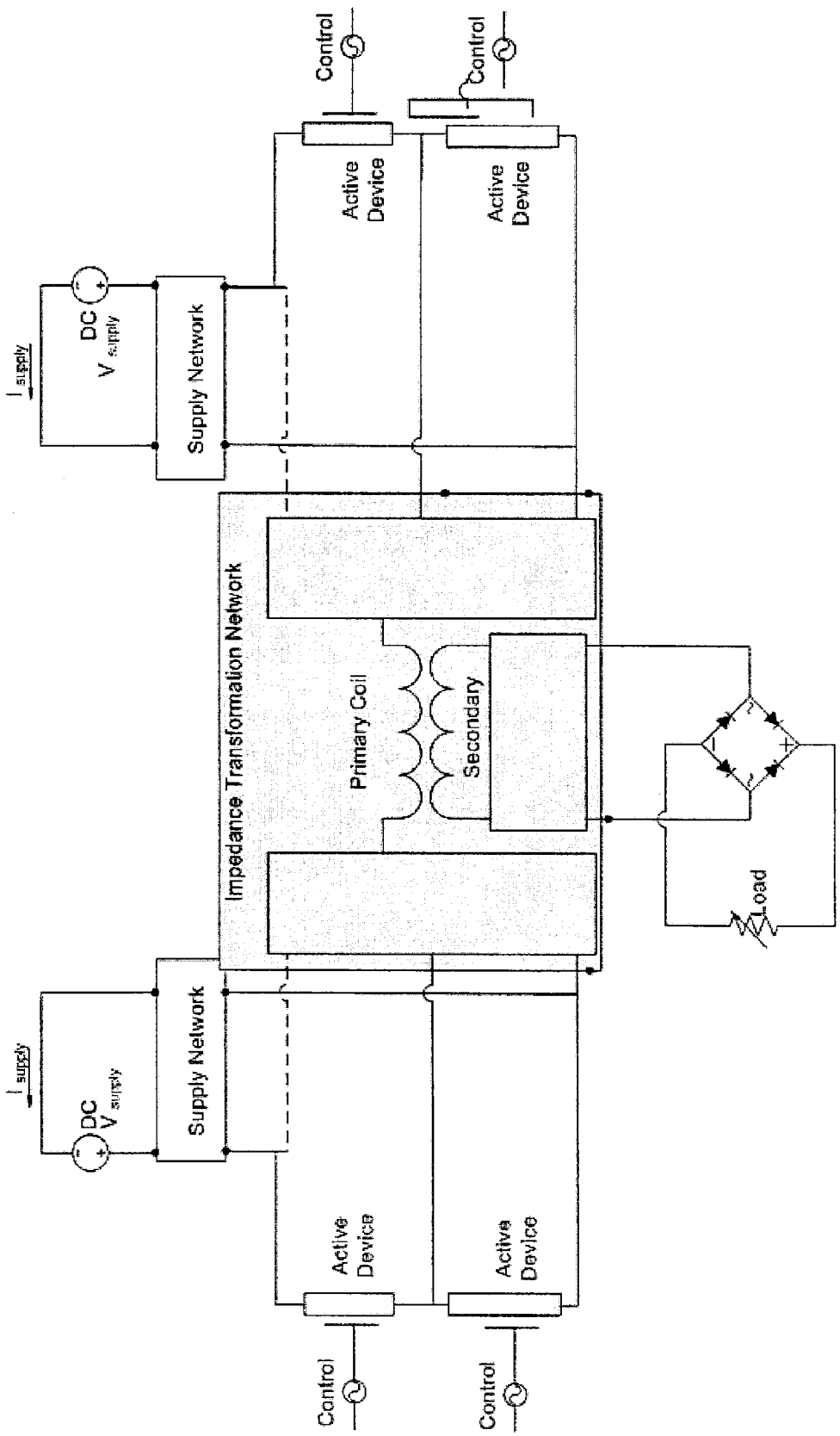
FIG. 71 shows a generalized contactless power system with two, two transistor power amplifiers in a push-pull configuration.

FIG. 71 shows a generalized contactless power system with two, two transistor power amplifiers in a push-pull configuration.

Figure 72:
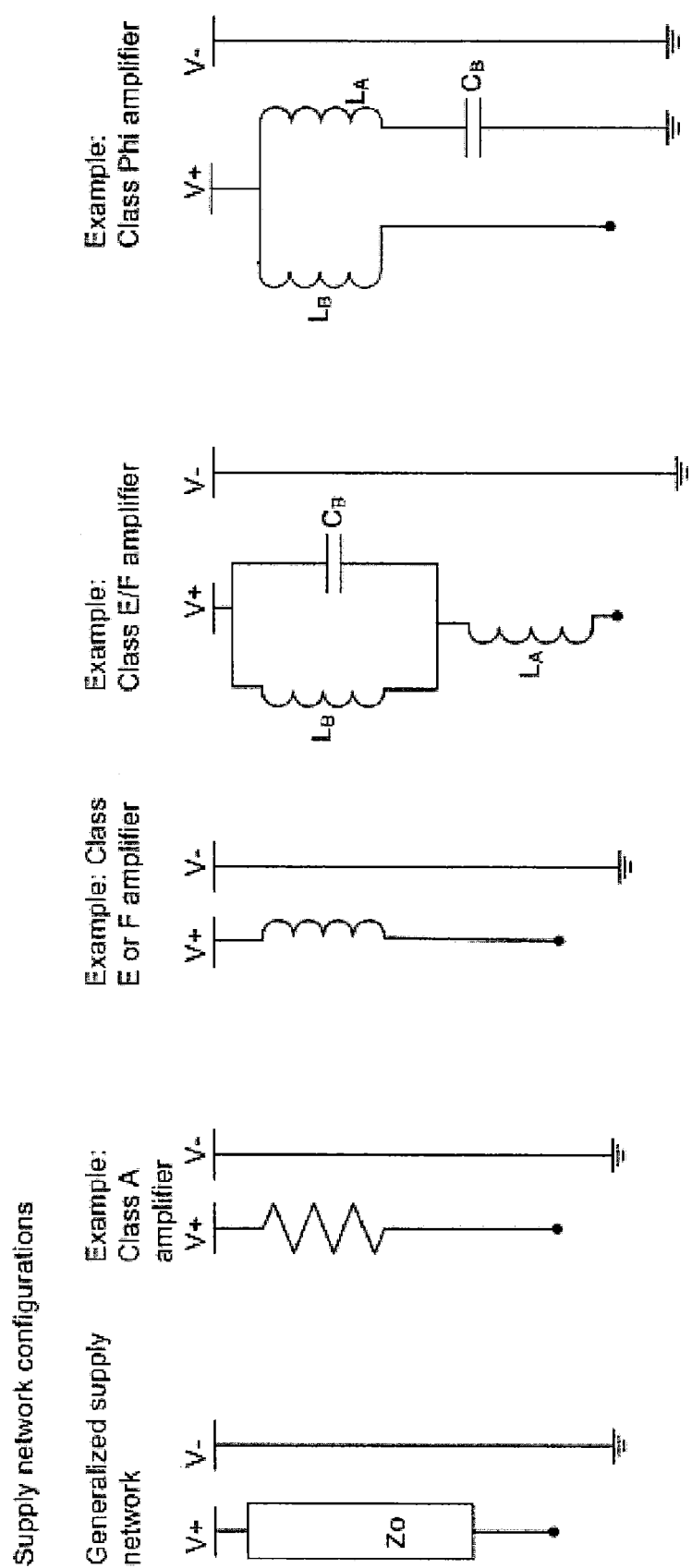
FIG. 72 shows different supply network configurations that are used to connect a DC supply voltage to a terminal of the active device of a power amplifier.

FIG. 72 shows different supply network configurations that are used to connect a DC supply voltage to a terminal of the active device of a power amplifier.

Figure 73:
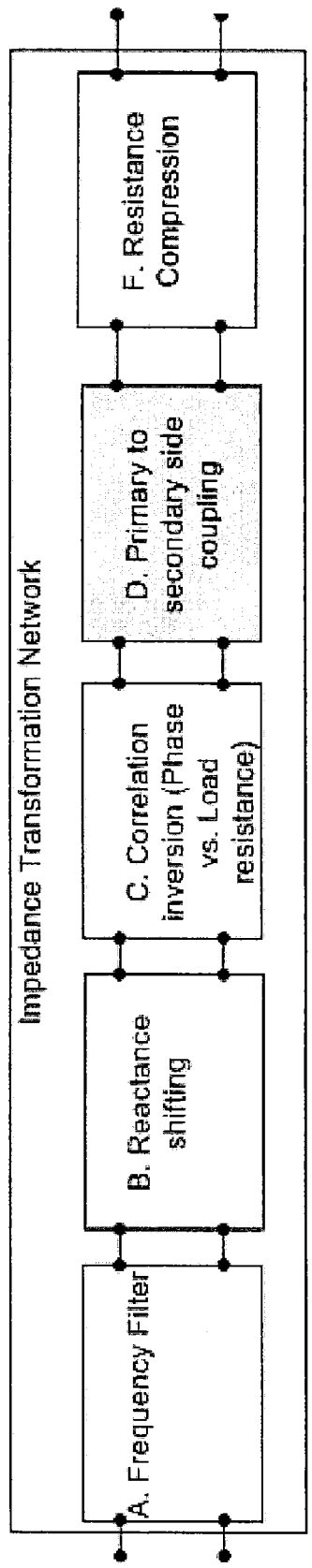
FIG. 73 shows the functions of a impedance transformation network for a single ended system in block diagram format. The functional blocks are arranged in no particular order and there can be multiples of the same functional blocks.

FIG. 73 shows the functions of a impedance transformation network for a single ended system in block diagram format. The functional blocks are arranged in no particular order and there can be multiples of the same functional blocks.

Figure 74:
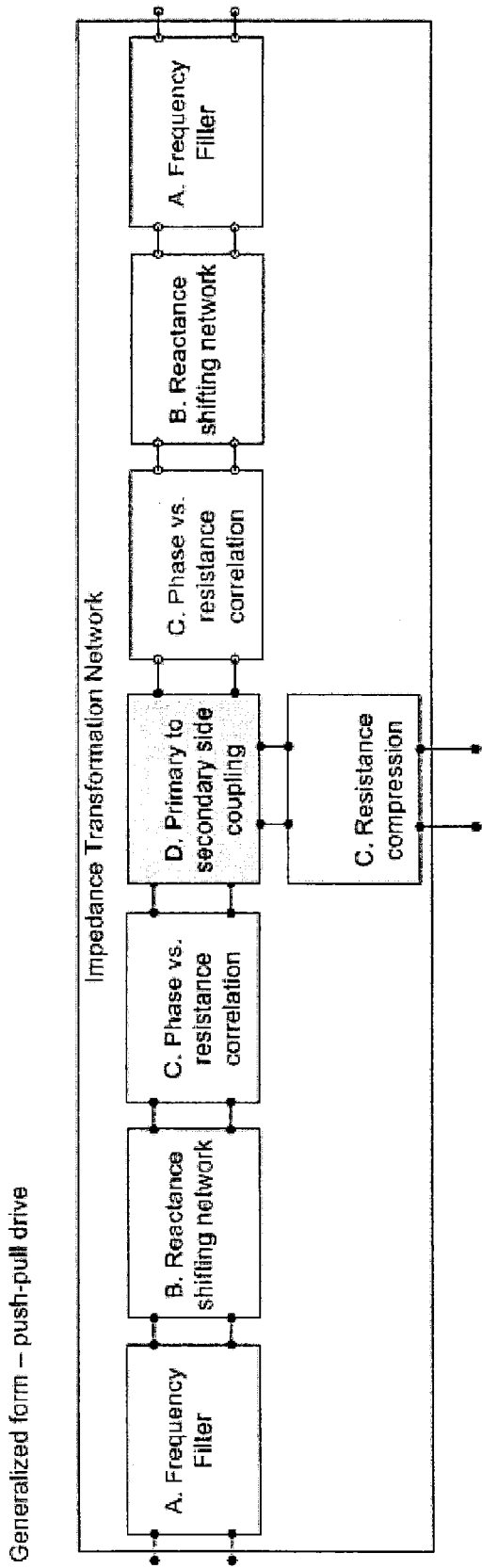
FIG. 74 shows the functions of a impedance transformation network for a push-pull system in block diagram format. The functional blocks are arranged in no particular order and there can be multiples of the same functional blocks.

FIG. 74 shows the functions of a impedance transformation network for a push-pull system in block diagram format. The functional blocks are arranged in no particular order and there can be multiples of the same functional blocks.

Figure 75:
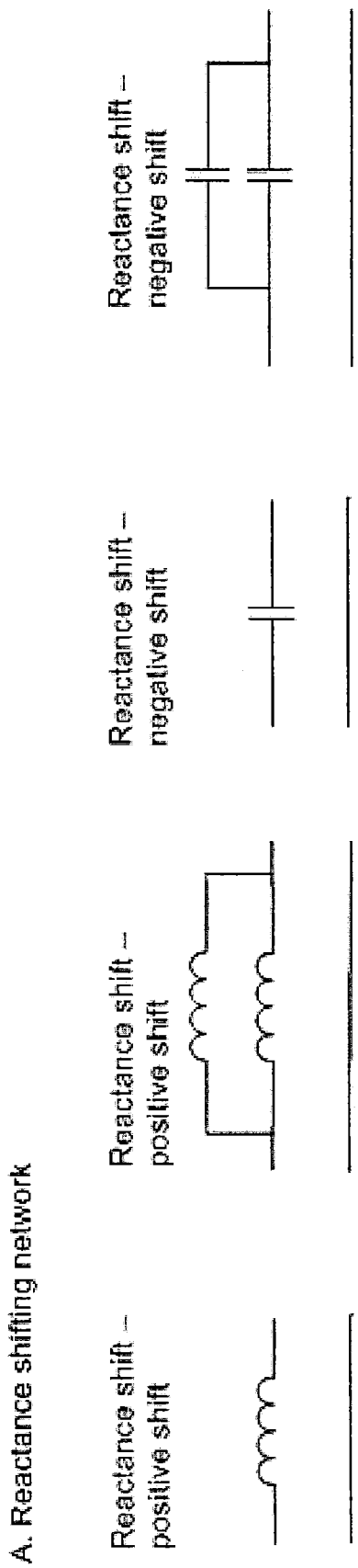
FIG. 75 shows various circuit elements arranged to achieve the function of reactance shifting. These circuit elements, or variants thereof, can add or remove the magnitude of reactance looking into the impedance transformation network. Inductive elements increase reactance. Capacitive elements decrease reactance.

FIG. 75 shows various circuit elements arranged to achieve the faction of reactance shifting. These circuit elements, or variants thereof, can add or remove the magnitude of reactance looking into the impedance transformation network. Inductive elements increase reactance. Capacitive elements decrease reactance.

FIG. 76 shows various circuit elements arranged to achieve the function of frequency filtering. Two notch filters are shown that can remove unwanted harmonics from the signal. A combination of other filter types can be used to achieve frequency filtering.

Figure 77:
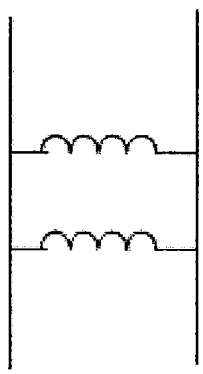
FIG. 77 shows various circuit elements arranged to adjust the correlation between the equivalent resistance and the phase of the load. Inductive elements will tend to result in a positive correlation between phase and load resistance. Capacitive elements will tend to result in a negative correlation between phase and load resistance. These elements can also serve the purpose of resistance compression.
Figure 77:
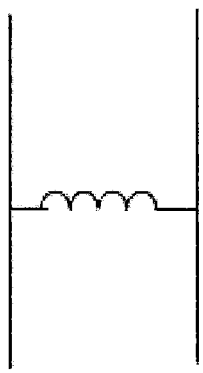
Figure 77:
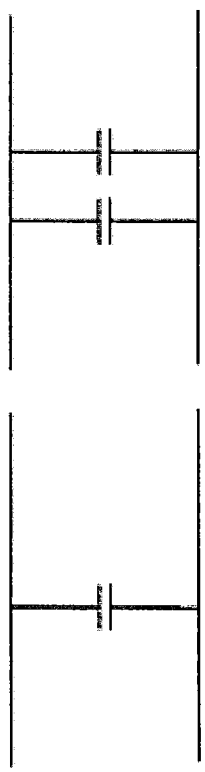

FIG. 77 shows various circuit elements arranged to adjust the correlation between the equivalent resistance and the phase of the load. Inductive elements will tend to result in a positive correlation between phase and load resistance. Capacitive elements will tend to result in a negative correlation between phase and load resistance. These elements can also serve the purpose of resistance compression.

Figure 78:
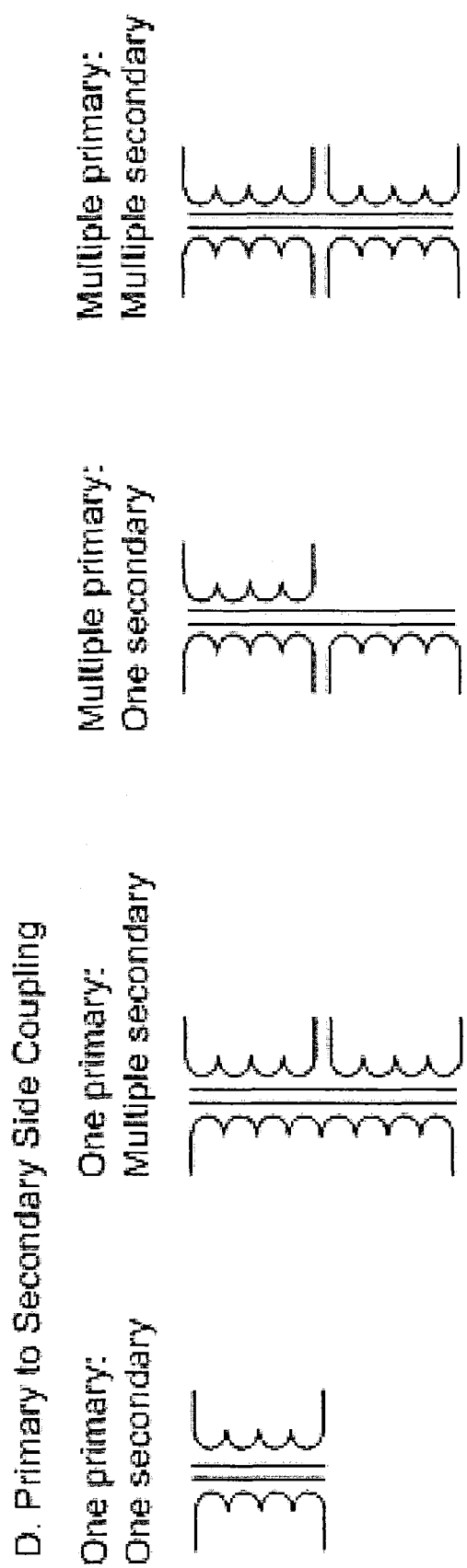
FIG. 78 shows primary to secondary coil configurations. The impedance transformation network may comprise a single primary and a single secondary. Alternatively, the impedance transformation network may comprise one or more primary coils coupled to one or more secondary coils. The inductance of the primary and/or secondary coil(s) can be used to compress resistance and change the phase vs. resistance relationship.

FIG. 78 shows primary to secondary coil configurations. The impedance transformation network may comprise a single primary and a single secondary. Alternatively, the impedance transformation network may comprise one or more primary coils coupled to one or more secondary coils. The inductance of the primary and/or secondary coil(s) can be used to compress resistance and change the phase vs. resistance relationship.

Figure 79:
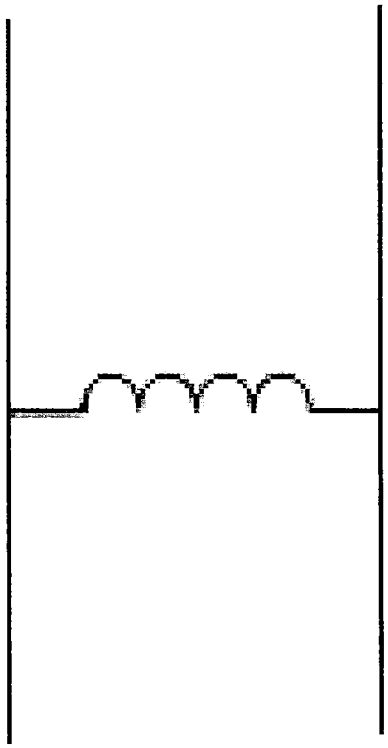
FIG. 79 show various circuit elements arranged to compress the resistance seen looking into the impedance transformation network. Either capacitive or inductive elements can be used.
Figure 79:
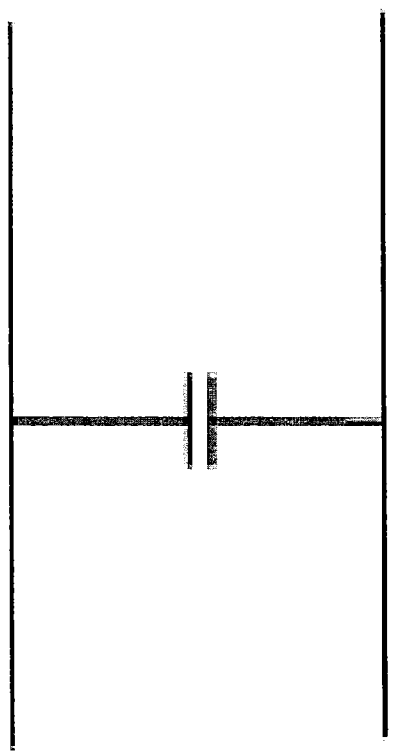

FIG. 79 show various circuit elements arranged to compress the resistance seen looking into the impedance transformation network. Either capacitive or inductive elements can be used.

Figure 80:
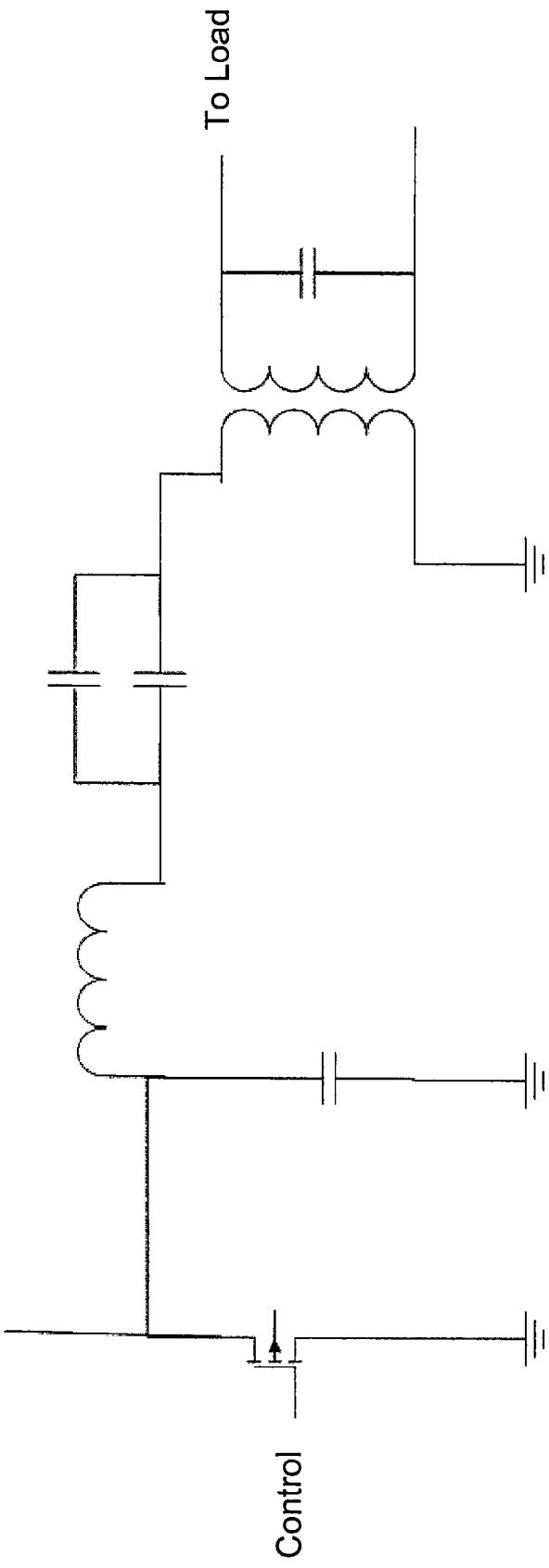
FIG. 80 shows a typical configuration of an impedance transformation network connected to an active device.

FIG. 80 shows a typical configuration of an impedance transformation network connected to an active device.

Figure 81:
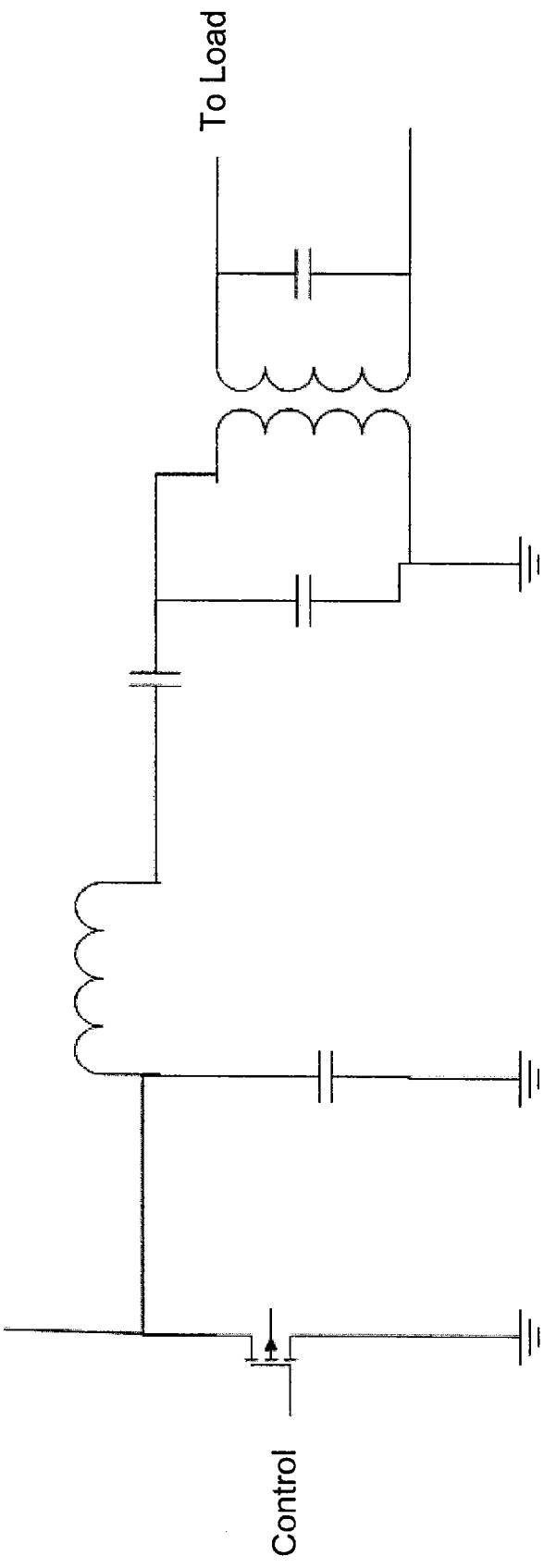
FIG. 81 shows a typical configuration of an impedance transformation network connected to an active device.

FIG. 81 shows a typical configuration of an impedance transformation network connected to an active device.

Figure 82:
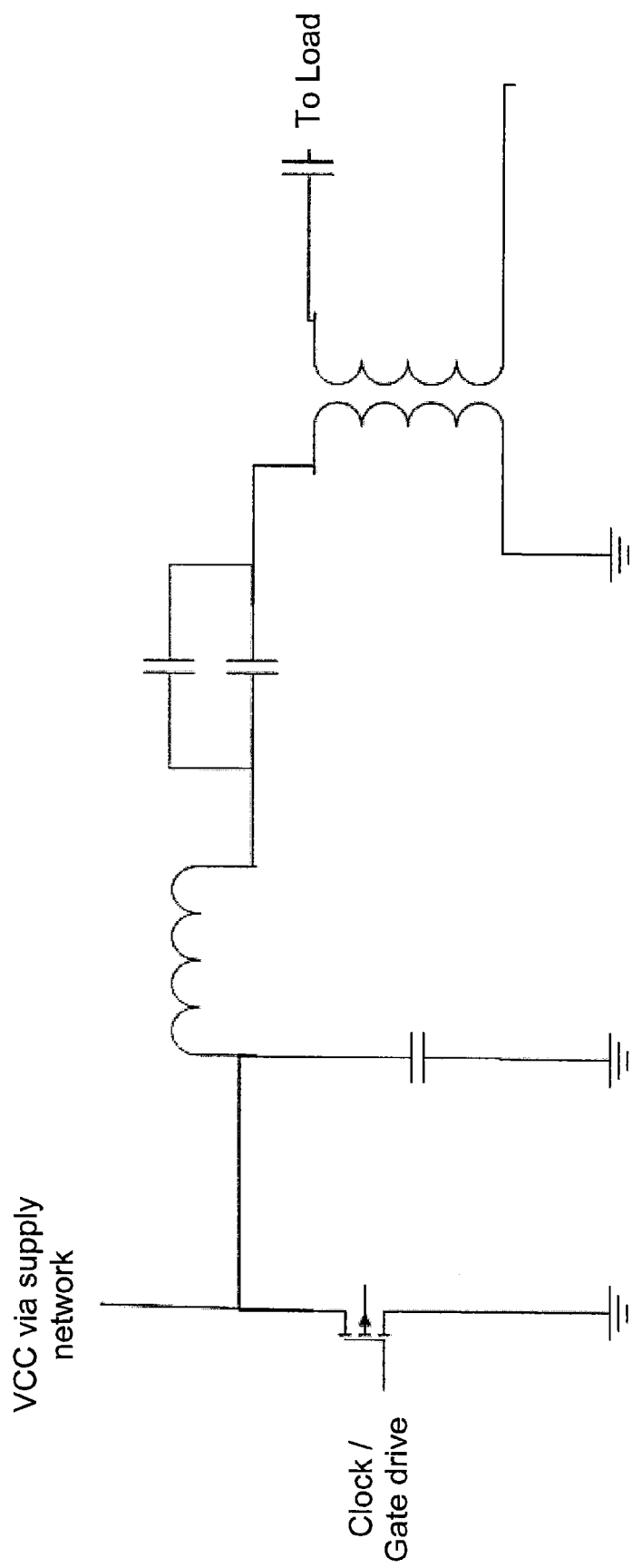
FIG. 82 shows a typical configuration of an impedance transformation network connected to an active device.

FIG. 82 shows a typical configuration of an impedance transformation network connected to an active device.

Figure 83:
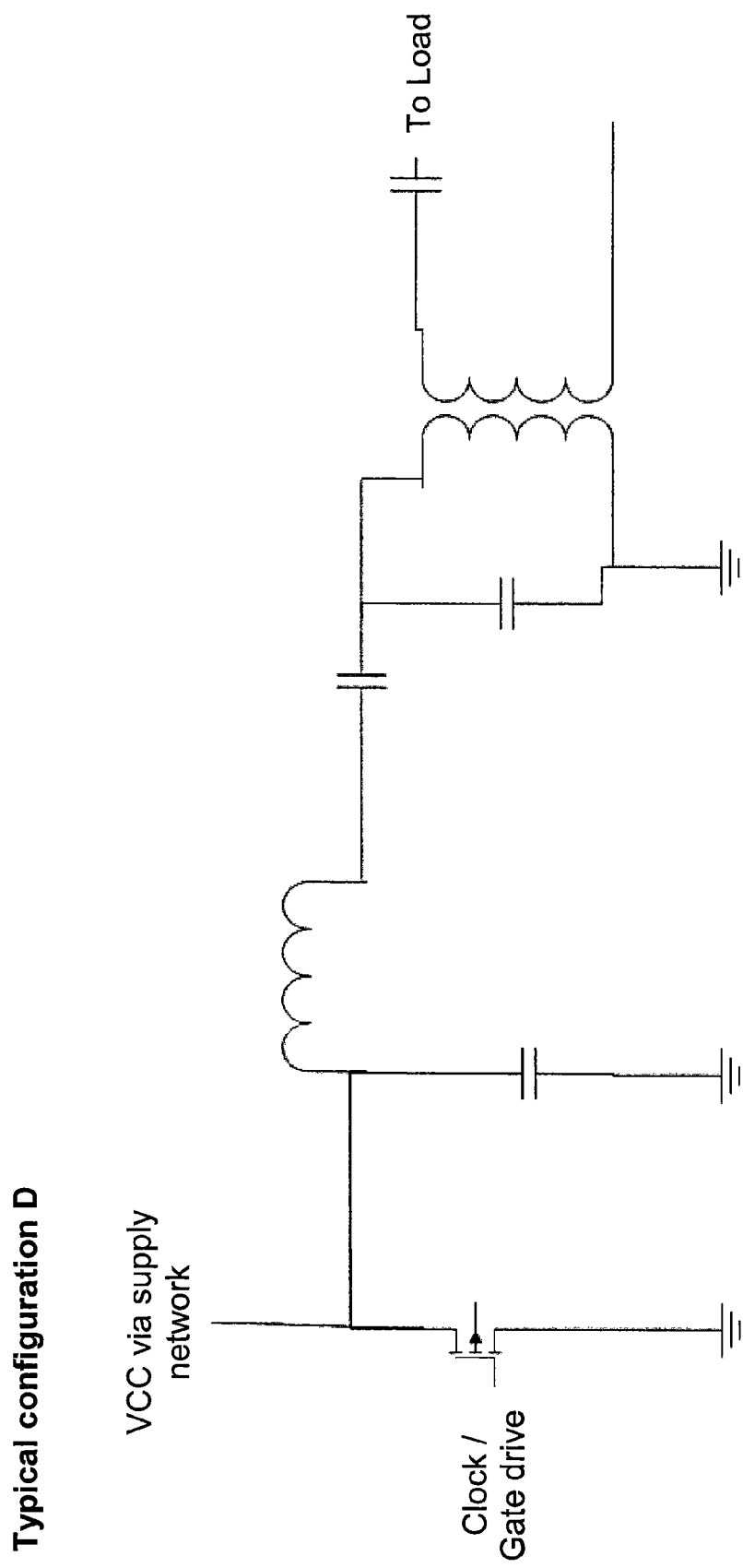
FIG. 83 shows a typical configuration of an impedance transformation network connected to an active device.

FIG. 83 shows a typical configuration of an impedance transformation network connected to an active device.

Specific embodiments pertain to a method and a circuit for inductive power transfer, incorporating an impedance transformation network, where the impedance transformation network has an input port for coupling to an active device for creating a signal at a selected operating frequency, an output port for coupling to a load having a variable impedance; and a reactive network coupled between the input port and the output port, where the reactive network includes a primary coil; and a secondary coil, where the primary coil is inductively coupled to the secondary coil, where when the output is coupled to the load having a variable impedance and the input port is coupled to the active device that creates a signal at the selected operating frequency, a phase angle of an impedance looking into the impedance transformation network through the input port is inductive and negatively correlated with the amount of power delivered to the load. A real part of the impedance looking into the impedance transformation network through the input port can be in a range between a minimum real part and a maximum real part. The maximum real part can be less than or equal to one order of magnitude greater than the minimum real part. Further embodiments can incorporate at least one additional input port, at least one additional output port, at least one additional primary coil, and/or at least one additional secondary coil. The output port can be adapted for coupling to at least two loads.

In an embodiment, the phase angle of the impedance looking into the impedance transformation network through the input port is positively correlated with the resistance of the load. In another embodiment, the phase angle of the impedance looking into the impedance transformation network through the input port is positively correlated with an equivalent resistance of the load. In a specific embodiment, the phase angle of the impedance looking into the impedance transformation network through the input port is positively correlated with an equivalent resistance of the load, wherein when the impedance looking to the primary coil, Zin, is explained by:

$$Z_{in} = \{1_{1M}[\mathbb{Z}^{IV} - (\mathbb{Z}^{II})^T(\mathbb{Z}^{I})^{-1}\mathbb{Z}^{II}]^{-1}1_{M1}\}$$

$$\mathbb{Z} = \begin{bmatrix} \mathbb{Z}^{III} & (\mathbb{Z}^{II})^T \\ \mathbb{Z}^{II} & \mathbb{Z}^{I} \end{bmatrix}$$

$$\mathbb{Z}_{ab} = \begin{cases} j\omega L_a + R_a & \text{for } a = b \\ j\omega M_{ab} & \text{otherwise} \end{cases}$$

$$\mathbb{Z}^{IV} = \mathbb{Z}^{III} + Z_{in}1_{MM}$$

Zin: Input impedance looking into the primary coil
$1_{1M}$: Vector of 1's of length M
$1_{MM}$: M×M matrix of 1's
Z: Impedance matrix
$Z_{ab}$: Element ab of the impedance matrix
$Z^I$: Sub-matrix of Z
$Z^{II}$: Sub-matrix of Z
$Z^{III}$: Sub-matrix of Z
$M_{ab}$: Mutual inductance between the $a^{th}$ and $b^{th}$ coil
j: imaginary number
a: coil index
b: coil index
ω: radian frequency
$R_a$: Parasitic resistance of the $a^{th}$ coil
$L_a$: Self inductance of the $a^{th}$ coil The reactive network can have at least one shunt network with a negative reactance that is connected between a first terminal of the secondary coil and a second terminal of the secondary coil. The at least one shunt network with a negative reactance can have a capacitor. The active device can have a transistor. In a specific embodiment, active device includes a switching component that operates substantially as a switch; and a capacitance in parallel with the switching component. The input port can be coupled to a voltage source or input port can be coupled to a current source. A supply network can be connected between the input port and a voltage source, where the supply network includes at least one inductor. The supply network connected between the input port and a voltage source can be configured to reject harmonics not intended to reach the load. In specific embodiments, the supply network connected between the input port and a voltage source can include elements of the supply network, load network, and the active device so as to represent at least one class D inverter or variant, at least one class DE inverter or variant, at least one class E inverter or variant, at least one class $E^{-1}$ inverter or variant at least one class F inverter or variant, at least one class $F^{-1}$ inverter or variant, at least one class $EF^{-1}$ inverter or variant, or at least one class Phi inverter or variant.

The signal from the active device can be an AC signal and/or a periodic signal. When the active device is coupled to the input port, a voltage source is coupled to the input port, and the load is coupled to the output port, the phase angle of the impedance looking into the impedance transformation network through the input port can be within a range such that substantially zero voltage-switching of the active device occurs. Regarding this range, in specific embodiments switching of the active device can occur when the voltage is within a range of 10% of a peak voltage and zero voltage, switching of the active device can occur when the voltage is within a range of 5% of a peak voltage and zero voltage, and/or switching of the active device occurs when the voltage is within a range of 1% of a peak voltage and zero voltage.

In another embodiment, when the active device creating a signal at the selected operating frequency is coupled to the input port, a voltage source is coupled to the input port, and the load is coupled to the output port, the phase angle of the impedance looking into the impedance transformation network through the input port is within a range such that substantially zero voltage derivative switching of the active device occurs. Regarding this range, in specific embodiments, switching of the active device occurs when the slope of the voltage is within a range of −1 and +1, switching of the active device occurs when the slope of the voltage is within a range of −0.5 and +0.5, and/or switching of the active device occurs when the slope of the voltage is within a range of −0.1 and +0.1. In a further specific embodiment, when the active device creating a signal at the selected operating frequency is coupled to the input port, a voltage source is coupled to the input port, and the load is coupled to the output port, the phase angle of the impedance looking into the impedance transformation network through the input port is within a range such that substantially zero voltage-switching and substantially zero voltage derivation switching of the active device occurs. Such switching of the active device can occur when the voltage is within a range of 10% of a peak voltage and zero and when the slope of the voltage is within a range of −1 and +1, when the voltage is within a range of 5% of a peak voltage and zero and when the slope of the voltage is within a range of −0.5 and +0.5, and/or when the voltage is within a range of 1% of a peak voltage and zero and when the slope of the voltage is within a range of −0.1 and +0.1.

When the active device creating a signal at the selected operating frequency is coupled to the input port, a voltage source is coupled to the input port, and the load is coupled to the output port, a real component of the impedance looking into the impedance transformation network through the input port can be within a range such that substantially zero voltage-switching of the active device occurs. Switching of the active device occurs when the voltage is within a range of 10% of a peak voltage and zero voltage, switching of the active device occurs when the voltage is within a range of 5% of a peak voltage and zero voltage, and/or switching of the active device occurs when the voltage is within a range of 1% of a peak voltage and zero voltage. When the active device creating a signal at the selected operating frequency is coupled to the input port, a voltage source is coupled to the input port, and the load is coupled to the output port, the phase angle of the impedance looking into the impedance transformation network through the input port is within a range such that substantially zero voltage derivative switching of the active device occurs. Switching of the active device occurs when the slope of the voltage is within a range of −1 and +1, switching of the active device occurs when the slope of the voltage is within a range of −0.5 and +0.5, and/or switching of the active device occurs when the slope of the voltage is within a range of −0.1 and +0.1.

When the active device creating a signal at the selected operating frequency is coupled to the input port, a voltage source is coupled to the input port, and the load is coupled to the output port, a phase angle of the impedance looking into the impedance transformation network through the input port can be within a range such that substantially zero current-switching of the active device occurs. Switching of the active device occurs when the current is within a range of 10% of a peak current and zero current, switching of the active device occurs when the current is within a range of 5% of a peak current and zero current, and/or switching of the active device occurs when the current is within a range of 1% of a peak current and zero current. When the active device creating a signal at the selected operating frequency is coupled to the input port, a voltage source is coupled to the input port, and the load is coupled to the output port, the phase angle of the impedance looking into the impedance transformation network through the input port can be within a range such that substantially zero current derivative switching of the active device occurs. Switching of the active device occurs when the slope of the current is within a range of −1 and +1, switching of the active device occurs when the slope of the current is within a range of −0.5 and +0.5, and/or switching of the active device occurs when the slope of the current is within a range of −0.1 and +0.1.

When the active device creating a signal at the selected operating frequency is coupled to the input port, a voltage source is coupled to the input port, and the load is coupled to the output port, a real component of the impedance looking into the impedance transformation network through the input port can be within a range such that substantially zero current-switching of the active device occurs. Switching of the active device occurs when the current is within a range of 10% of a peak current and zero current, switching of the active device occurs when the current is within a range of 5% of a peak current and zero current, and/or switching of the active device occurs when the current is within a range of 1% of a peak current and zero current. When the active device creating a signal at the selected operating frequency is coupled to the input port, a voltage source is coupled to the input port, and the load is coupled to the output port, the phase angle of the impedance looking into the impedance transformation network through the input port can be within a range such that substantially zero current derivative switching of the active device occurs. Switching of the active device occurs when the slope of the current is within a range of −1 and +1, switching of the active device occurs when the slope of the current is within a range of −0.5 and +0.5, and/or switching of the active device occurs when the slope of the current is within a range of −0.1 and +0.1.

When the active device creating a signal at the selected operating frequency is coupled to the input port, a voltage is coupled to the input port, and the load is coupled to the output port, the real part of the impedance looking into the impedance transformation network through the input port can be within a range such that the maximum real part of the impedance looking into the impedance transformation network through the input port is no more than two orders of magnitude greater than the minimum real part of the impedance looking into the impedance transformation network through the input port. A supply network can be connected between the input port and a voltage source, where the supply network is configured to reject harmonics not intended to reach the load. At least one load having a time-dependent impedance connected to the output port. In another embodiment, the system can be adapted least one load having a time dependent non-negative real resistance can be connected to the output port. In a specific embodiment where the phase angle of the impedance looking into the impedance transformation network through the input port is inductive, the phase angle of the impedance looking into the impedance transformation network through the input port is between 40 and 85 degrees.

In an embodiment with a shunt network connected between the first terminal of the secondary coil and the second terminal of the secondary coil, where the shunt network has a negative reactance, the shunt network can be configured such that the resistance looking from the secondary coil towards the load is between an upper bound and a lower bound, wherein the difference between the upper bound and lower bound is less than the difference between the maximum load resistance and minimum resistance. In specific embodiments, the upper bound is 1000 ohms and the lower bound is 0.01 ohms when the maximum load resistance is 100,000 ohms and the minimum load resistance is 1 ohms, the upper bound is 10 ohms and the lower bound is 1 ohm when the maximum load resistance is 100,000 ohms and the minimum load resistance is 1 ohms, the upper bound is 10,000 ohms and the lower bound is 500 ohms when the maximum load resistance is 100,000 ohms and the minimum load resistance is 1 ohms, or the upper bound is 1,000,000 ohms and the lower bound is 800,000 ohms when the maximum load resistance is 10,000,000 ohms and the minimum load resistance is 1 ohms. In a further specific embodiment, the at least one shunt network has a negative reactive value such that the phase angle looking into the primary coil is positively correlated with the load resistance. In a further specific embodiment, the at least one shunt network is configured to have a negative reactive value such that the phase angle looking into the primary coil is negatively correlated with the load resistance, where the reactive network further utilizes at least one additional shunt network connected between a first terminal of the primary coil and a second terminal of the primary coil, the at least one additional shunt network having a positive reactive value such that the phase angle looking into the impedance transformation network through the input port is positively correlated with the load resistance.

The reactive network can further include at least one additional shunt network connected between a first terminal of the primary coil and a second terminal of the primary coil.

The reactive network can include at least one reactive component connected to the primary coil, where the at least one reactive component has a reactance that shifts the phase angle looking into the impedance transformation network through the input port can be within a range such that substantially zero-voltage switching of the active device occurs. In specific embodiments, the impedance transformation network is configured such that the range of resistances looking into the impedance transformation network through the input port is between an upper bound and a lower bound, where the difference between the upper bound and lower bound is less than the difference between the maximum load resistance and the minimum load resistance. In various embodiments, the upper bound is 1000 ohms and the lower bound is 0.01 ohms when the maximum load resistance is 100,000 ohms and the minimum load resistance is 1 ohms, the upper bound is 10 ohms and the lower bound is 1 ohm when the maximum load resistance is 100,000 ohms and the minimum load resistance is 1 ohms, the upper bound is 10,000 ohms and the lower bound is 500 ohms when the maximum load resistance is 100,000 ohms and the minimum load resistance is 1 ohms, and the upper bound is 1,000,000 ohms and the lower bound is 800,000 ohms when the maximum load resistance is 10,000,000 ohms and the minimum load resistance is 1 ohms.

The at least one filter network having a positive reactance can be connected in series with the primary coil, where a reactance of the at least one filter network divided by a resistance looking from the filter network towards the load has a value between 1.5 and 10.

The impedance transformation network can be configured to couple to two active devices via a single input port. The input port can have at least two input ports for coupling to at least two active devices.

A rectifier can be positioned between the impedance transformation network and the load.

The primary coil can be connected in series with at least one reactive component and the secondary coil can be connected in series with at least one additional reactive component. In another embodiment, the primary coil is connected in series with at least one reactive component and at least one additional reactive component is connected between a first terminal of the secondary coil and a second terminal of the secondary coil. In yet another embodiment, at least one other reactive component is connected between a first terminal of the primary and a second terminal of the primary coil and the secondary coil is connected in series with at least one additional reactive component. In further embodiments, at least one other reactive component is connected between a first terminal of the primary coil and a second terminal of the primary coil and at least one additional reactive component is connected between a first terminal of the secondary coil and a second terminal of the secondary coil.

The primary coil can be a single primary coil inductively coupled to at least two secondary coils. In another embodiment, at least two primary coils are inductively coupled to the secondary coils. In various other embodiments, m primary coils are inductively coupled to n secondary coils, where m>1 and n>1.

A specific embodiment relates to a circuit for inductive power transfer having an impedance transformation network, incorporating an input port for coupling to an active device for creating a signal at a selected operating frequency, an output port for coupling to a load having a variable impedance; and a reactive network coupled between the input port and the output port, wherein the reactive network has a primary coil; and a secondary coil, where the primary coil is inductively coupled to the secondary coil, such that when the output is coupled to the load having a variable impedance and the input port is coupled to the active device that creates a signal at the selected operating frequency, a phase angle of an impedance looking into the impedance transformation network through the input port is capacitive and positively correlated with the amount of power delivered to the load.

Another embodiment pertains to a circuit for inductive power transfer, having a primary impedance transformation network, where the primary impedance transformation network has an input port for coupling to a active device that creates a signal at a selected operating frequency, a primary coil for coupling to a secondary coil, and a reactive network coupled to the input port and coupled to the primary coil, where the reactive network incorporates at least one capacitor, and at least one inductor, such that when the primary coil is coupled to the secondary coil and the input port is coupled to the active device that creates a signal at the selected operating frequency, a phase angle of an impedance looking into the primary impedance transformation network through the input port is inductive and negatively correlated with the amount of power inductively transferred from the primary coil.

Another embodiment relates to a circuit for inductive power transfer, having a primary impedance transformation network, where the primary impedance transformation network includes an input port for coupling to an one active device that creates a signal at a selected operating frequency, a primary coil for coupling to a secondary coil, a reactive network coupled to the input port and coupled to the primary coil, where the reactive network incorporates at least one capacitor, at least one inductor, such that when the primary coil is coupled to the secondary coil and the input port is coupled to the active device that creates a signal at the selected operating frequency, a phase angle of an impedance looking into the primary impedance transformation network through the input port is capacitive and positively correlated with the amount of power inductively transferred from the primary coil.

A further embodiment pertains to a circuit for inductive power transfer, having a secondary side impedance transformation network, where the secondary side impedance transformation network incorporates at least one secondary coil for coupling to at least one primary coil, at least one output port for coupling to at least one load having a variable impedance; and a secondary side reactive network coupled to the output port and coupled to the secondary coil, where the reactive network incorporates at least one capacitor, such that when the secondary coil is coupled to the primary coil, where the primary coil is coupled to a primary side reactive network, where the primary side reactive network has an input port for connection to at least one active device that creates a signal at a selected operating frequency, the a phase angle of an impedance looking into the primary side reactive network through the input port is inductive and positively correlated with the amount of power inductively transferred from the primary coil.

A further embodiment is directed to a circuit for inductive power transfer, having a secondary side impedance transformation network, wherein the secondary side impedance transformation network has at least one secondary coil for coupling to at least one primary coil, at least one output port for coupling to at least one load having a variable impedance; and a secondary side reactive network coupled to the at least one output port and coupled to the at least one secondary coil, wherein the reactive network includes at least one capacitor, such that when the secondary coil is coupled to the primary coil, where the primary coil is coupled to a primary side reactive network, where the primary side reactive network has an input port for connection to at least one active device that creates a signal at a selected operating frequency, the a phase angle of an impedance looking into the primary side reactive network through the input port is capacitive and negatively correlated with the amount of power inductively transferred from the primary coil.

An embodiment of the invention is directed to an apparatus for wireless power transfer, having a rectifier stage, where the rectifier stage is adapted to interconnect with a load; a first impedance transformation network (FITN), where the first impedance transformation network interconnects with the rectifier stage and transforms the impedance looking into the rectifier stage such that the impedance looking into the FITN is such that the load decouples from the primary coil; a secondary coil, where the secondary coil is interconnected with the FITN such that the power coupled from the primary coil to the secondary coil is received by the FITN; a primary coil, where the primary coil is positioned with respect to the secondary coil such that the primary coil is coupled to the secondary coil, wherein the interaction between the primary coil and secondary coil is such that the impedance looking into the primary coil has a resistance large enough to maximize power delivery through to the secondary coil; a second impedance transformation network (SITN), where the SITN interconnects with the primary coil and transforms the impedance looking into the primary coil such that the resistance looking into the SITN toward the load is within a usable operating range of the tuned switch-mode inverter, large enough to maximize power delivery through to the secondary coil; a phase shifting network, where the phase shifting network interconnects with the SITN and transforms the impedance looking into the SITN such that the impedance looking into the phase shifting network has a resistance in the operating range of the tuned switch-mode inverter and a reactive part in the operating range of the tuned switch-mode inverter; a tuned switch-mode inverter, where the tuned switch-mode inverter is interconnected with the phase shifting network; and a power source, where the power source is interconnected with the tuned switch-mode inverter. In this embodiment, the load can have a load resistance that can range from 0 to 500 ohms.

An embodiment is an apparatus for wireless power transfer, having a rectifier stage, where the rectifier stage is adapted to interconnect with a load; a secondary coil, where the secondary coil is interconnected with the rectifier stage; a primary coil, where the primary coil is coupled to the secondary coil; a tuned switch-mode supply, wherein the tuned switch-mode supply is interconnected to the primary coil; a power supply, where the power supply supplies power to the tuned switch-mode supply; a first circuitry interconnected between the tuned switch-mode supply and the primary coil; and a second circuitry interconnected between the secondary coil and the rectifier stage, such that power output to the load decreases as the impedance of the load increases.

Another embodiment is an apparatus for wireless power transfer, having a rectifier stage, where the rectifier stage is adapted to interconnect with a load; a secondary coil, where the secondary coil is interconnected with the rectifier stage; a primary coil, where the primary coil is coupled to the secondary coil; a tuned switch-mode supply, where the tuned switch-mode supply is interconnected to the primary coil; a power supply, where the power supply supplies power to the tuned switch-mode supply; a first circuitry interconnected between the tuned switch-mode supply and the primary coil; and a second circuitry interconnected between the secondary coil and the rectifier stage, such that power output to the load is adjusted as the phase angle of the load changes.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An apparatus for wireless power transfer, comprising:
   a rectifier stage, wherein the rectifier stage is adapted to interconnect with a load;
   a secondary coil, wherein the secondary coil is interconnected with the rectifier stage;
   a primary coil, wherein the primary coil is coupled to the secondary coil;
   a tuned switch-mode supply, wherein the tuned switch-mode supply is interconnected to the primary coil;
   a power supply, wherein the power supply supplies power to the tuned switch-mode supply;
   first impedance transformation network circuitry interconnected between the tuned switch-mode supply and the primary coil; and
   second impedance transformation network circuitry interconnected between the secondary coil and the rectifier stage, wherein a phase angle of an input impedance of the first impedance transformation circuitry is correlated with an amount of power output to the load.

2. A circuit for inductive power transfer, comprising:
   an impedance transformation network, comprising:
      an input port configured to couple to an active device that creates a signal at a selected operating frequency, the impedance transformation network having an input impedance looking into the impedance transformation network through the input port,
      an output port configured to couple to a load having a variable impedance; and
      a reactive network coupled between the input port and the output port, wherein the reactive network comprises:
         a primary coil; and
         a secondary coil inductively coupled to the primary coil;
   wherein, when the output port is coupled to the load and the input port is coupled to the active device, a phase angle of the input impedance is correlated with an amount of power delivered to the load.

3. The circuit according to claim 2, wherein the phase angle is inductive and negatively correlated with the amount of power delivered to the load.

4. The circuit according to claim 2, wherein the phase angle is capacitive and positively correlated with the amount of power delivered to the load.

5. The circuit according to claim 2, wherein the phase angle is positively correlated with a resistance of the load.

6. The circuit according to claim 2, wherein the reactive network further comprises at least one shunt network with a negative reactance that is connected between a first terminal of the secondary coil and a second terminal of the secondary coil.

7. The circuit according to claim 6, wherein the at least one shunt network with a negative reactance comprises a capacitor.

8. The circuit according to claim 2, wherein the active device comprises a transistor.

9. The circuit according to claim 2, wherein the active device comprises an inverter.

10. The circuit according to claim 2, wherein the phase angle is within a range such that substantially zero voltage switching of the active device occurs.

11. The circuit according to claim 2, wherein the phase angle is within a range such that substantially zero voltage derivative switching of the active device occurs.

12. The circuit according to claim 2, wherein a rectifier is positioned between the impedance transformation network and the load.

13. The circuit according to claim 12, wherein the load comprises a portable electronic device.

14. The circuit according to claim 2, wherein the primary coil is a single primary coil inductively coupled to at least two secondary coils.

15. The circuit according to claim 2, wherein the at least two primary coils are inductively coupled to the secondary coils.

16. A circuit for inductive power transfer, comprising:
   a primary impedance transformation network, comprising:
      an input port configured to couple to an active device that creates a signal at a selected operating frequency, the primary impedance transformation network having an input impedance looking into the primary impedance transformation network through the input port, a primary coil configured to couple to a secondary coil; and a reactive network coupled to the input port and coupled to the primary coil, wherein the reactive network comprises:

at least one capacitor; and at least one inductor;

wherein when the primary coil is coupled to the secondary coil and the input port is coupled to the active device, a phase angle of the input impedance is correlated with an amount of power inductively transferred from the primary coil.

17. The circuit according to claim 16, wherein the phase angle is inductive and negatively correlated with the amount of power inductively transferred from the primary coil.

18. The circuit according to claim 16, wherein the phase angle is capacitive and positively correlated with the amount of power inductively transferred from the primary coil.

19. The circuit according to claim 16, wherein the reactive network further comprises at least one additional shunt network connected between a first terminal of the primary coil and a second terminal of the primary coil.

20. The circuit according to claim 19, wherein the at least one additional shunt network has a positive reactive value such that the phase angle looking into the impedance transformation network through the input port is positively correlated with a load resistance.

* * * * *

UNITED STATES PATENT AND TRADEMARK OFFICE
CERTIFICATE OF CORRECTION

PATENT NO. : 8,674,551 B2  Page 1 of 1
APPLICATION NO. : 12/994478
DATED : March 18, 2014
INVENTOR(S) : Low et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twenty-ninth Day of September, 2015

Michelle K. Lee
*Director of the United States Patent and Trademark Office*